US012747136B2

(12) United States Patent
Alexanian

(10) Patent No.: US 12,747,136 B2
(45) Date of Patent: Sep. 29, 2026

(54) HOISTWAY MECHANICS OF PANORAMIC VACUUM ELEVATOR

(71) Applicant: BLISSERA CORP., Los Altos, CA (US)

(72) Inventor: Suren Alex Alexanian, Los Altos, CA (US)

(73) Assignee: BLISSERA CORP., Los Altos, CA (US)

( * ) Notice: Subject to any disclaimer, the term of this patent is extended or adjusted under 35 U.S.C. 154(b) by 72 days.

(21) Appl. No.: 18/906,202

(22) Filed: Oct. 4, 2024

(65) Prior Publication Data

US 2025/0026612 A1 Jan. 23, 2025

Related U.S. Application Data

(63) Continuation of application No. 17/371,019, filed on Jul. 8, 2021, now Pat. No. 12,110,208.
(Continued)

(51) Int. Cl.
*B66B 11/00* (2006.01)
*B32B 17/10* (2006.01)
(Continued)

(52) U.S. Cl.
CPC .... *B66B 11/0005* (2013.01); *B32B 17/10036* (2013.01); *B32B 17/10091* (2013.01);
(Continued)

(58) Field of Classification Search
CPC .............................. B66B 11/0423; B66B 9/04
See application file for complete search history.

(56) References Cited

U.S. PATENT DOCUMENTS 265,129 A 9/1882 Needham
494,217 A * 3/1893 Miles .................. B66B 11/0423
187/311

(Continued)

FOREIGN PATENT DOCUMENTS

CN 103693529 A 4/2014
CN 104787645 A 7/2015
(Continued)

OTHER PUBLICATIONS

"PCT International Search Report" by Federal Institute of Industrial Property (RU) in application No. PCT/US2021/040959, dated Oct. 21, 2021, 3 pages.

(Continued)

*Primary Examiner* — Michael A Riegelman
(74) *Attorney, Agent, or Firm* — ARLUYS IP, P.C.

(57) ABSTRACT

The present approaches are in the in the field of vacuum (or pneumatic) elevators, where the elevator cabin is brought into motion in a vertically situated or vertically inclined and hermetically sealed elevator shaft by means of aerial pressure differential above and below the elevator cabin. Such approaches do not require having any ropes, pulleys, chains, gears, or hydraulics that are traditionally used in conventional elevator systems. More specifically, the present approaches are in the field of panoramic vacuum elevators, where the elevator hoistway is built of panoramic glass panels running from floor to ceiling of every floor and the elevator cabin is built of panoramic glass panels running from floor to the ceiling of the cabin, and that this type of elevator does not incorporate any metal constructive structures—frames, mesh, guides or rails that are traditionally used in every conventional elevator product.

20 Claims, 47 Drawing Sheets

Perspective exploded view of the Hoistway Foundation

Related U.S. Application Data

(60) Provisional application No. 63/049,642, filed on Jul. 9, 2020.

(51) Int. Cl.

| | |
|---|---|
| ***C03B 27/012*** | (2006.01) |
| ***C03C 3/04*** | (2006.01) |
| ***C03C 4/18*** | (2006.01) |
| ***C03C 21/00*** | (2006.01) |
| ***E04C 2/02*** | (2006.01) |
| *B66B 9/04* | (2006.01) |
| *B66B 13/30* | (2006.01) |

(52) U.S. Cl.
CPC .. *B32B 17/10119* (2013.01); *B32B 17/10137* (2013.01); *C03B 27/012* (2013.01); *C03C 3/04* (2013.01); *C03C 4/18* (2013.01); *C03C 21/002* (2013.01); *E04C 2/02* (2013.01); *B32B 2419/00* (2013.01); *B66B 9/04* (2013.01); *B66B 11/004* (2013.01); *B66B 13/30* (2013.01); *C03C 2204/00* (2013.01)

(56) References Cited

U.S. PATENT DOCUMENTS

| | | | | | |
|---|---|---|---|---|---|
| 613,627 | A * | 11/1898 | Hadfield | B66B 9/04 | 187/377 |
| 2,927,661 | A * | 3/1960 | Kristek | B66B 9/04 | 187/360 |
| 3,949,953 | A * | 4/1976 | Hopkins | B65G 51/06 | 406/185 |
| 4,066,298 | A * | 1/1978 | Sakamoto | B65G 51/06 | 406/189 |
| 4,231,148 | A | 11/1980 | Harding | | |
| 4,462,193 | A | 7/1984 | Ericson | | |
| 4,637,176 | A | 1/1987 | Acock, Jr. | | |
| 4,650,702 | A | 3/1987 | Whitmyer | | |
| 4,703,835 | A | 11/1987 | Negrutsky | | |
| 4,986,041 | A | 1/1991 | Prewer | | |
| 4,997,060 | A * | 3/1991 | Sassak | B66B 9/02 | 182/48 |
| 5,083,639 | A | 1/1992 | Kappeler | | |
| 5,217,764 | A | 6/1993 | Eich | | |
| 5,220,979 | A | 6/1993 | Matsuda | | |
| 5,447,211 | A * | 9/1995 | Sors | B66B 9/04 | 187/277 |
| 5,448,864 | A | 9/1995 | Rosamond | | |
| 5,583,326 | A * | 12/1996 | Sors | B66B 9/04 | 187/277 |
| 5,597,358 | A * | 1/1997 | Marcu | B66B 9/04 | 472/137 |
| 5,644,871 | A | 7/1997 | Cohen | | |
| 5,845,745 | A | 12/1998 | Lane | | |
| 5,975,249 | A | 11/1999 | Tomaseti | | |
| 6,085,873 | A * | 7/2000 | Macchi | B65G 51/04 | 187/400 |
| 6,322,295 | B1 * | 11/2001 | Gabriele | B65G 51/02 | 406/84 |
| 6,371,249 | B1 | 4/2002 | Schops | | |
| 7,188,705 | B1 * | 3/2007 | Fuhrmann | A62B 1/20 | 182/48 |
| 7,918,314 | B2 * | 4/2011 | Korchagin | B65G 1/0478 | 187/239 |
| 8,122,999 | B2 * | 2/2012 | Guillermety | A62B 1/20 | 193/25 E |
| 8,544,217 | B2 | 10/2013 | Andreini | | |
| 8,800,724 | B1 | 8/2014 | Foster | | |
| 8,991,560 | B2 * | 3/2015 | Fritz | B66B 11/0005 | 187/256 |
| 9,248,995 | B2 * | 2/2016 | Ascua | F16K 7/14 | |
| 9,845,155 | B2 * | 12/2017 | Brown | B66B 11/0226 | |
| 10,106,375 | B1 * | 10/2018 | Ascua | B66B 9/04 | |
| 10,137,667 | B2 | 11/2018 | Cleary | | |
| 10,221,045 | B2 * | 3/2019 | Hall | B66B 13/30 | |
| 10,233,055 | B1 * | 3/2019 | Ascua | B66B 11/026 | |
| 10,351,388 | B2 * | 7/2019 | Ascua | B66B 9/04 | |
| 10,906,781 | B2 * | 2/2021 | Chen | B66B 11/0423 | |
| 11,136,219 | B2 | 10/2021 | Steiner | | |
| 11,498,801 | B2 | 11/2022 | Derbarmdiger | | |
| 11,584,618 | B2 | 2/2023 | Hänninen | | |
| 11,788,308 | B2 * | 10/2023 | Yong | B32B 3/28 | 52/39 |
| 11,919,743 | B2 * | 3/2024 | Darnley, III | B66B 11/0206 | |
| 12,110,208 | B2 * | 10/2024 | Alexanian | B66B 9/04 | |
| 12,330,918 | B2 * | 6/2025 | Babu | B66B 9/04 | |
| 12,503,341 | B2 * | 12/2025 | Alexanian | B66B 9/04 | |
| 2003/0213652 | A1 | 11/2003 | Long | | |
| 2004/0006939 | A1 | 1/2004 | Jobs | | |
| 2005/0105303 | A1 | 5/2005 | Emde | | |
| 2007/0170013 | A1 | 7/2007 | Rivera | | |
| 2008/0011546 | A1 | 1/2008 | Korchagin | | |
| 2008/0298906 | A1 * | 12/2008 | Scott | B65G 51/34 | 406/12 |
| 2009/0070131 | A1 | 3/2009 | Chen | | |
| 2010/0300010 | A1 | 12/2010 | Vallejo | | |
| 2011/0232226 | A1 | 9/2011 | Geyer | | |
| 2011/0266413 | A1 * | 11/2011 | Fritz | E04F 17/005 | 248/669 |
| 2014/0238781 | A1 * | 8/2014 | Ascua | B66B 9/04 | 187/250 |
| 2014/0305749 | A1 | 10/2014 | Manner | | |
| 2015/0183619 | A1 | 7/2015 | Oh | | |
| 2017/0113899 | A1 | 4/2017 | Hettema | | |
| 2017/0137262 | A1 | 5/2017 | Miller | | |
| 2017/0190424 | A1 * | 7/2017 | Brown | B64C 1/18 | |
| 2018/0127242 | A1 | 5/2018 | Witczak | | |
| 2018/0283727 | A1 | 10/2018 | Grabon | | |
| 2019/0367327 | A1 | 12/2019 | Kallio | | |
| 2020/0071221 | A1 | 3/2020 | Willis et al. | | |
| 2020/0115190 | A1 | 4/2020 | Xiong | | |
| 2020/0217087 | A1 | 7/2020 | Greschbach | | |
| 2021/0179388 | A1 | 6/2021 | Darnley, III | | |
| 2021/0331893 | A1 | 10/2021 | Thum | | |
| 2022/0009747 | A1 * | 1/2022 | Alexanian | B66B 9/04 | |
| 2023/0139084 | A1 * | 5/2023 | Babu | B66B 5/14 | 187/250 |
| 2023/0249945 | A1 * | 8/2023 | Alexanian | B66B 9/04 | 187/250 |
| 2025/0026612 | A1 * | 1/2025 | Alexanian | B66B 9/04 | |
| 2026/0042639 | A1 * | 2/2026 | Olczyk | B66B 9/003 | |

FOREIGN PATENT DOCUMENTS

| | | | | |
|---|---|---|---|---|
| CN | 106044486 | A | 10/2016 | |
| DE | 202015006773 | U1 * | 11/2015 | B66B 9/04 |
| EP | 1197464 | A2 | 4/2002 | |
| KR | 20110053443 | A | 5/2011 | |
| KR | 20180073037 | A * | 7/2018 | B66B 11/0226 |
| RU | 10745 | U1 | 8/1999 | |
| RU | 49809 | U1 | 12/2005 | |
| WO | 99/64692 | A1 | 12/1999 | |
| WO | 2015033363 | A1 | 3/2015 | |
| WO | 2020021243 | A1 | 1/2020 | |
| WO | WO-2025114767 | A1 * | 6/2025 | B66B 11/0423 |

OTHER PUBLICATIONS

International Claims examined by Federal Institute of Industrial Property (RU) in application No. PCT/US 2021/040959, Oct. 2021, 5 pages.

"Extended European search report" by European Patent Office in application No. EP21838665 (PCT/US 2021/040959), dated Oct. 18, 2023, 9 pages.

Esat Yildiz, "Vacuum, elevator home lift, disabled lift, fast track installation vakumlu asansör", Jan. 30, 2018, retrieved from the Internet (URL: https://www.youtube.com/watch?v=-IIL08VPnE8) Oct. 6, 2023, 2 pages.

"PCT International Search Report" by the US Patent and Trademark Office (US) in application No. PCT/US 23/18461, dated Jul. 28, 2023, 2 pages.

(56) References Cited

OTHER PUBLICATIONS

International Claims examined by the US Patent and Trademark Office (US) in application No. PCT/US 23/18461, Apr. 2023, 5 pages.
U.S. Appl. No. 18/134,193, filed Apr. 13, 2023, Non-Final Office Action mailed Mar. 17, 2025.
U.S. Appl. No. 18/134,193, filed Apr. 13, 2023, Notice of Allowance, Aug. 21, 2025.

* cited by examiner

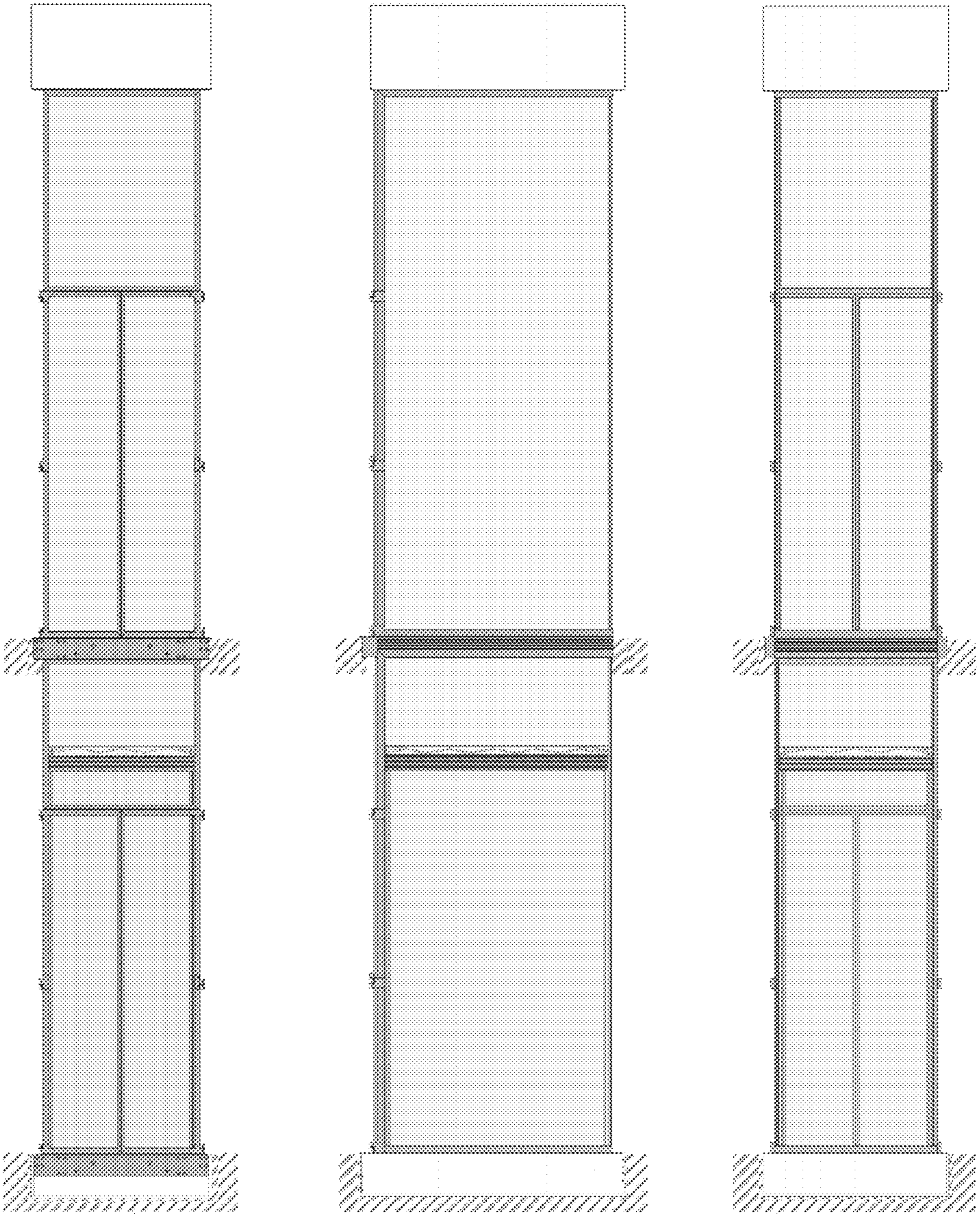
FIG. 1. Front, side and back views of a 2-story Blissera Elevator system

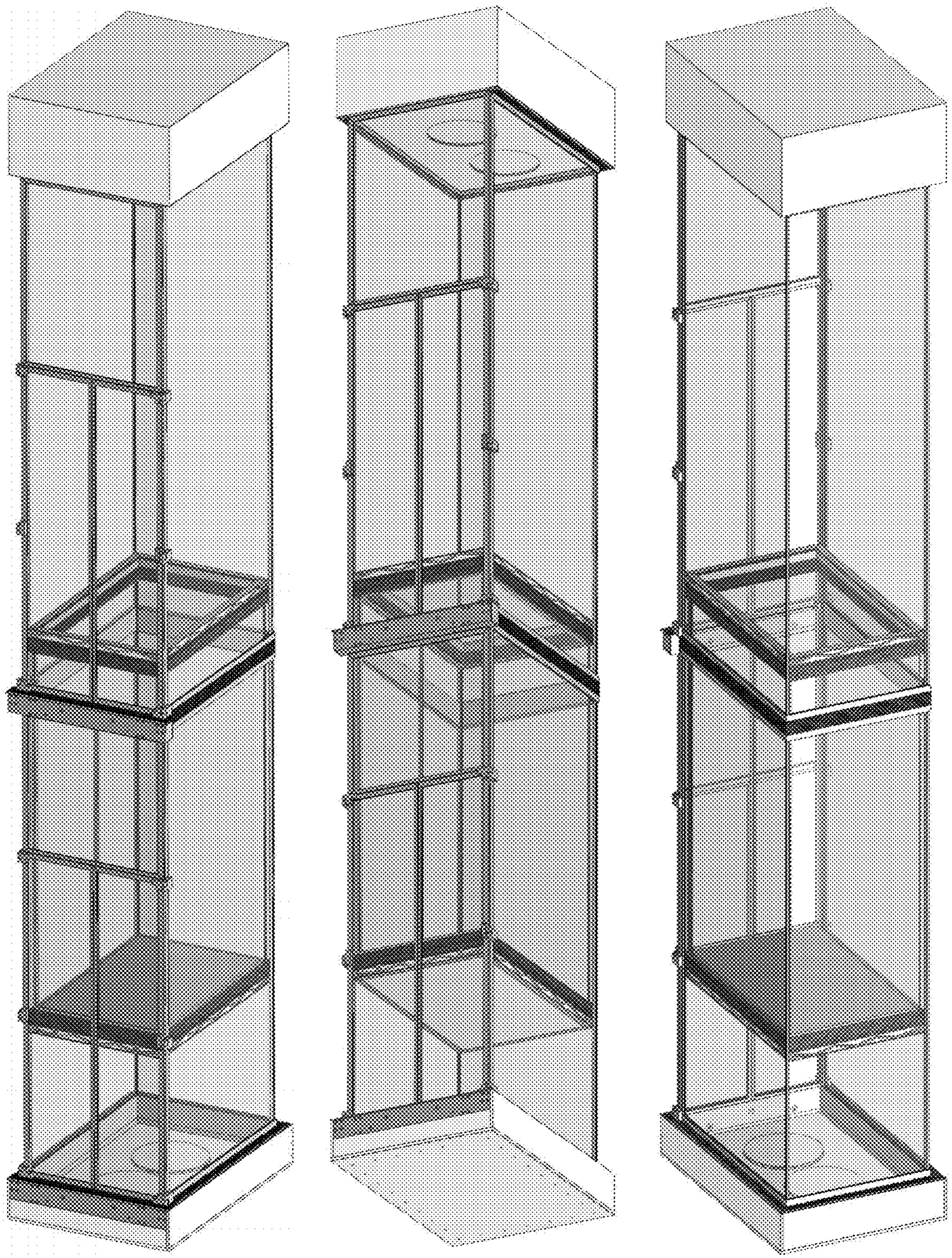
FIG. 2. Perspective views of a 2-story Blissera Elevator system with Cabin in motion

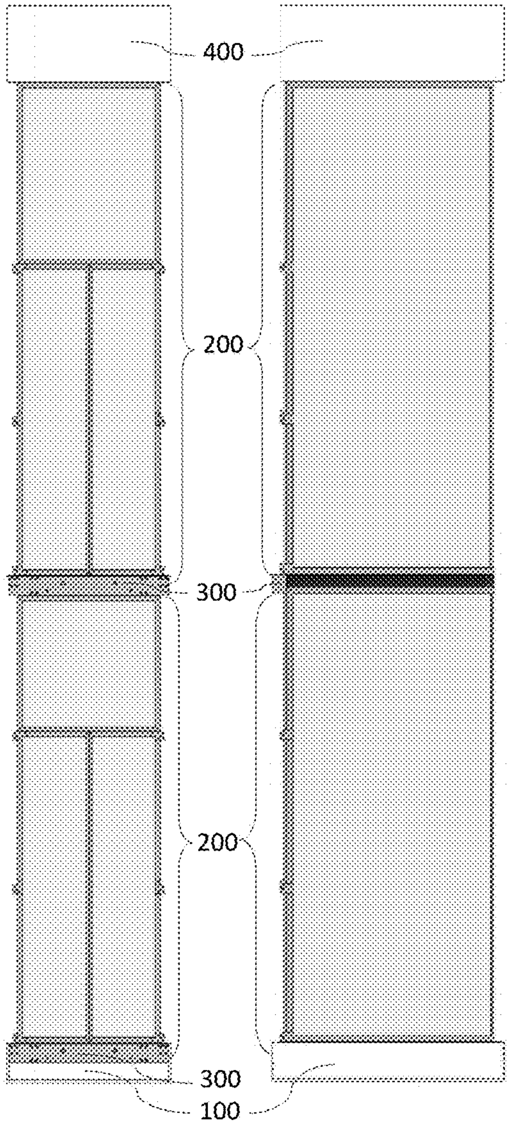
FIG. 4. Front and side views of a 2-story Hoistway
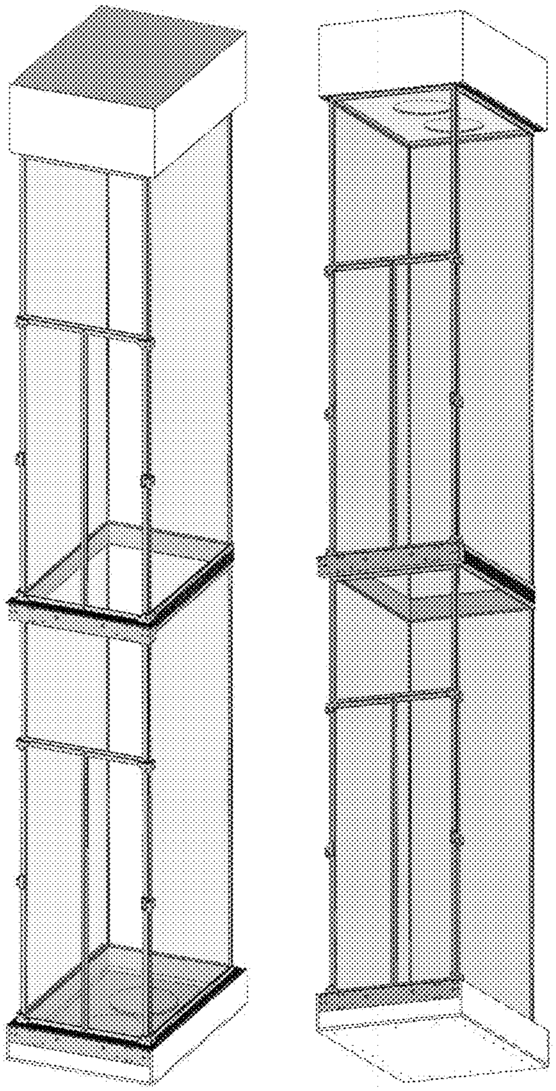
FIG. 3. Upper front and lower back perspective views of a 2-story Hoistway
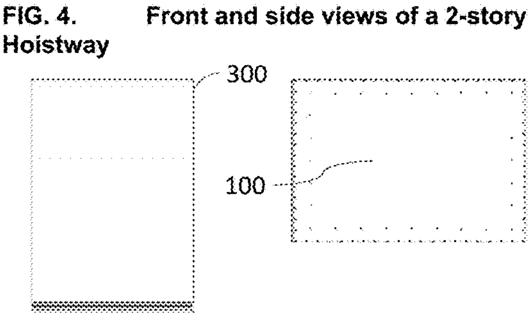
FIG. 5. Top and bottom views of the Hoistway
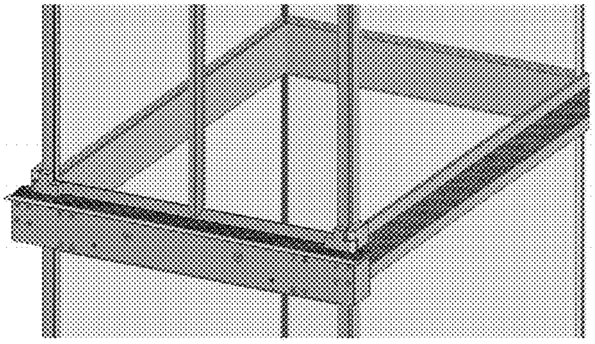
FIG. 6. Front perspective zoomed view of a Hoistway Belt connection

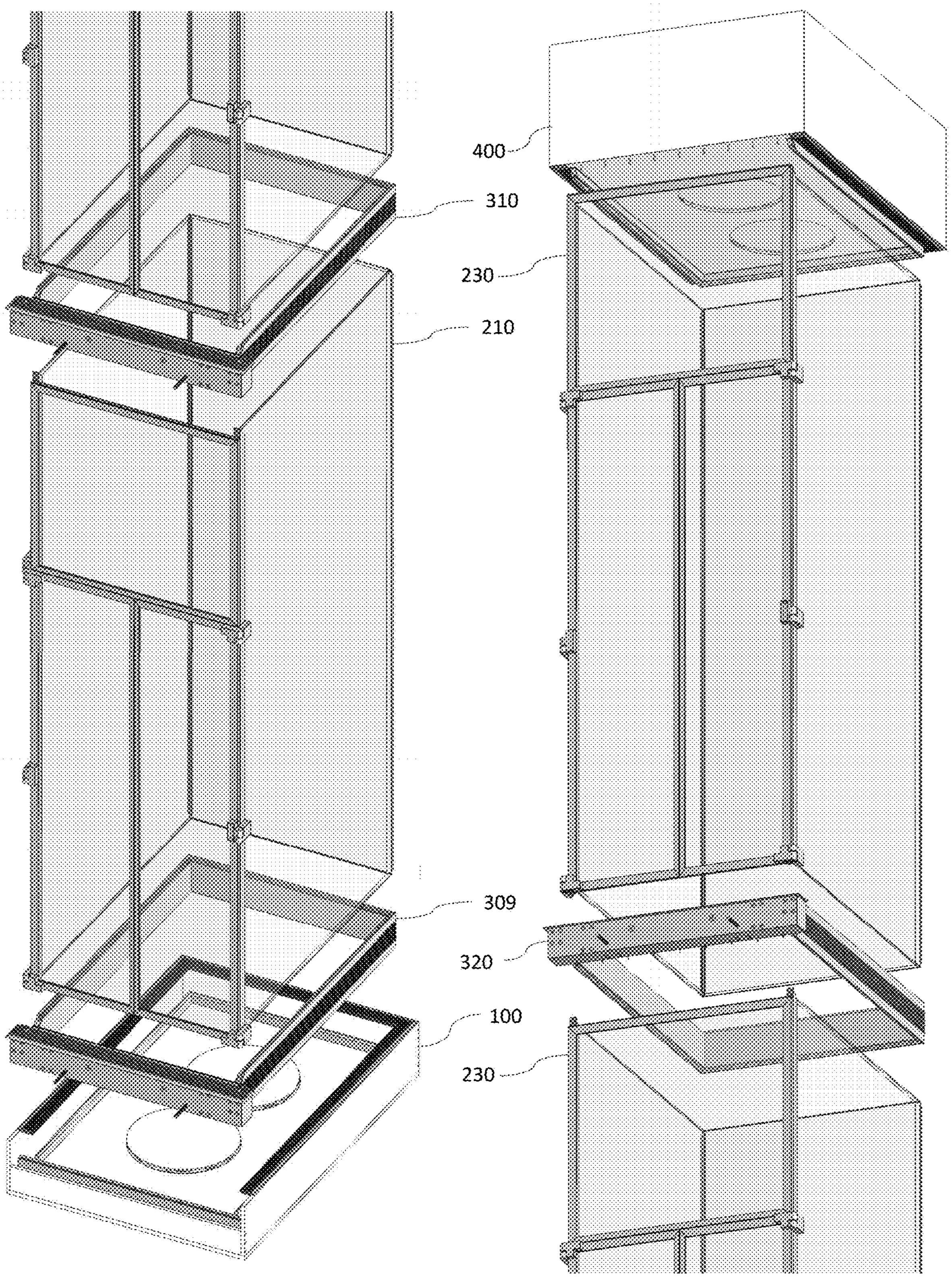
FIG. 7. Exploded view of the Hoistway

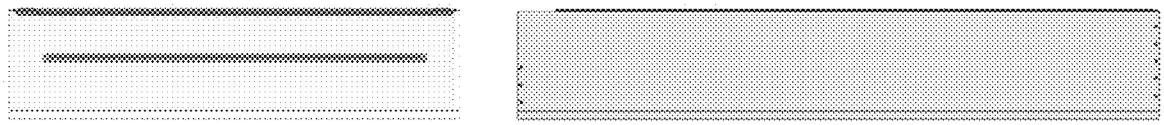
FIG. 8. Front and side views of the Hoistway Foundation
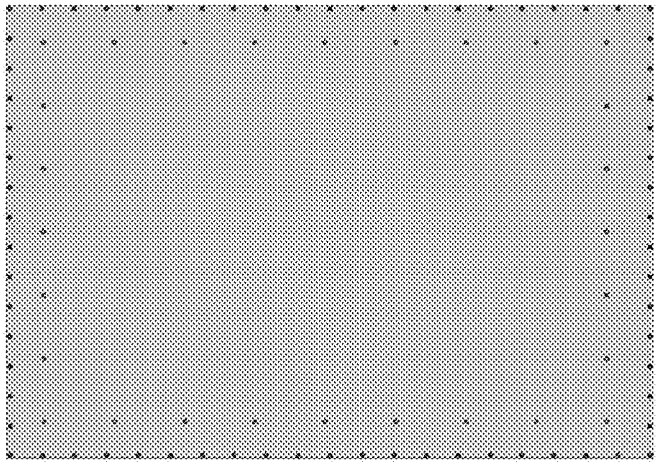
FIG. 9. Bottom view of the Hoistway Foundation
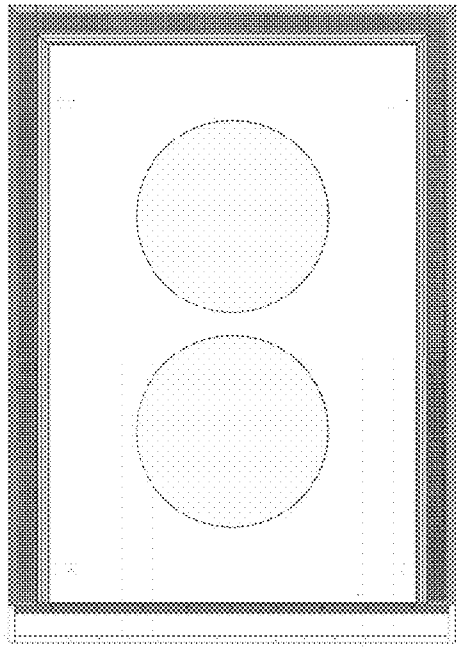
FIG. 10. Top view of the Hoistway Foundation
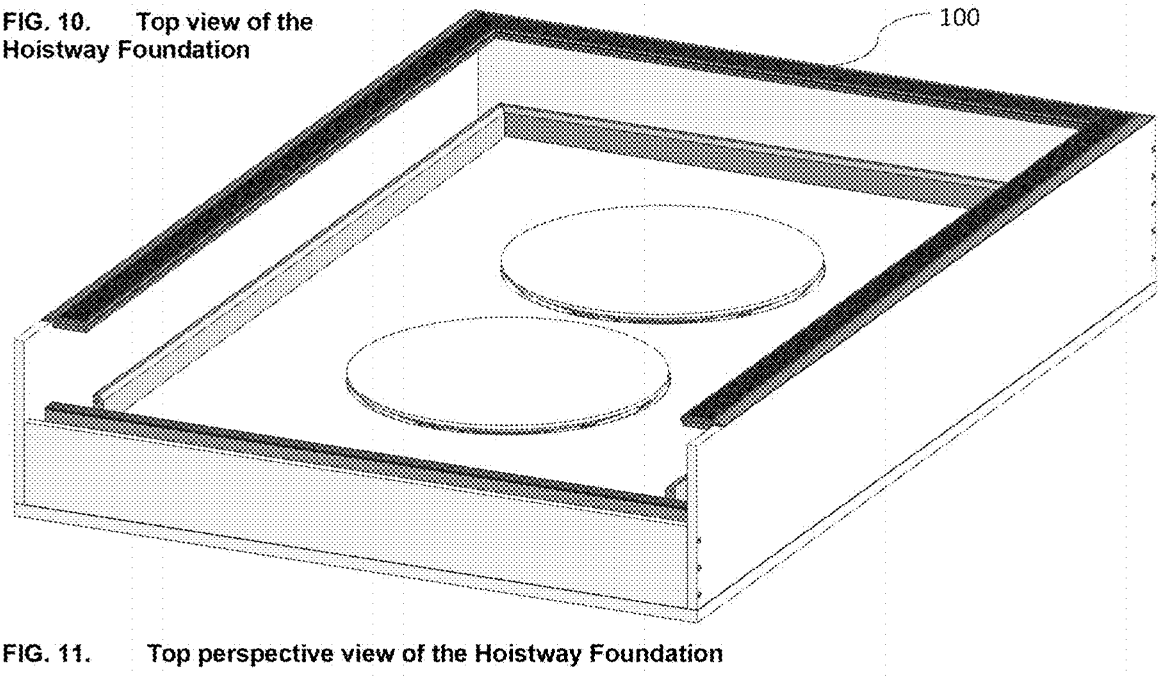
FIG. 11. Top perspective view of the Hoistway Foundation

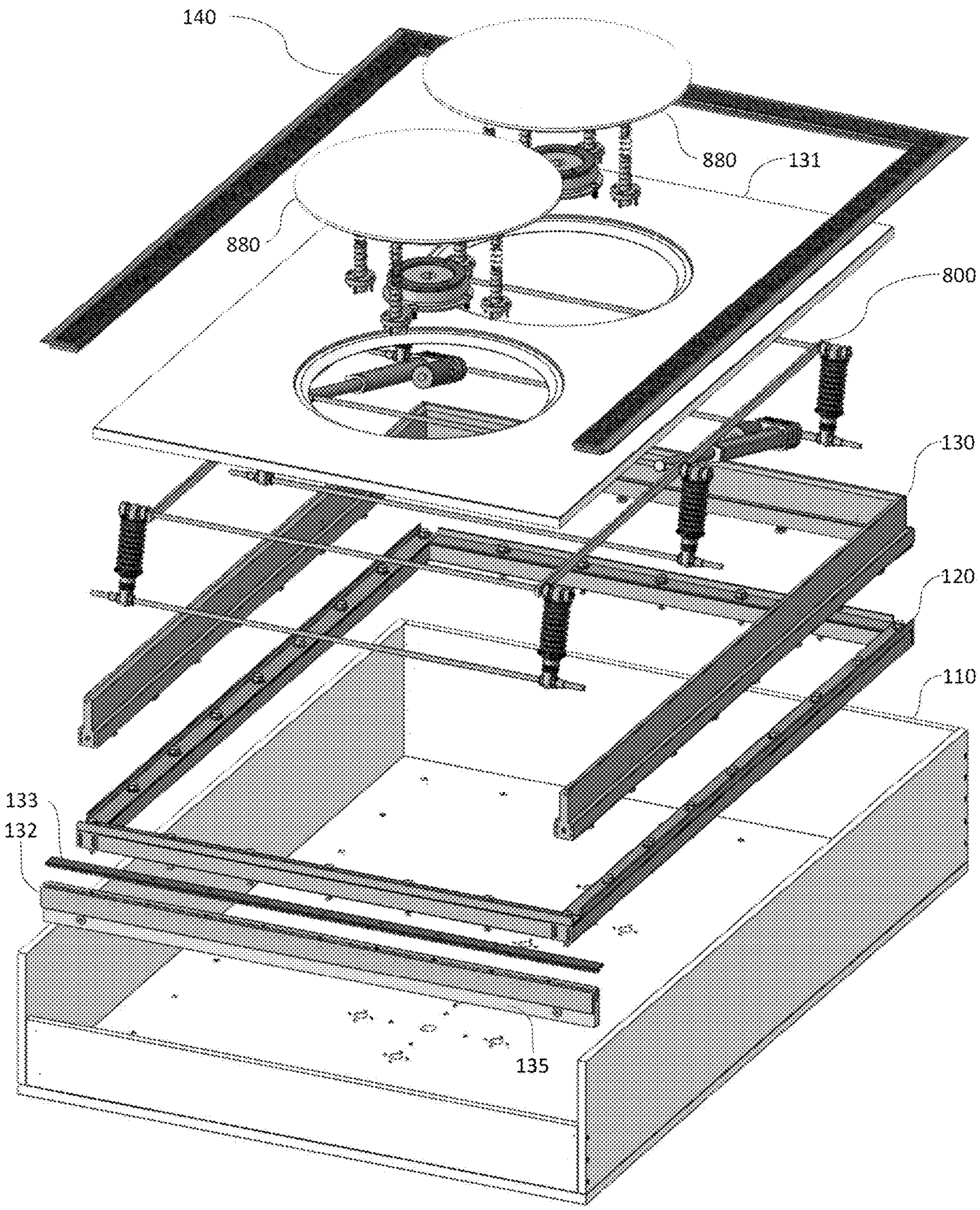
FIG. 12. Perspective exploded view of the Hoistway Foundation

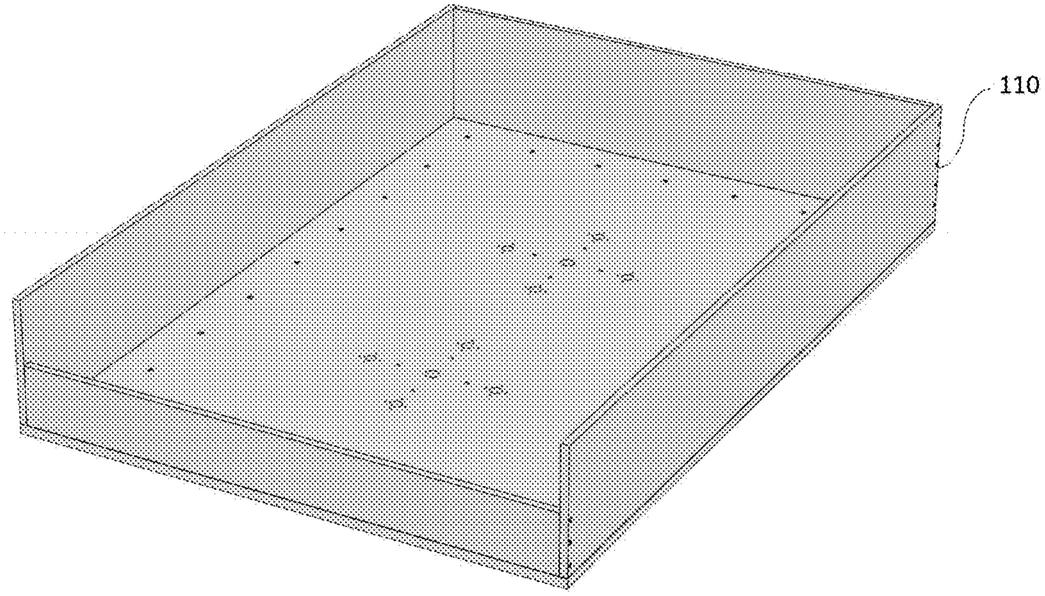
FIG. 13. Perspective view of the Hoistway Foundation Enclosure
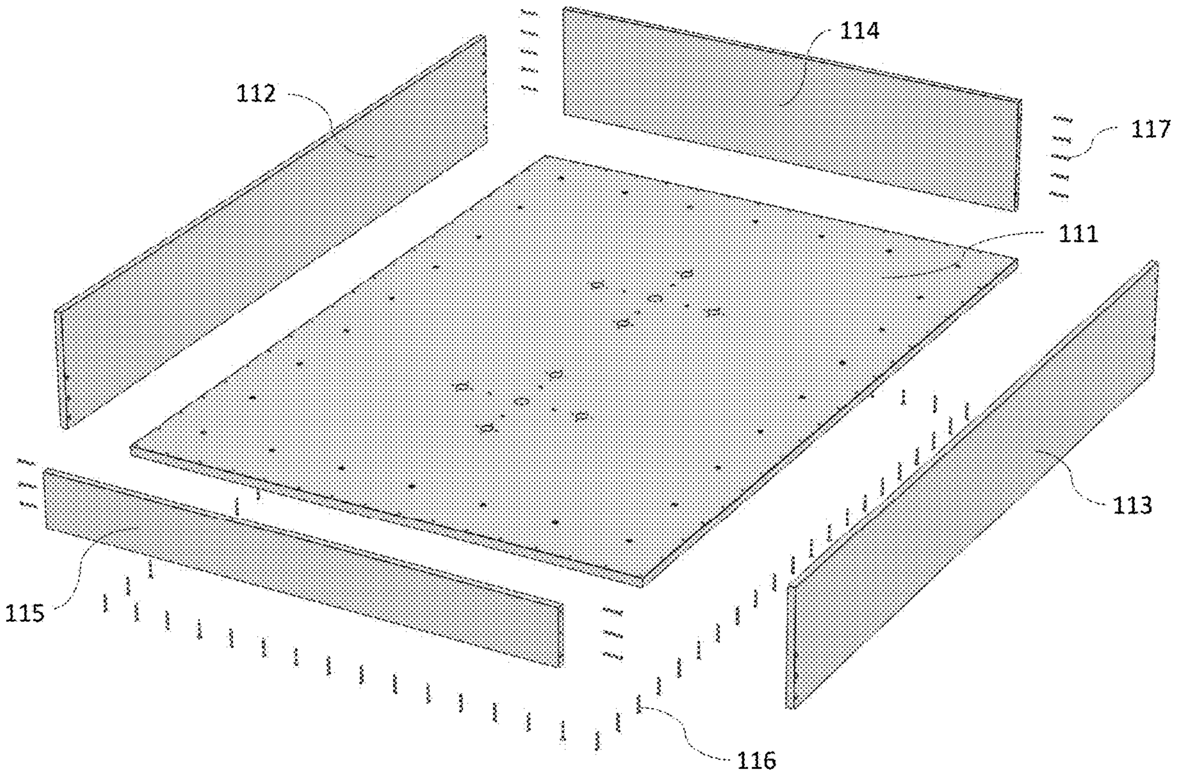
FIG. 14. Exploded view of the Hoistway Foundation Enclosure

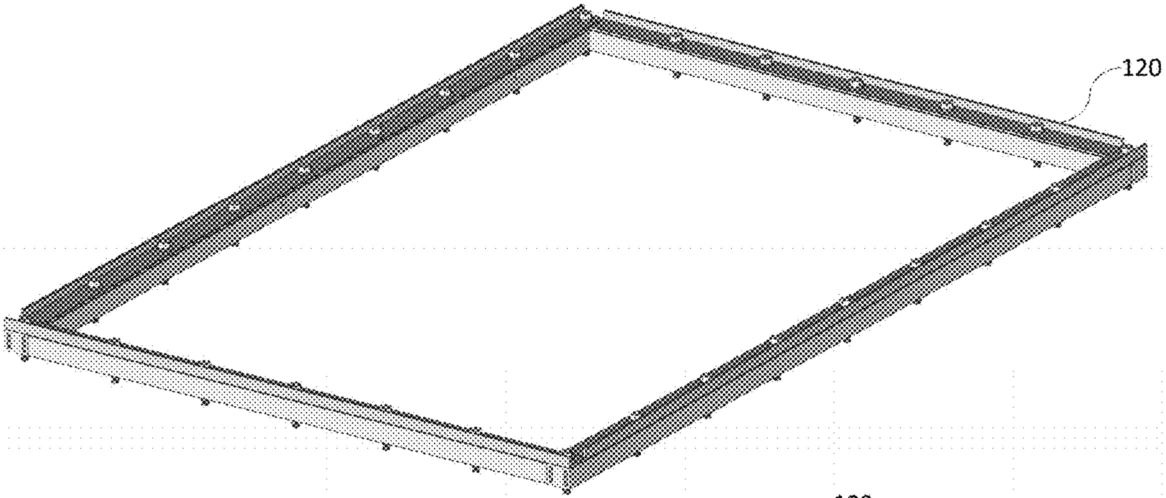
FIG. 15. Perspective view of the Hoistway Foundation Base (up)
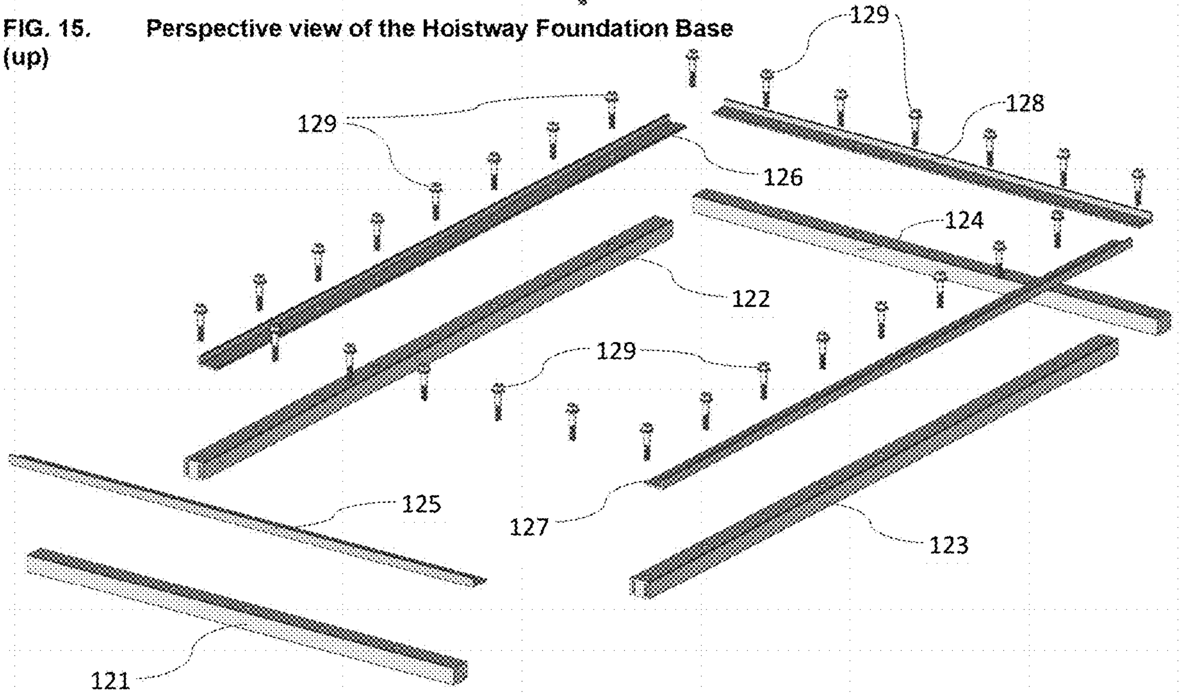
FIG. 16. Exploded view of the Hoistway Foundation Base (up)
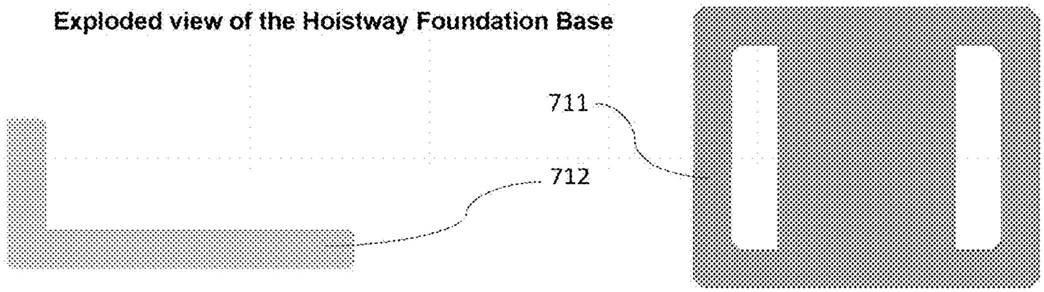
FIG. 17. Cross-section view of the Foundation Frame upper and lower profiles

FIG. 18. Front and side views of the Hoistway Foundation Frame
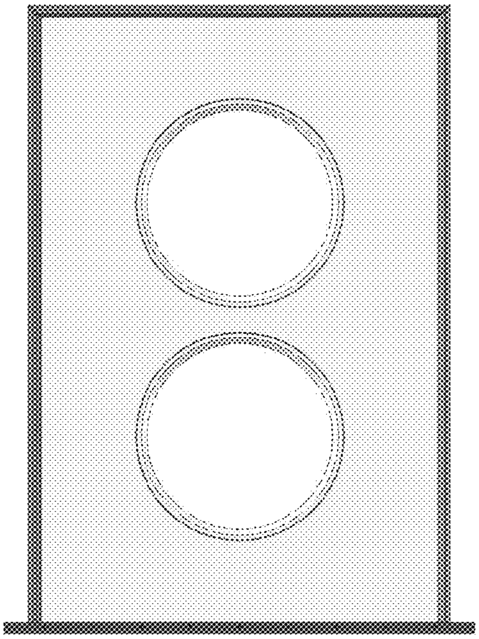
FIG. 20. Top view of the Hoistway Foundation Frame
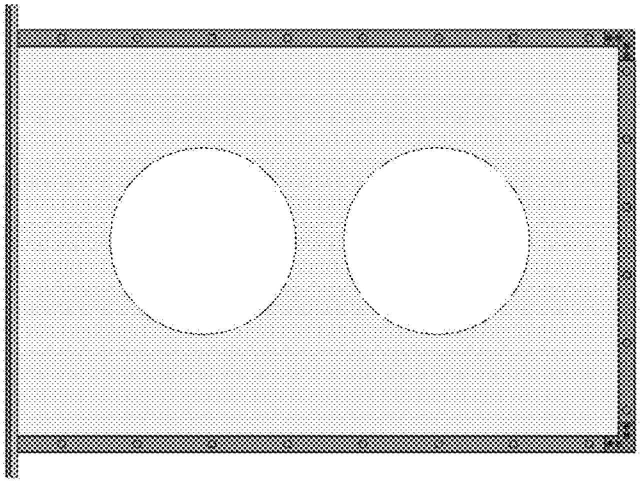
FIG. 19. Bottom view of the Hoistway Foundation Frame
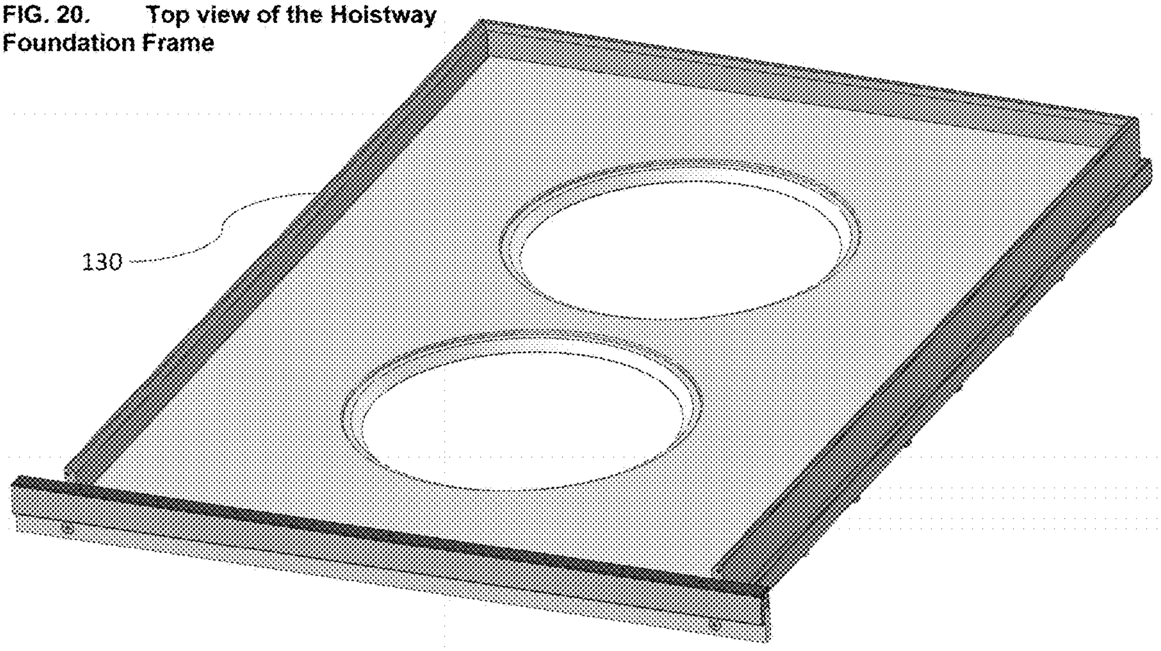
FIG. 21. Perspective view of the Hoistway Foundation Frame

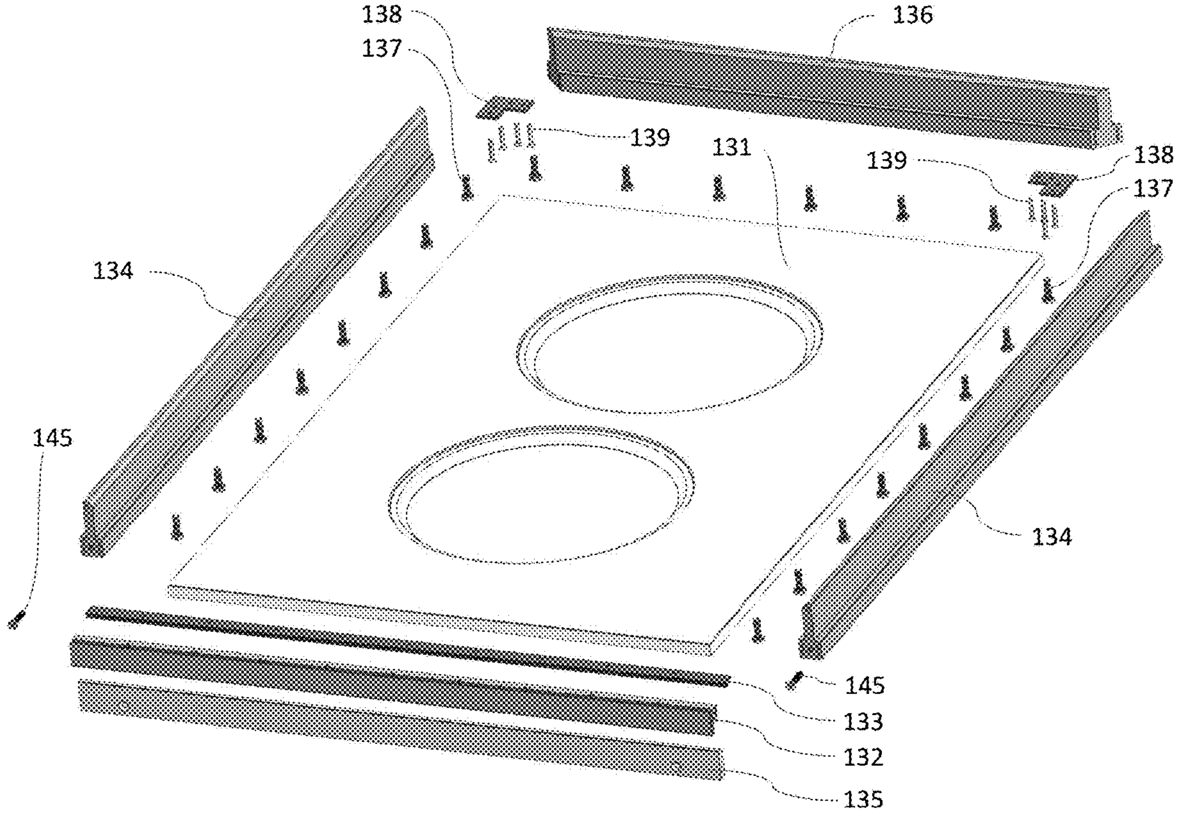
FIG. 22. Perspective exploded view of the Hoistway Foundation Frame
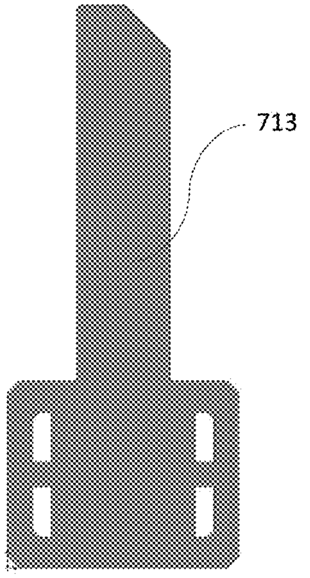
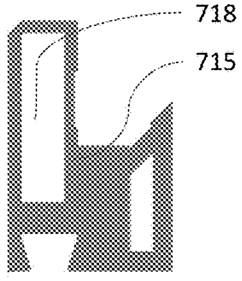
FIG. 23. Cross-section view of the Hoistway Edge Frame profile
FIG. 24. Cross-section view of the Foundation Frame back profile FIG. 25. Front and side views of the Hoistway Foundation Grill Frame
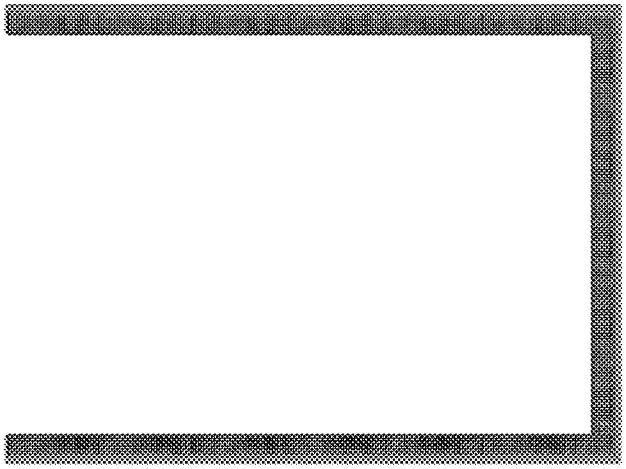
FIG. 26. Bottom view of the Hoistway Foundation Grill Frame
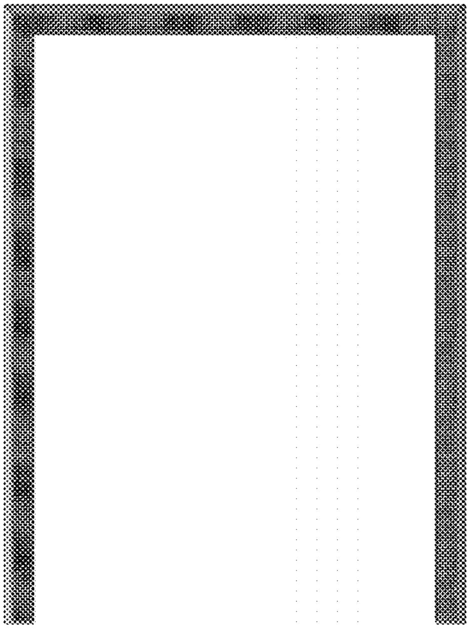
FIG. 27. Top view of the Hoistway Foundation Grill Frame
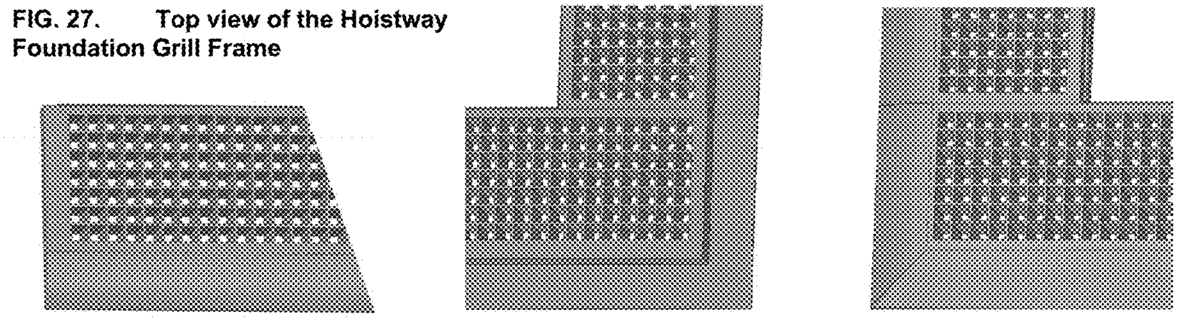
FIG. 28. Zoomed fragments view of the Hoistway Foundation Grill Frame
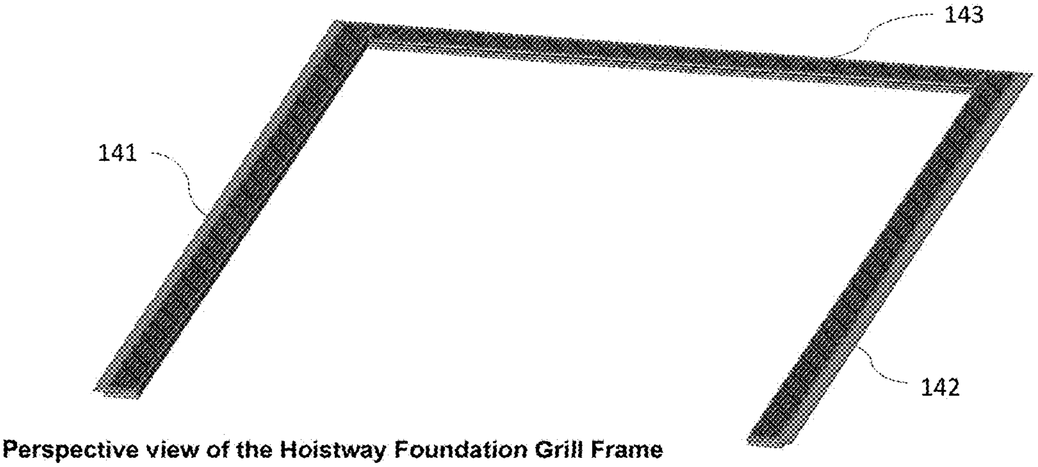
FIG. 29. Perspective view of the Hoistway Foundation Grill Frame

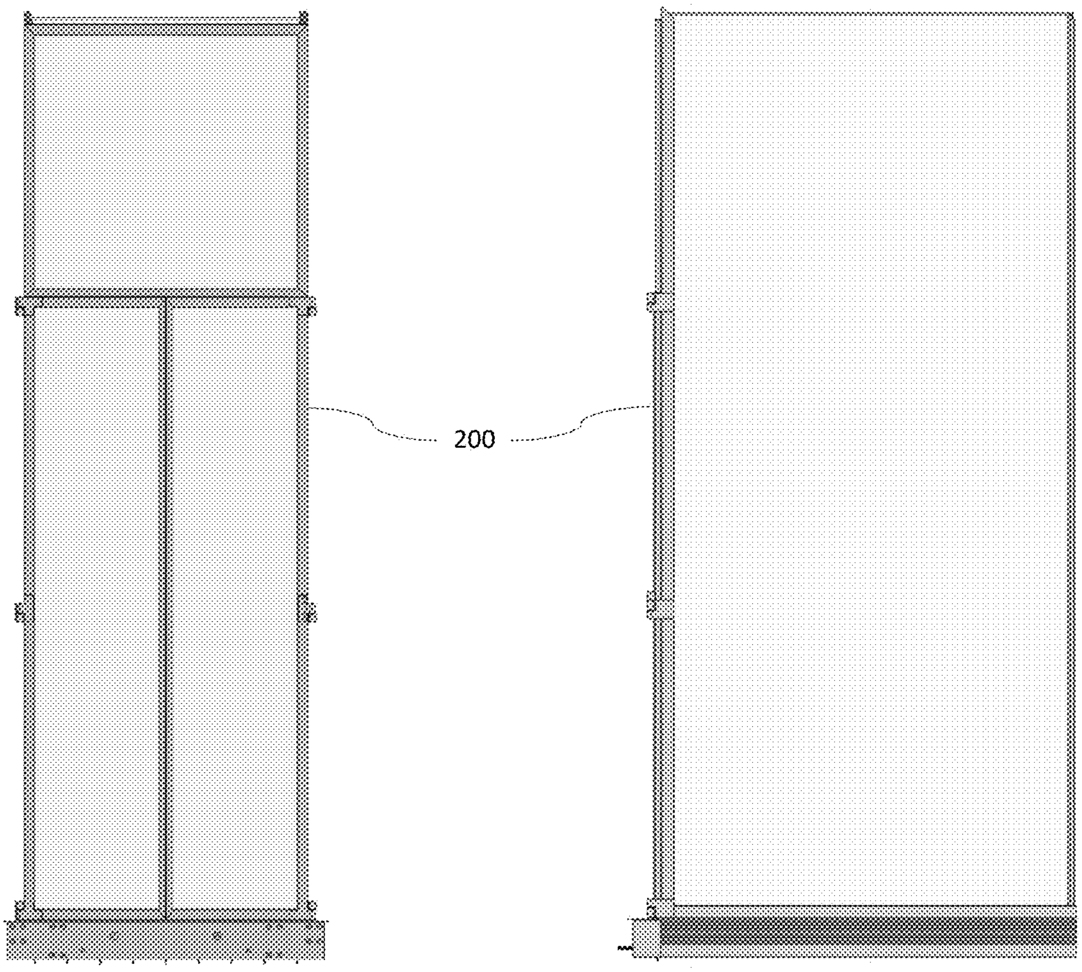
FIG. 30. Front and side views of the Hoistway Shaft
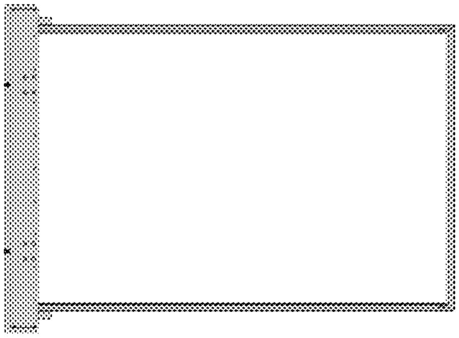
FIG. 31. Bottom view of the Hoistway Shaft
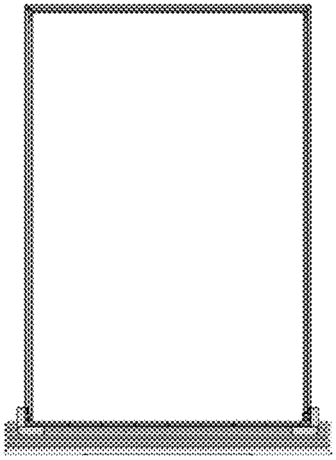
FIG. 32. Top view of the Hoistway Shaft

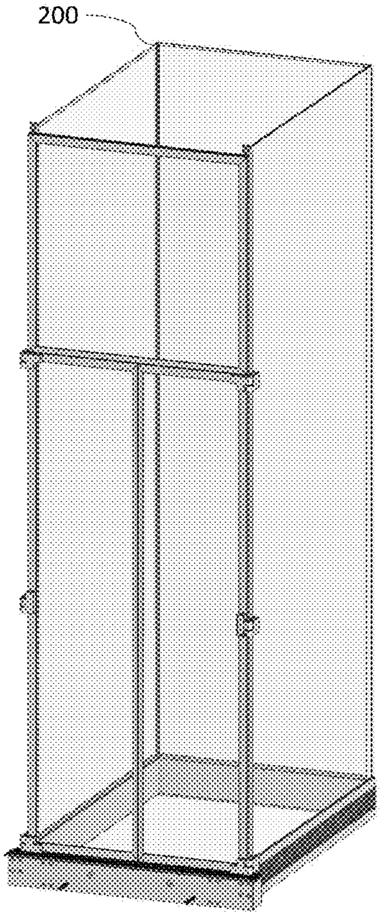
FIG. 33. Front perspective view of the Hoistway Shaft
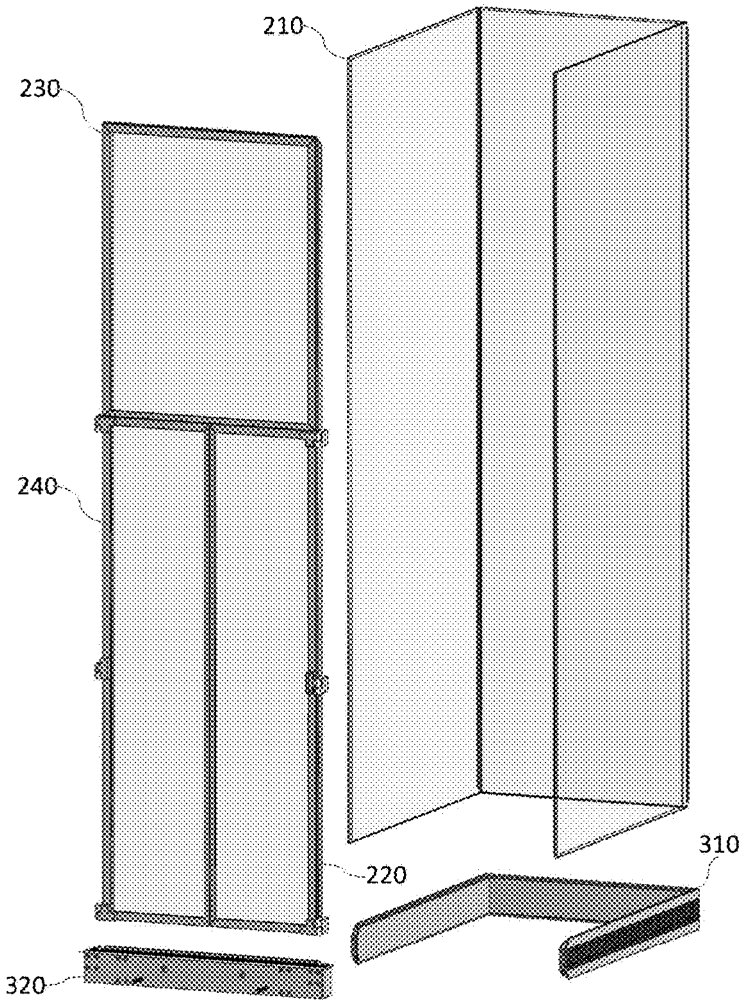
FIG. 34. Exploded view of the Hoistway Shaft
FIG. 35. Top view of the Hoistway Doors in closed position
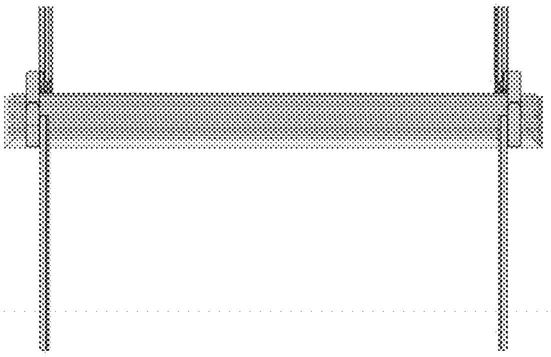
FIG. 36. Top view of the Hoistway Doors in open position

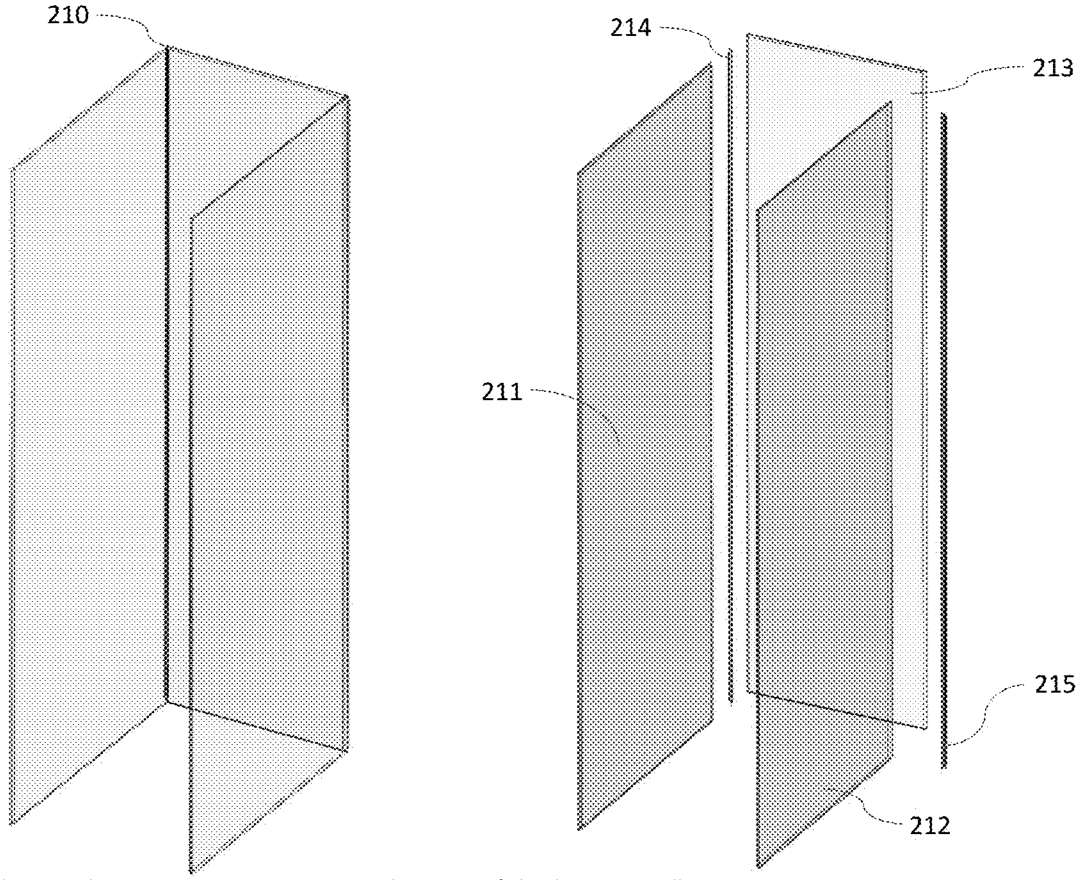
FIG. 37. Perspective and exploded views of the Hoistway Body
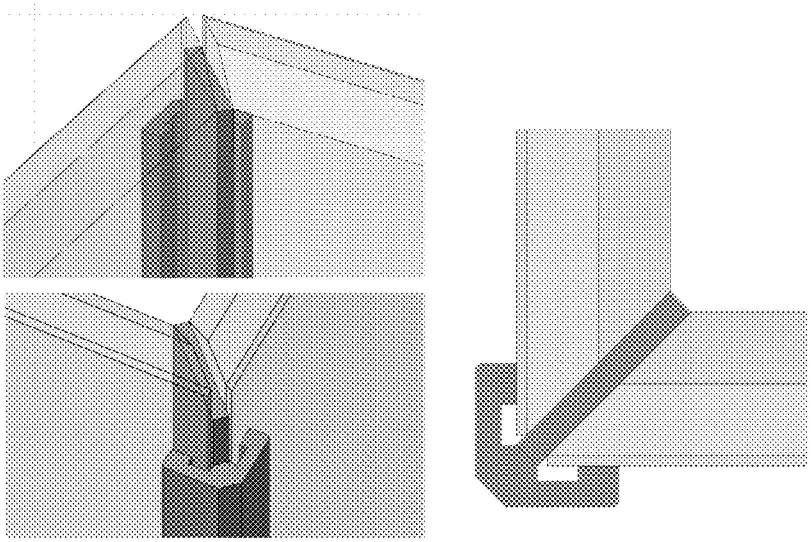
FIG. 38. Back corner glass panels connections of the Hoistway Body
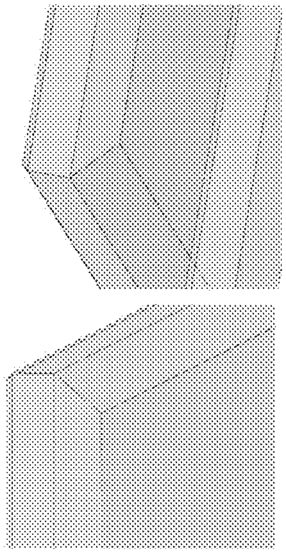
FIG. 39. Perspective views of the front corner of the Hoistway Body

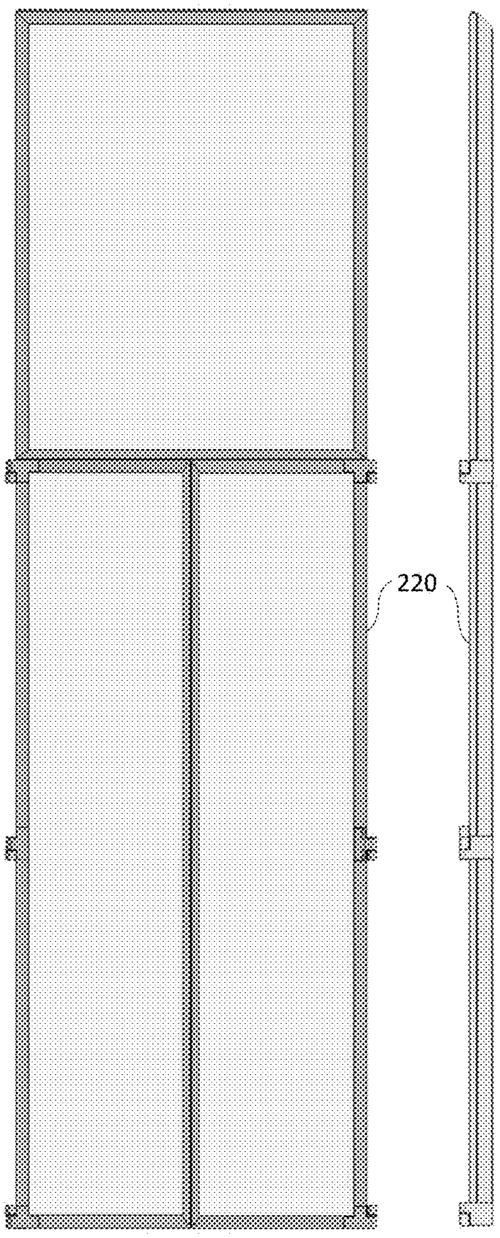
FIG. 40. Front and side views of the Hoistway Doorway Frame
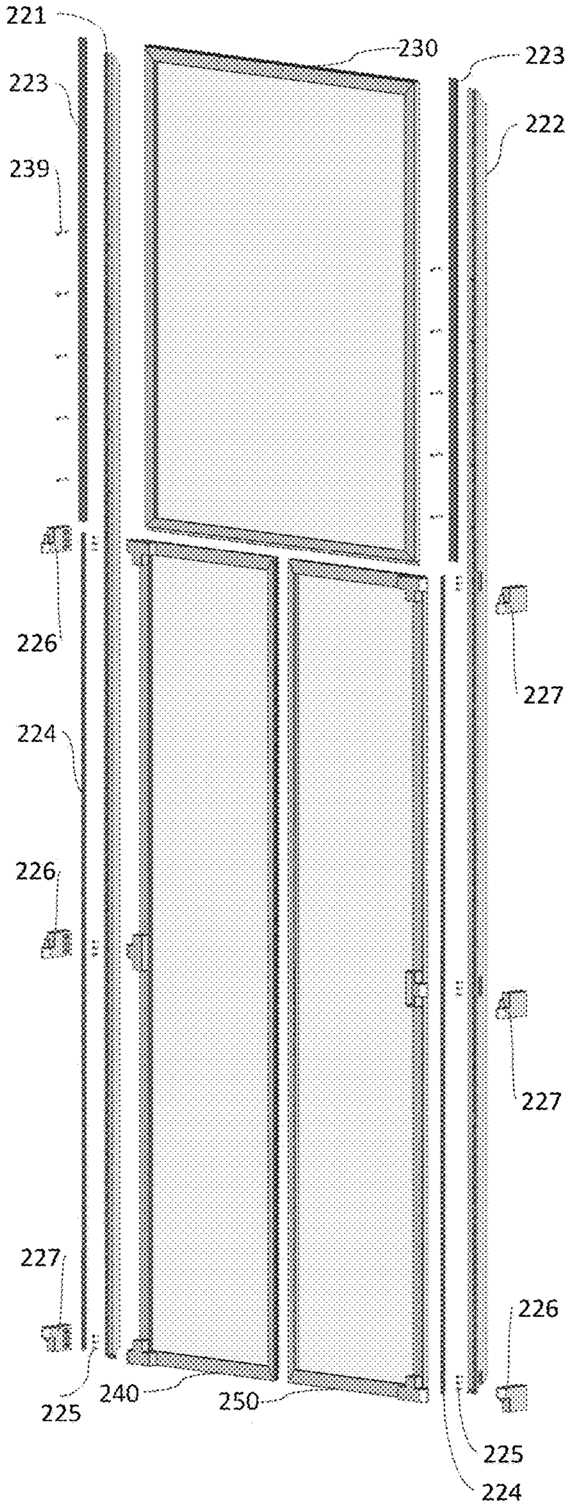
FIG. 41. Exploded front view of the Hoistway Doorway Frame
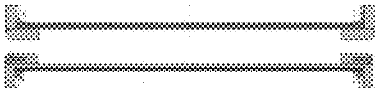
FIG. 42. Top and bottom views of the Hoistway Doorway Frame

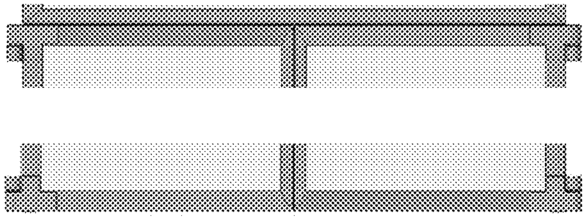
FIG. 43. Doorway Frame – upper and lower edges of Hoistway Doors
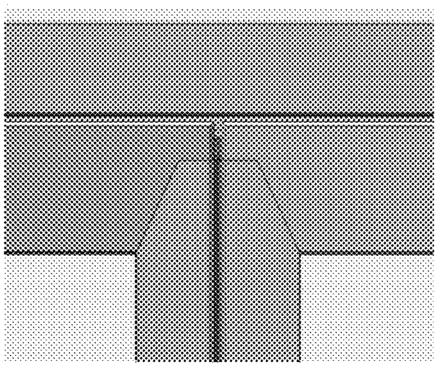
FIG. 44. Front view of middle edge connection of Hoistway Doors
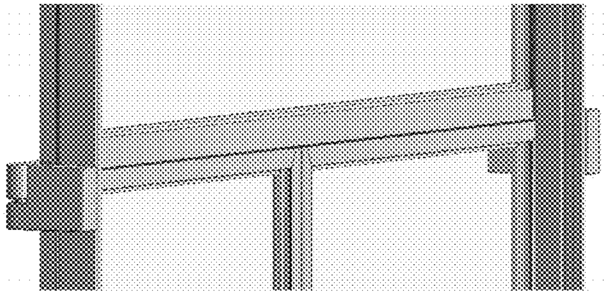
FIG. 45. Doorway Frame – back perspective view of Hoistway Doors upper edge
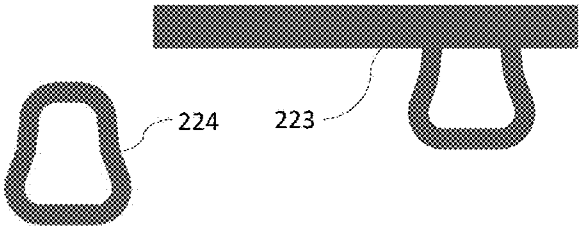
FIG. 46. Cross-section view of the Doorway Frame gaskets
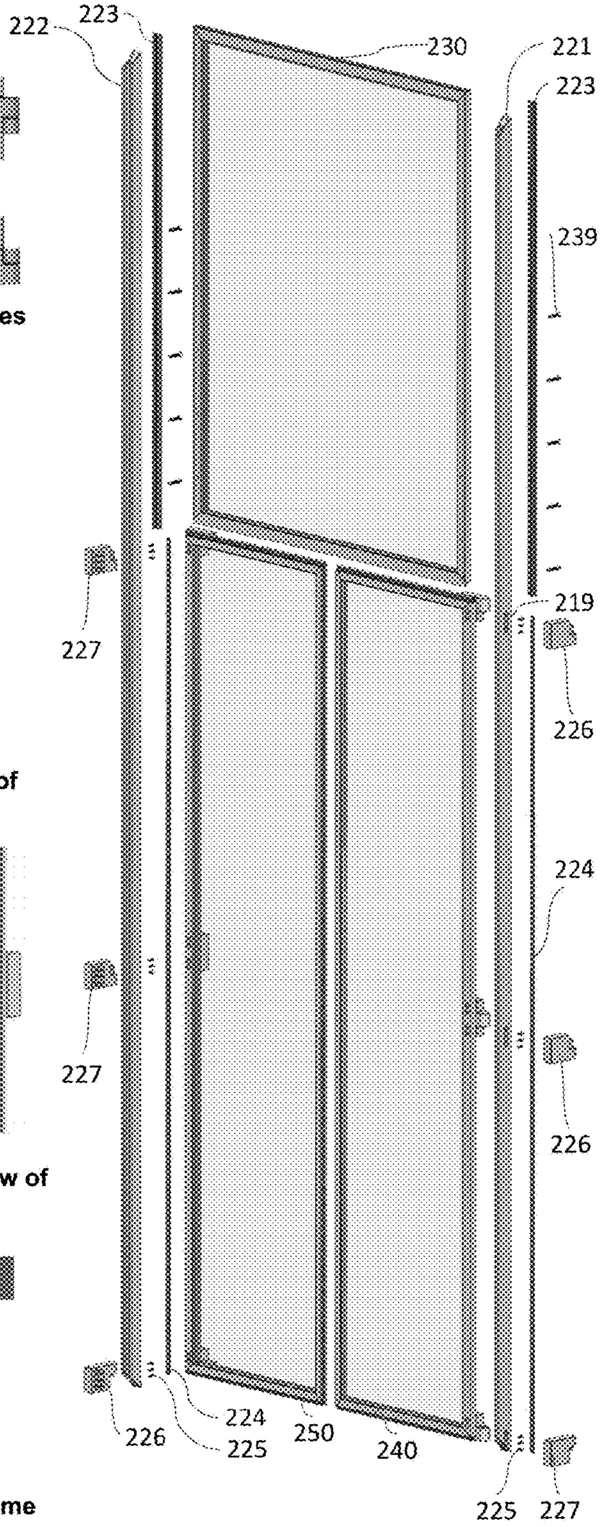
FIG. 47. Exploded back view of the Doorway Frame

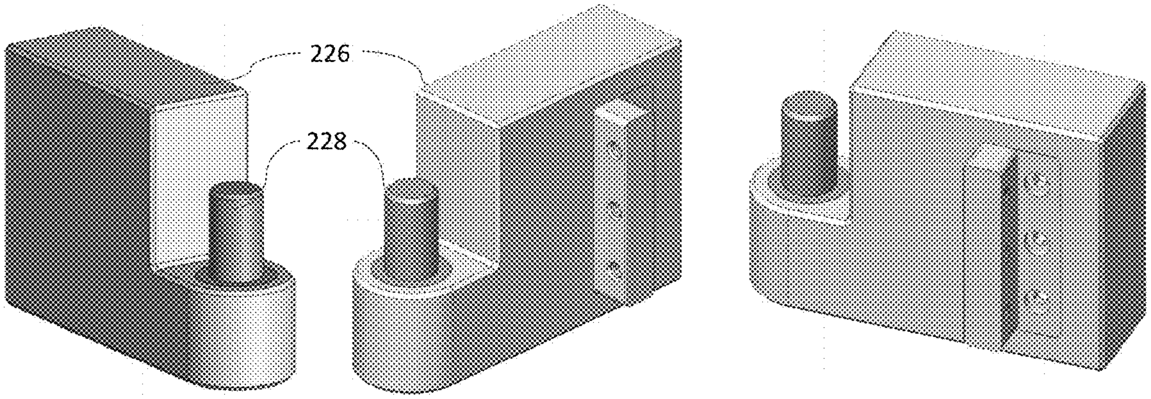
FIG. 48. Hoistway Doorway Frame – frame side door hinge perspective views
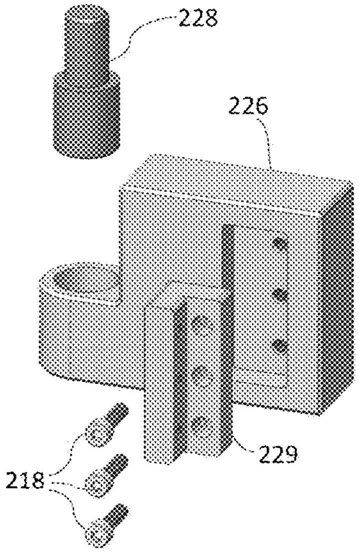
FIG. 50. Hoistway Doorway Frame – side door hinge exploded view
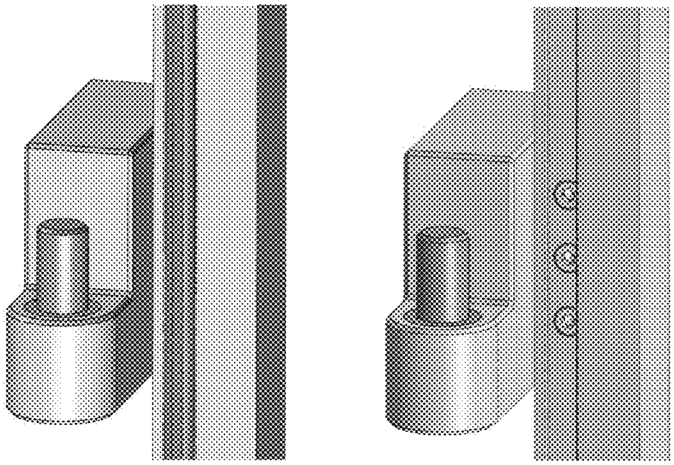
FIG. 49. Hoistway Doorway Frame hinge connection with and without vacuum seal
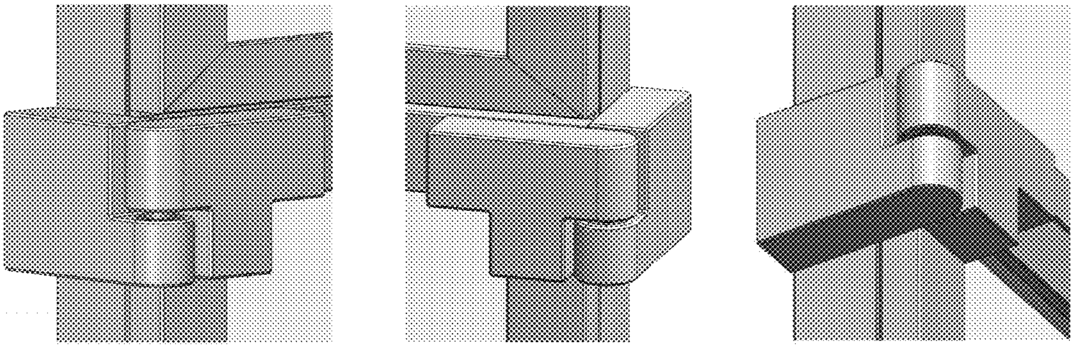
FIG. 51. Hoistway Doorway Frame side hinge connection to Hoistway Door upper hinge

FIG. 52. Hoistway Doorway Frame side hinge with the Hoistway door middle hinge
FIG. 53. Hoistway Doorway Frame hinge with the door hinge with call button housing
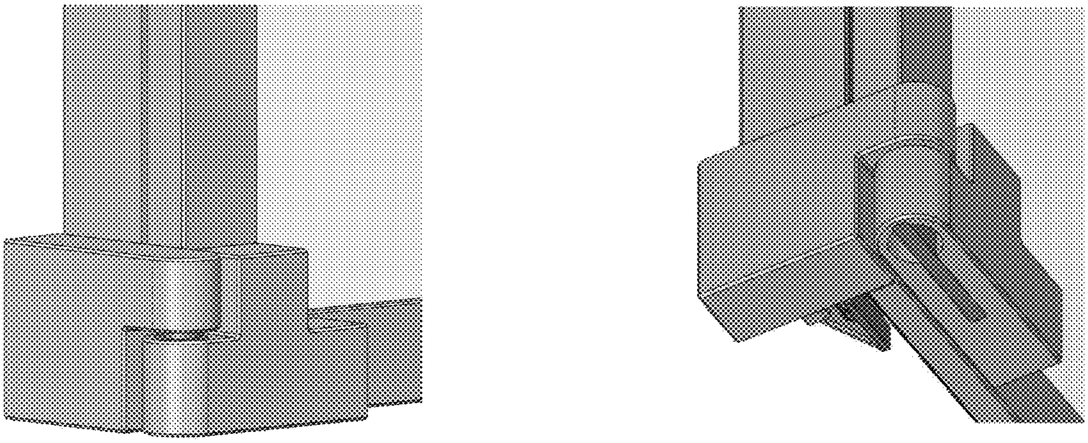
FIG. 54. Hoistway Doorway Frame side hinge with the Hoistway door lower hinge

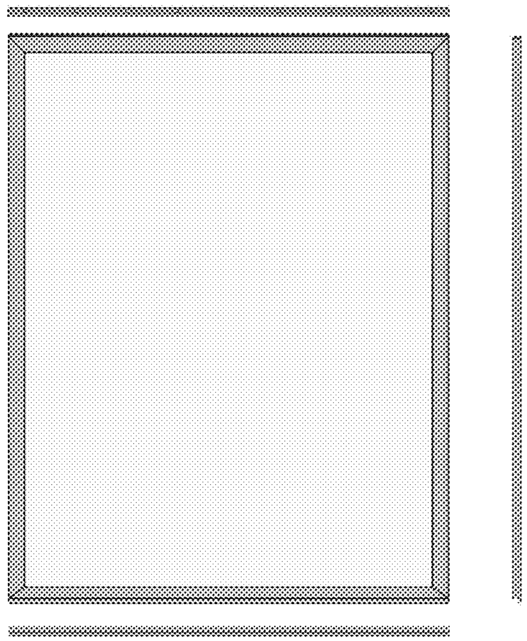
FIG. 55. Top, front, bottom and side views of the Front Panel
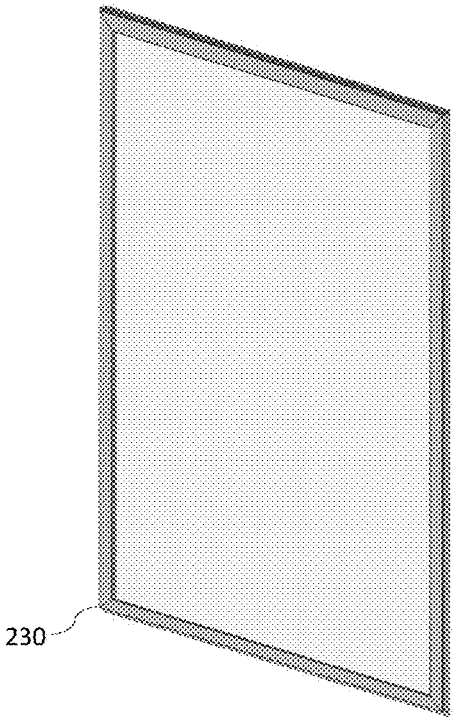
FIG. 56. Front perspective view of the Front Panel
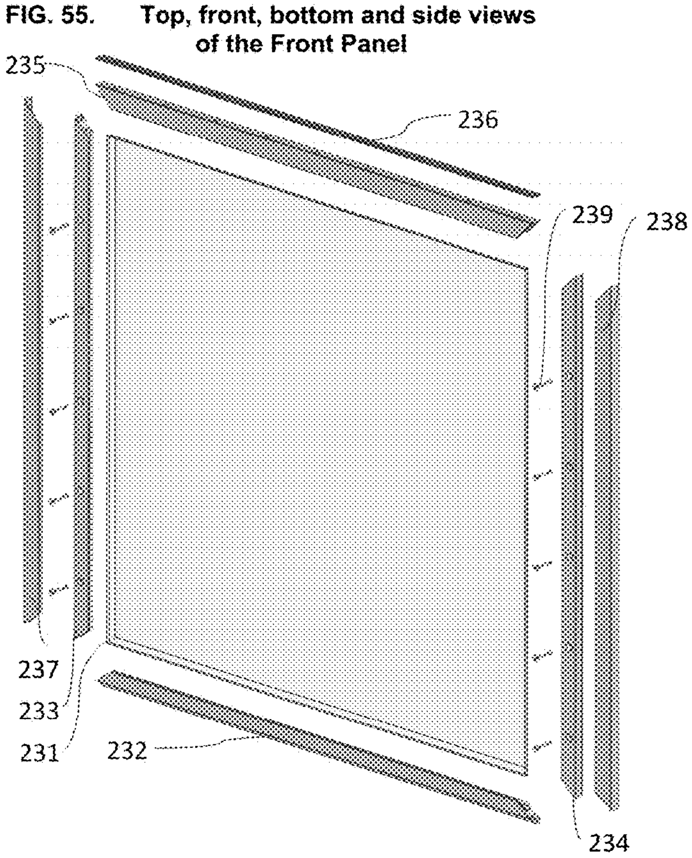
FIG. 58. Front perspective exploded view of the Front Panel
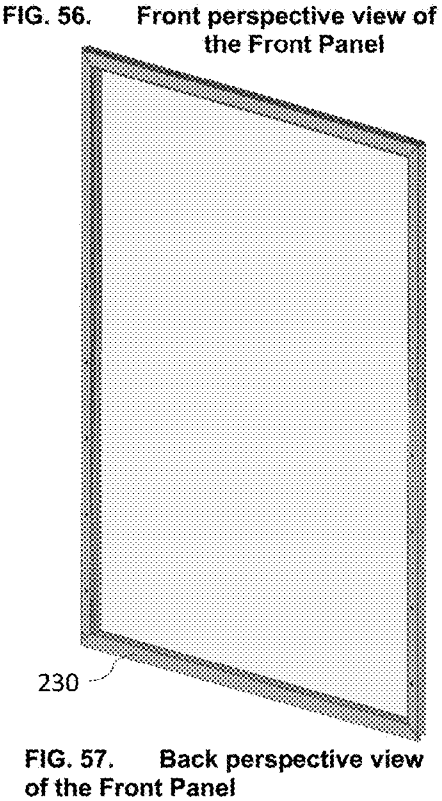
FIG. 57. Back perspective view of the Front Panel

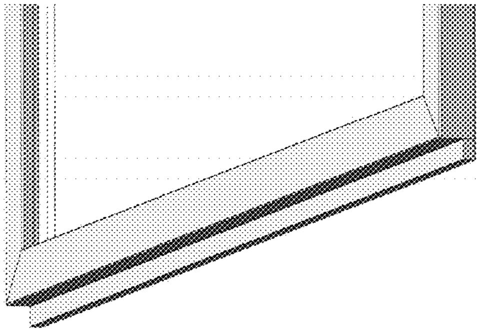
FIG. 60. Front perspective zoomed view of the Front Panel lower edge
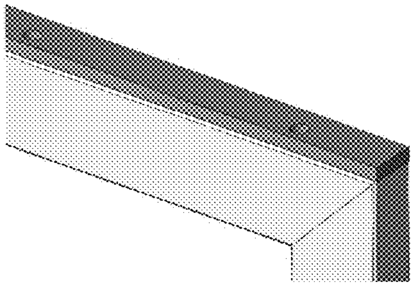
FIG. 59. Front perspective view of the Front Panel upper corner
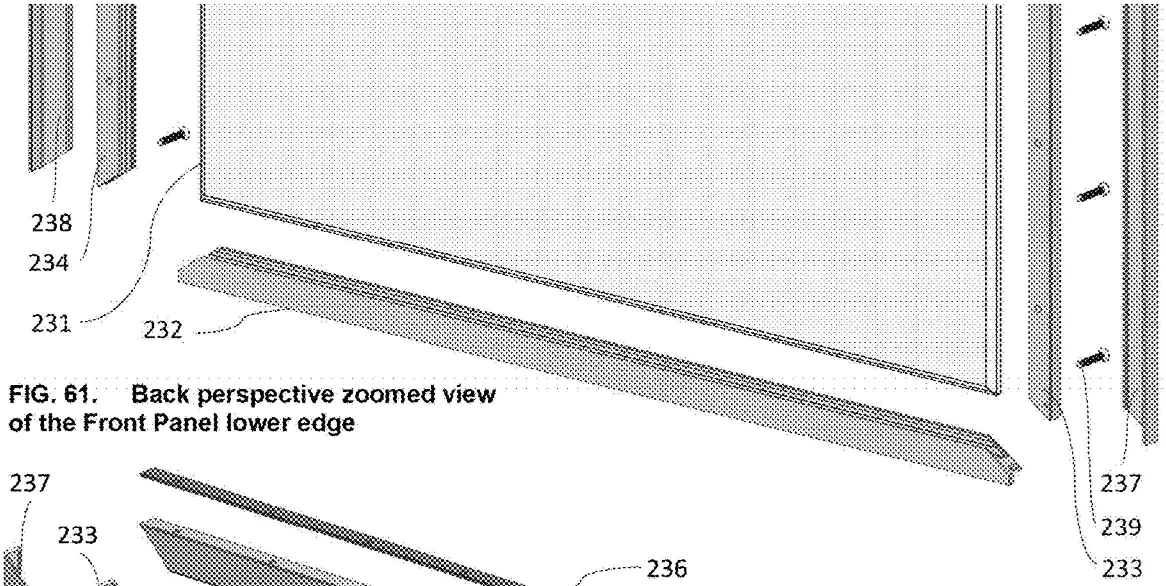
FIG. 61. Back perspective zoomed view of the Front Panel lower edge
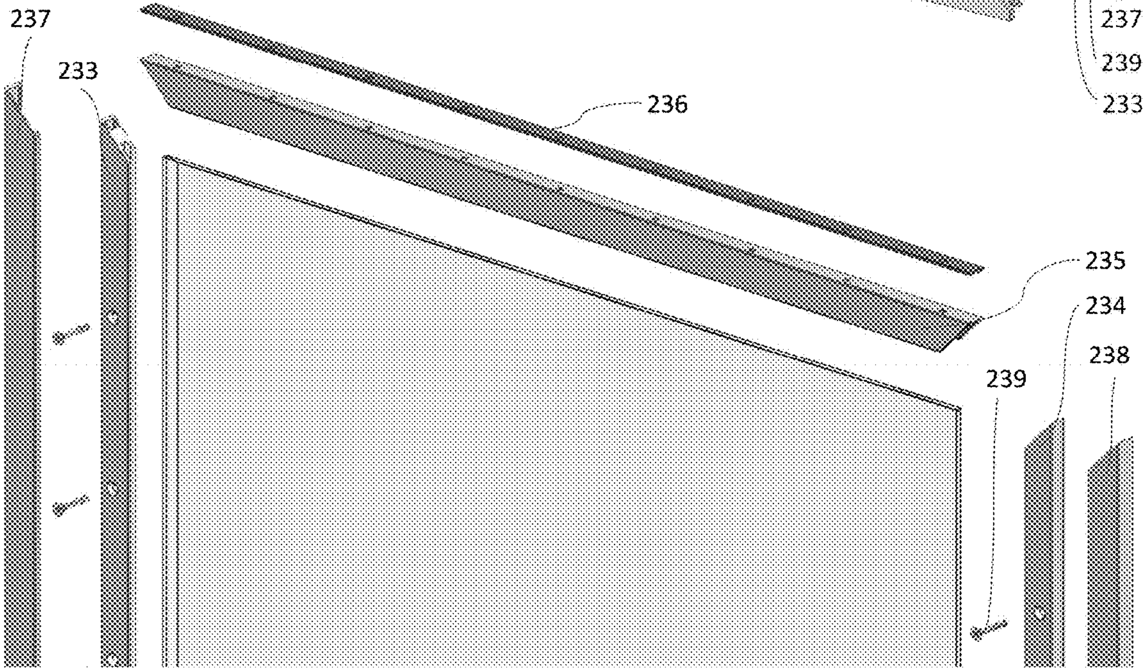
FIG. 62. Front perspective zoomed view of the Front Panel upper edge

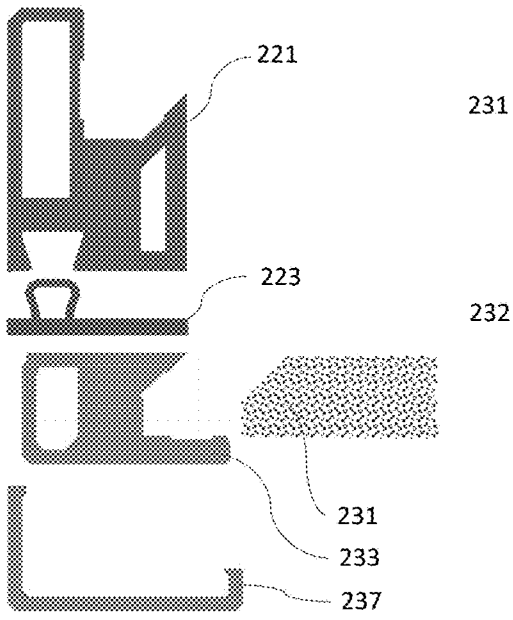
FIG. 63. Cross-section exploded view of the Doorway Frame and Front Panel connection
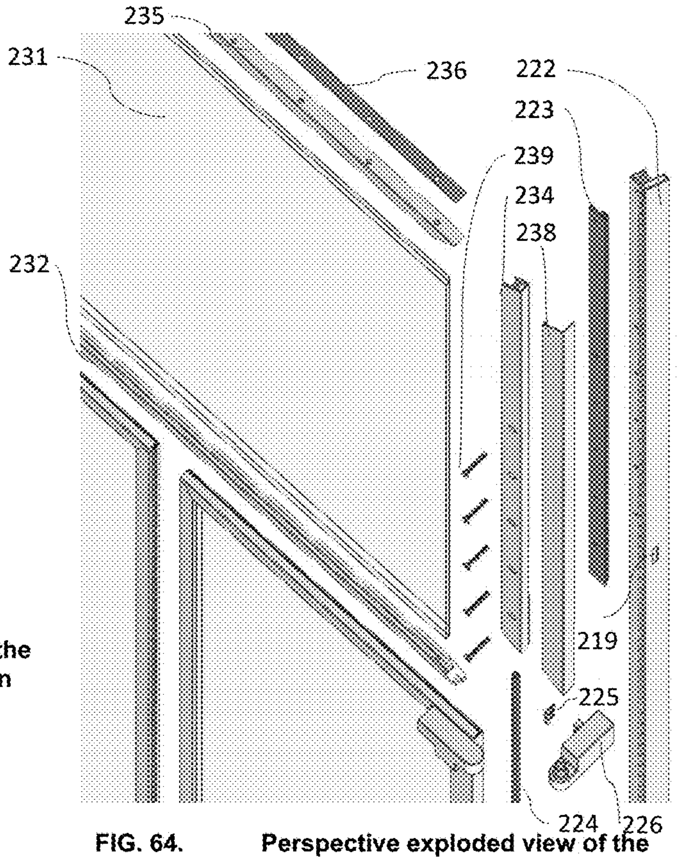
FIG. 64. Perspective exploded view of the Doorway Frame and Front Panel connection
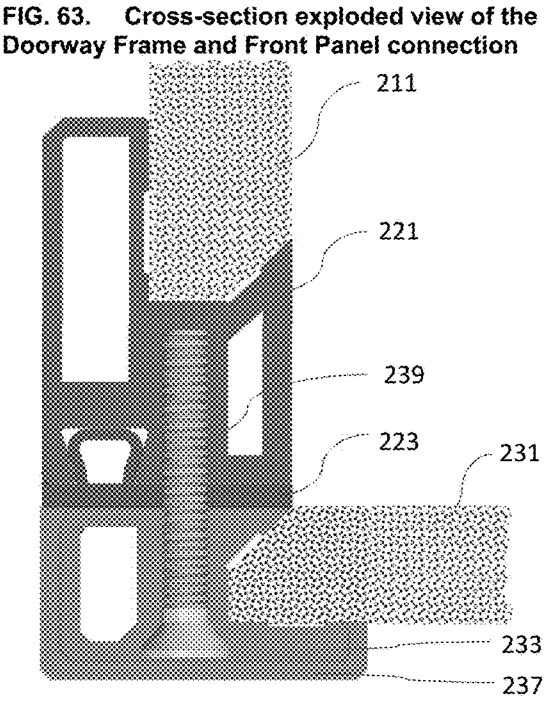
FIG. 65. Cross-section view of the Doorway Frame and Front Panel connection
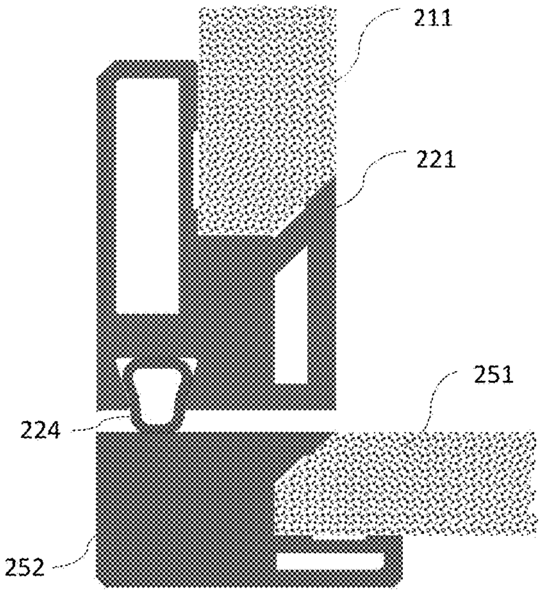
FIG. 66. Cross-section view of the Doorway Frame and the Hoistway Door connection

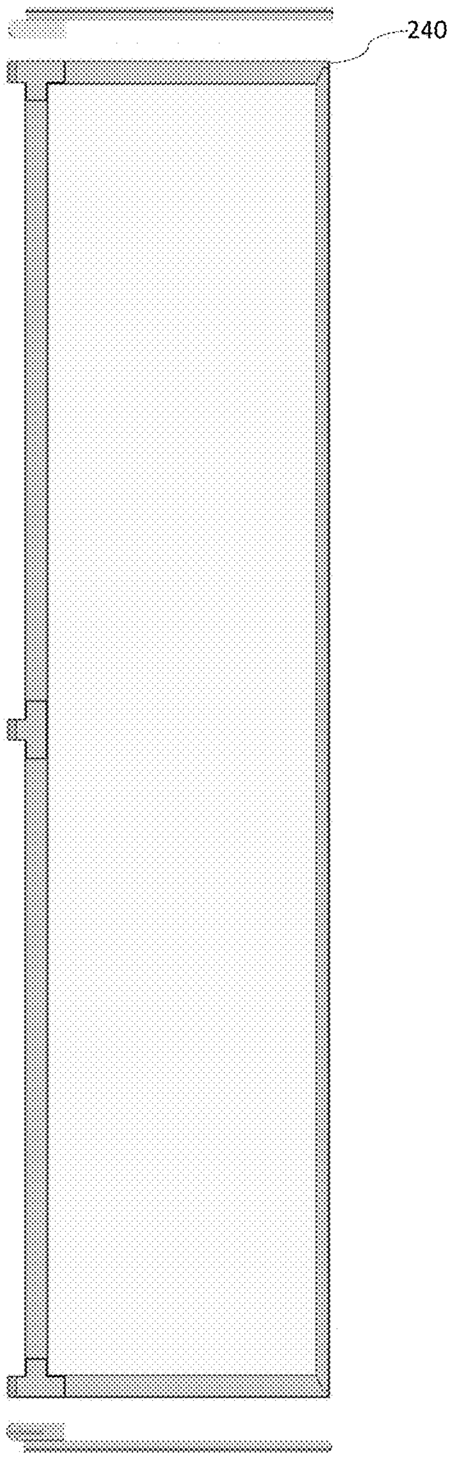
FIG. 68. Top, front and bottom views of the Hoistway Door
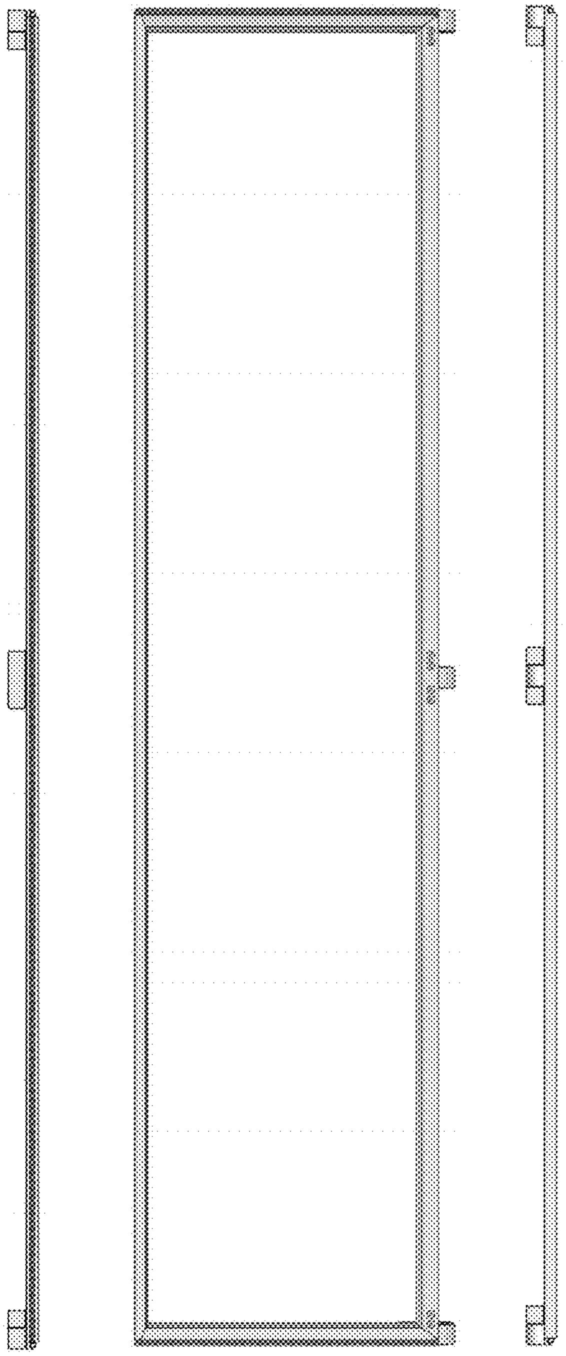
FIG. 67. Middle side, back and hinge side views of the Hoistway Door

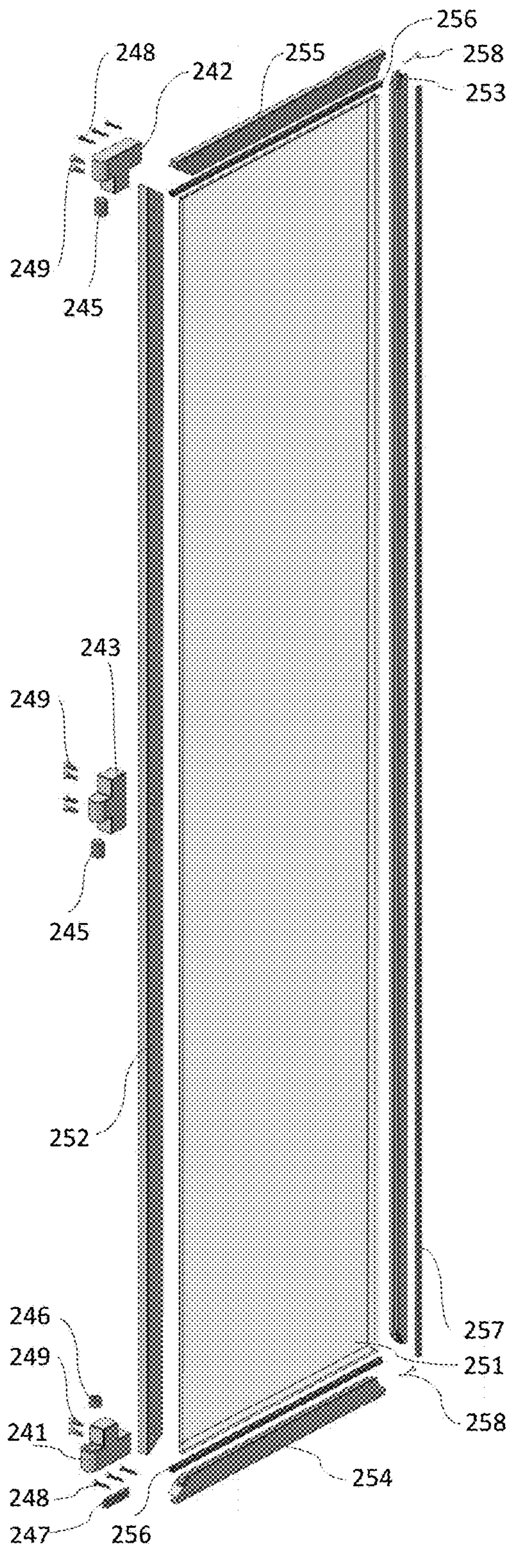
FIG. 70. Front exploded view of the Hoistway Door
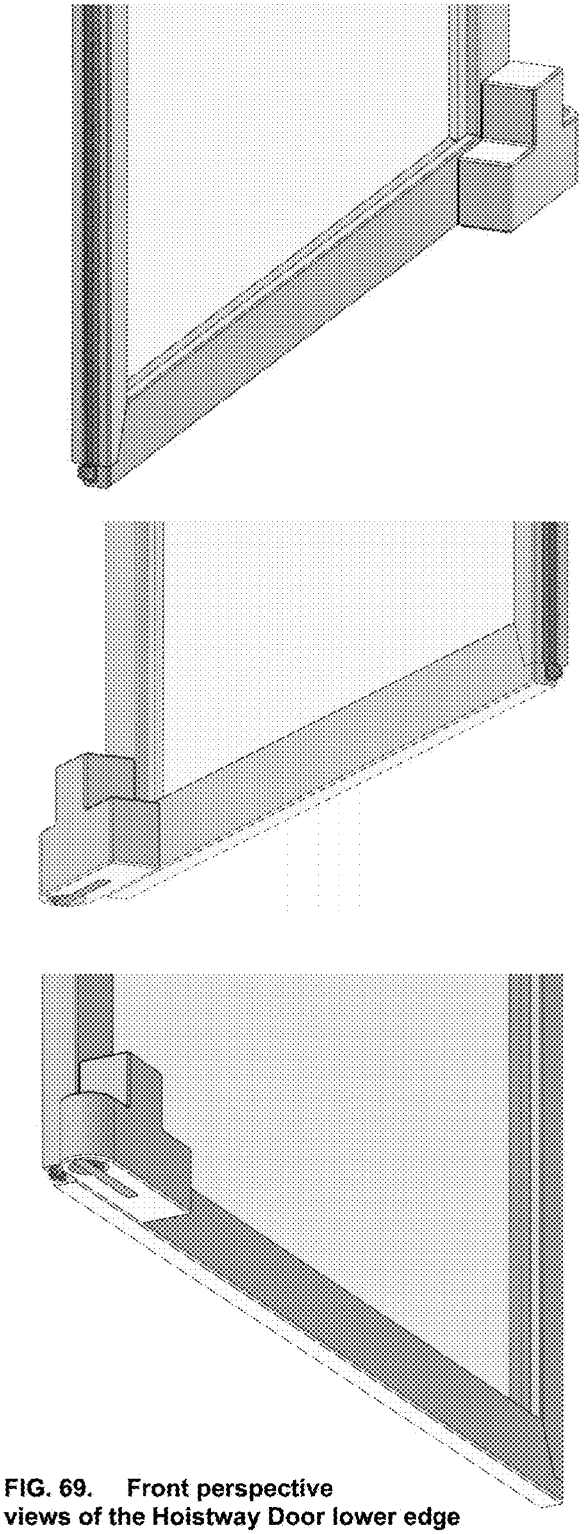
FIG. 69. Front perspective views of the Hoistway Door lower edge

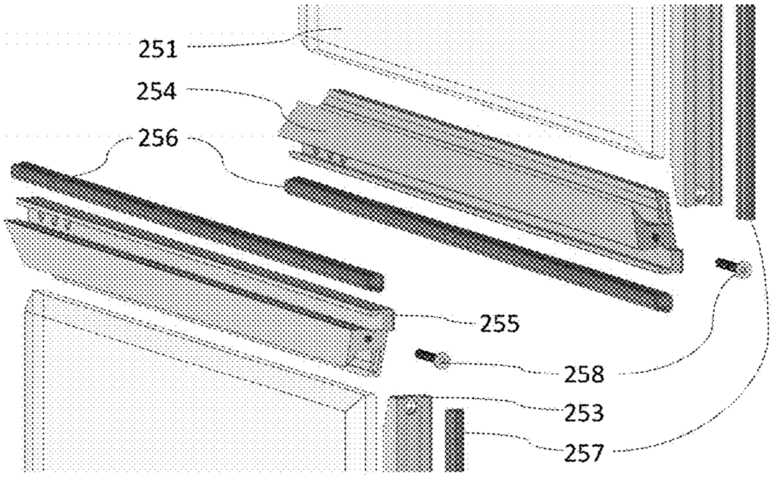
FIG. 71. Perspective exploded views of the Hoistway Door lower and upper edges
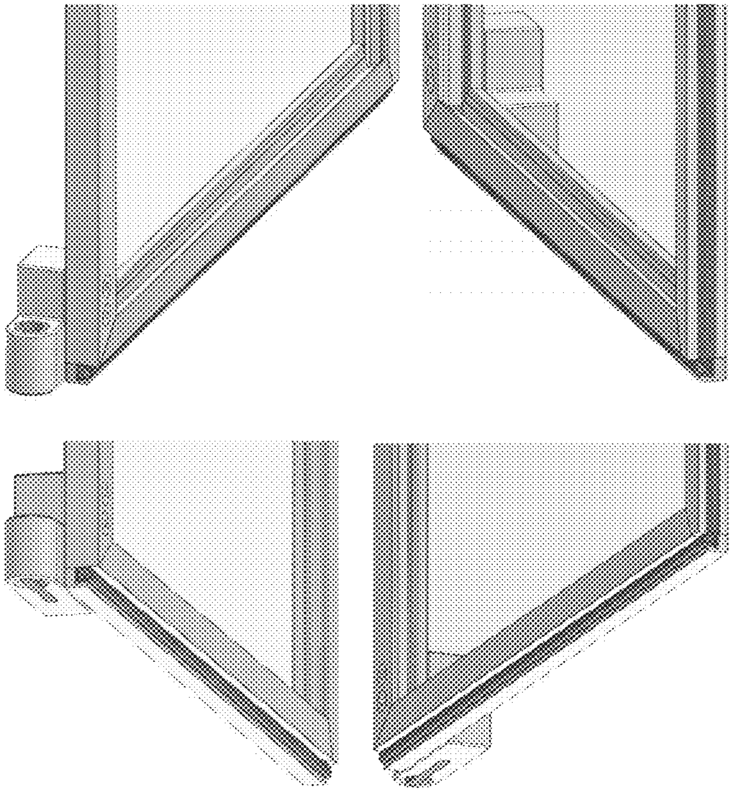
FIG. 72. Back perspective views of the Hoistway Door lower edge
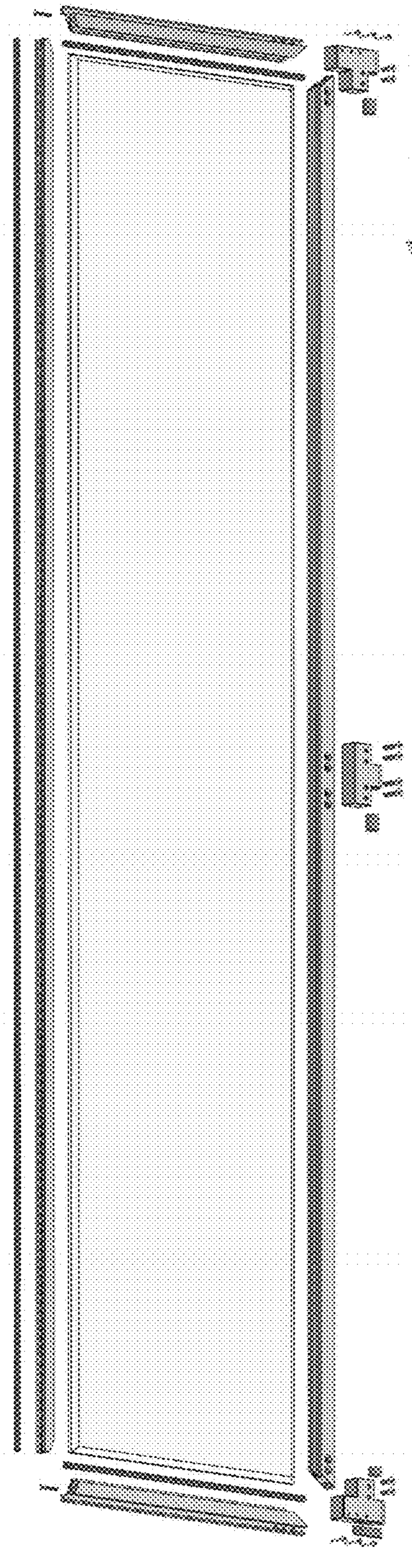
FIG. 73. Back exploded view of the Hoistway Door

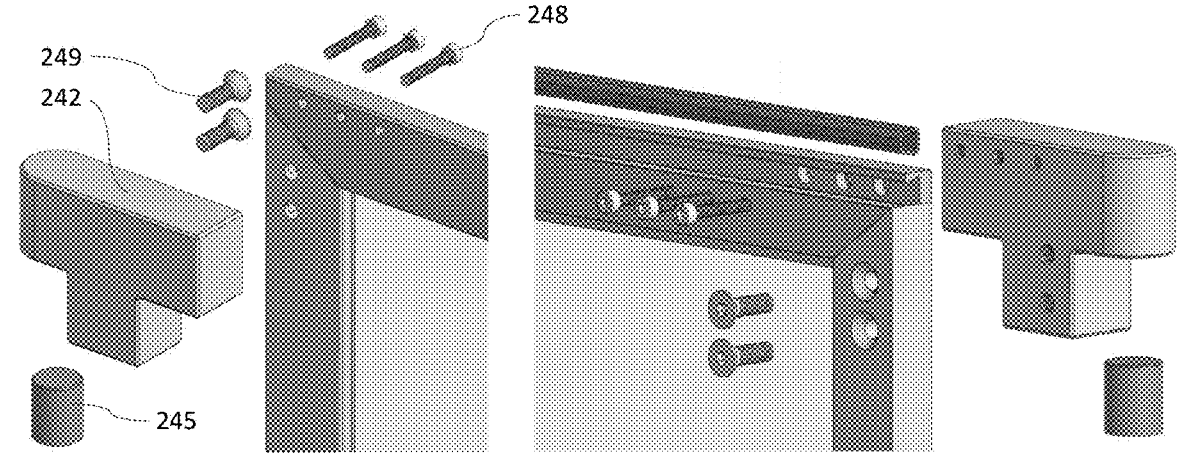
FIG. 74. Front and back top exploded views of the Hoistway Door upper hinge
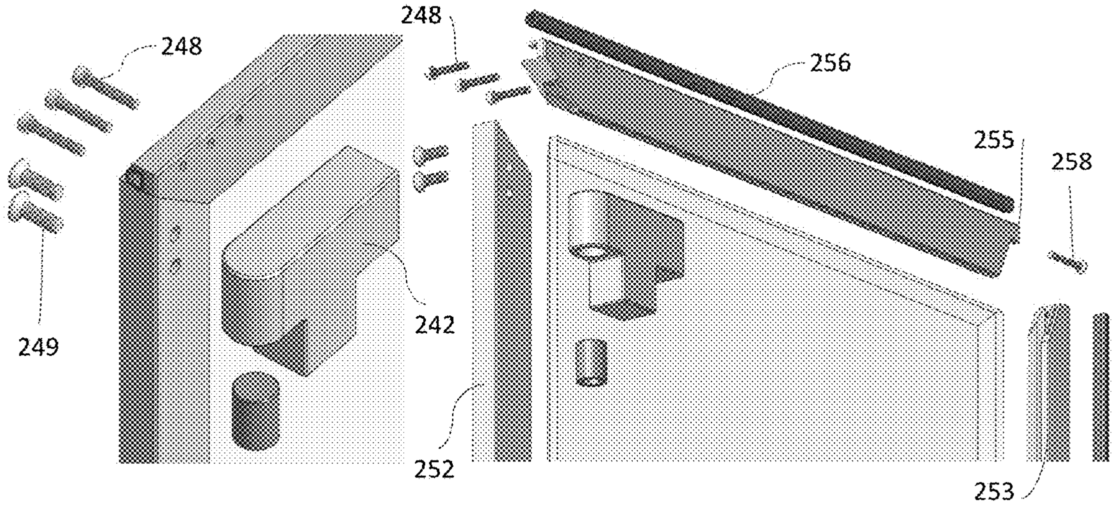
FIG. 75. Top and bottom front exploded views of the Hoistway Door upper hinge
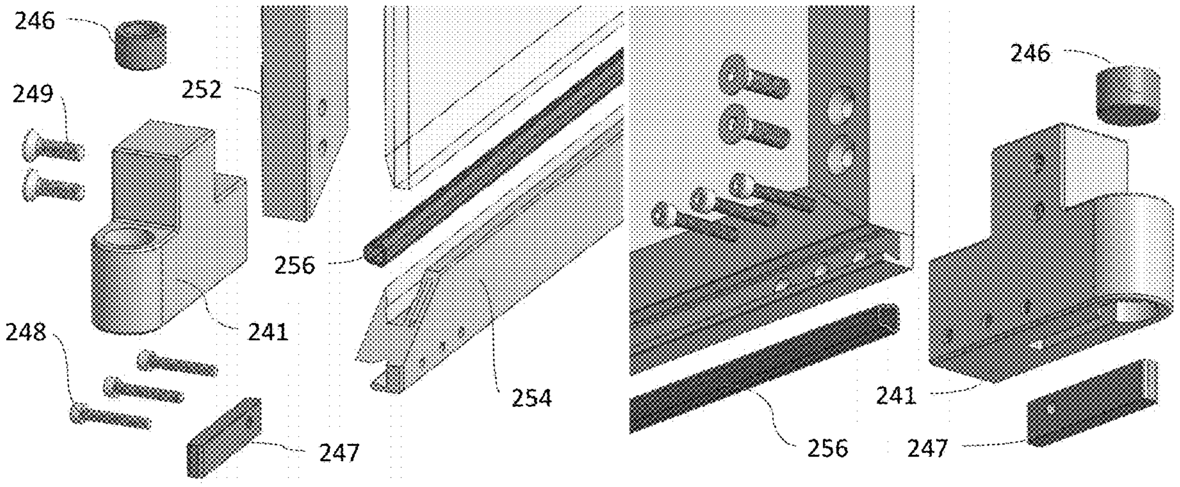
FIG. 76. Front and back exploded views of the Hoistway Door lower hinge

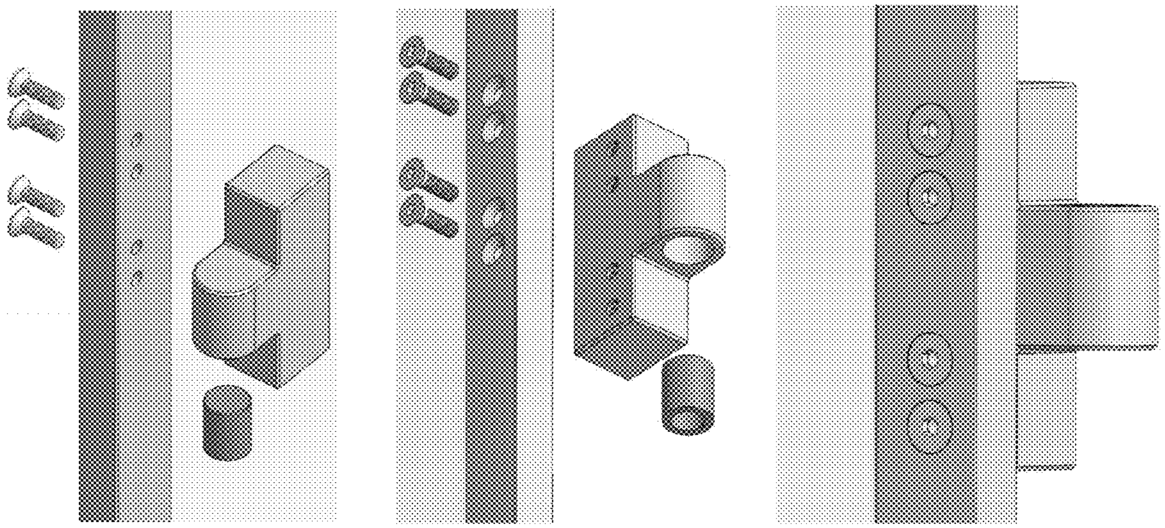
FIG. 77. Perspective views of the Hoistway Door middle hinge
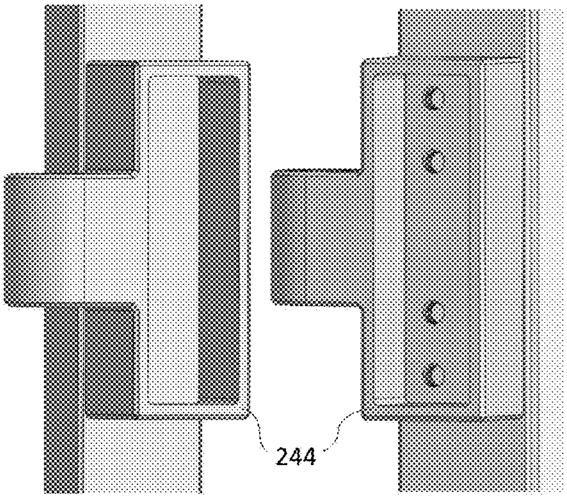
FIG. 78. Perspective views of the Hoistway Door middle hinge with call housing
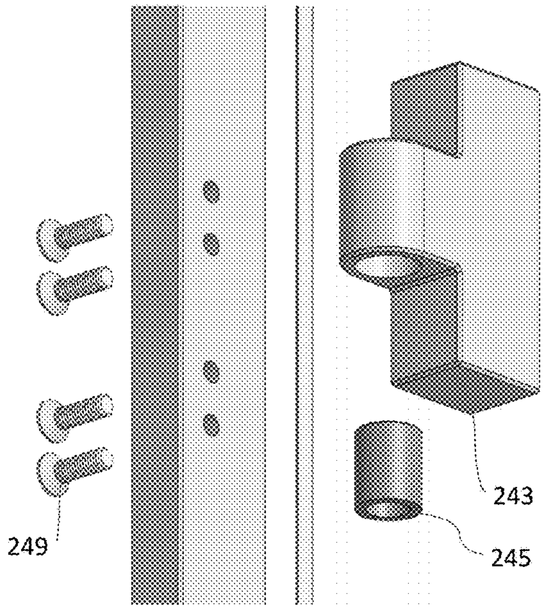
FIG. 79. Bottom perspective view of the Hoistway Door middle hinge

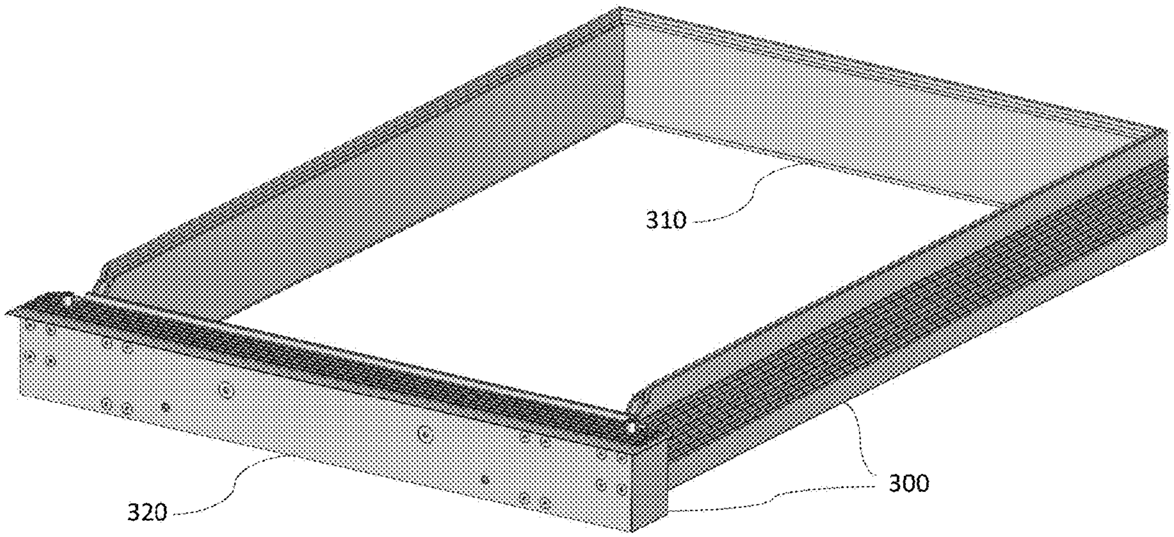
FIG. 80. Perspective view of the Hoistway Belt connected to the Hoistway Base
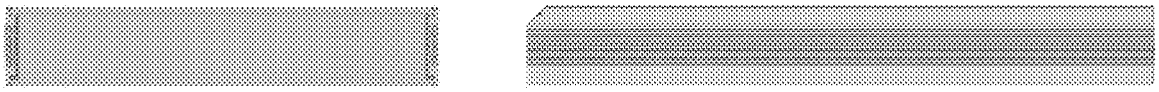
FIG. 81. Front and side views of the Hoistway Belt Frame
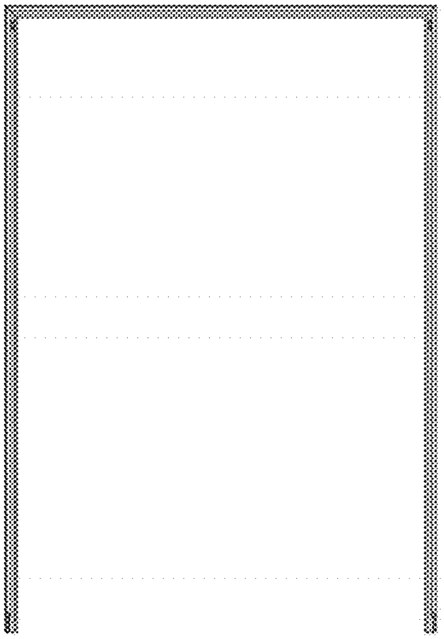
FIG. 83. Top view of the Hoistway Belt Frame
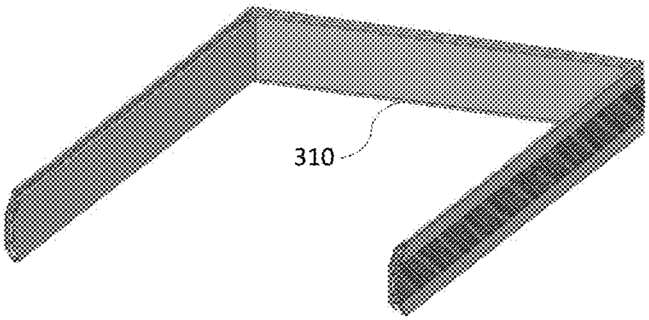
FIG. 82. Front perspective view of the Hoistway Belt Frame option at the upper floor levels
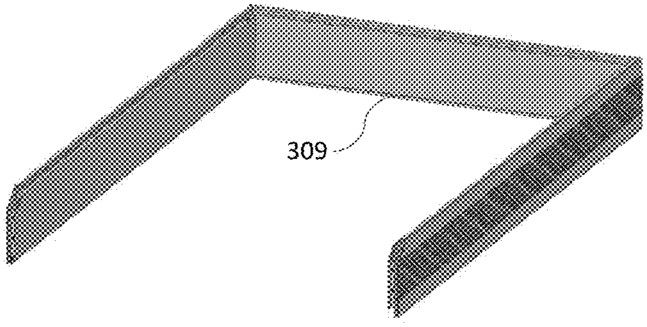
FIG. 84. Front perspective view of the Hoistway Belt Frame option at the foundation floor level

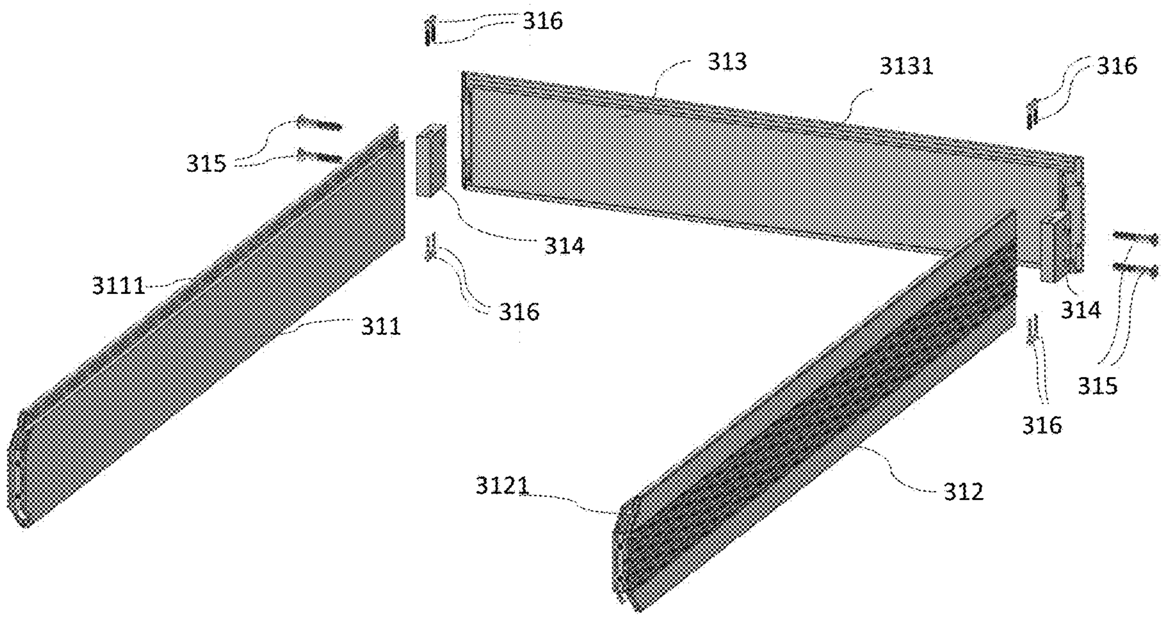
FIG. 85. Front exploded view of the Hoistway Belt Frame
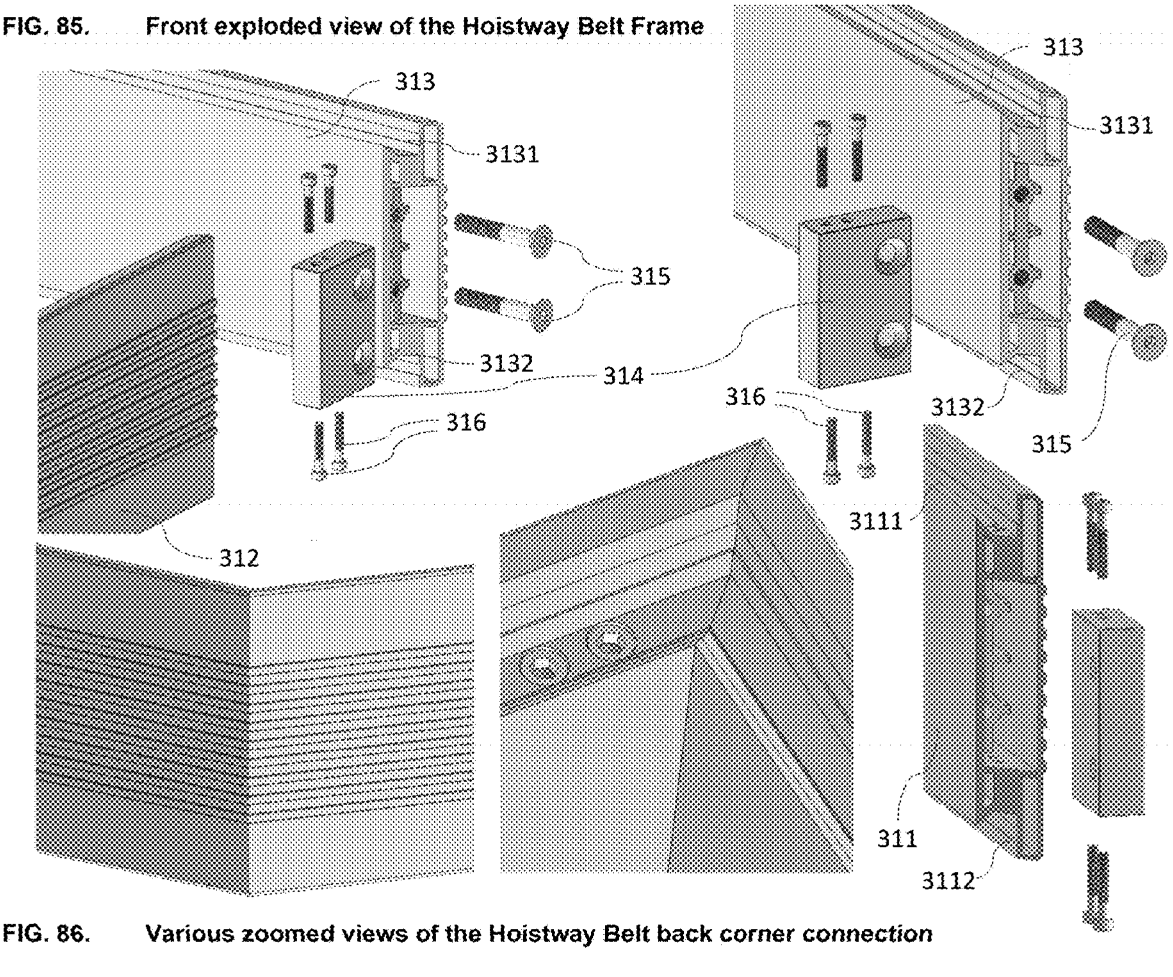
FIG. 86. Various zoomed views of the Hoistway Belt back corner connection

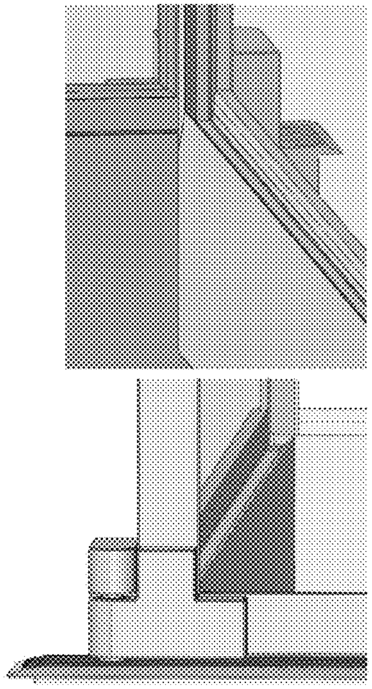
FIG. 87. Inside views of the front and back corners of the Hoistway Belt Frame
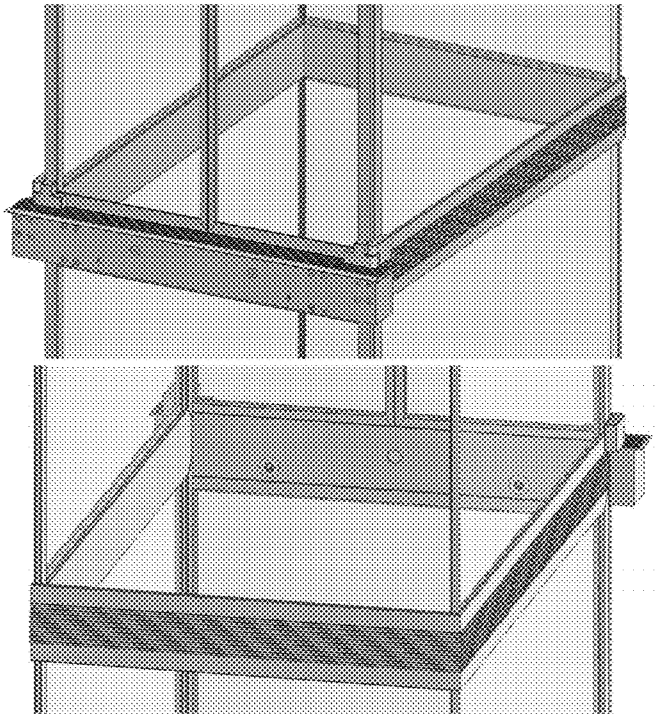
FIG. 88. Front and back perspective views of the Hoistway Belt Frame
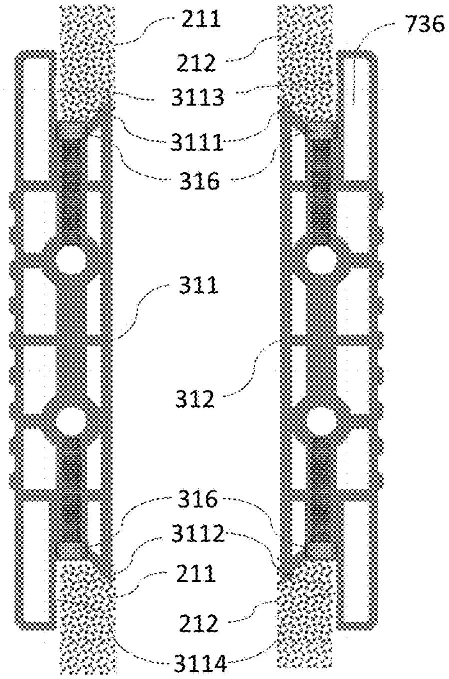
FIG. 89. Cross-section view of the Hoistway Belt Frame and Hoistway Glass Panels
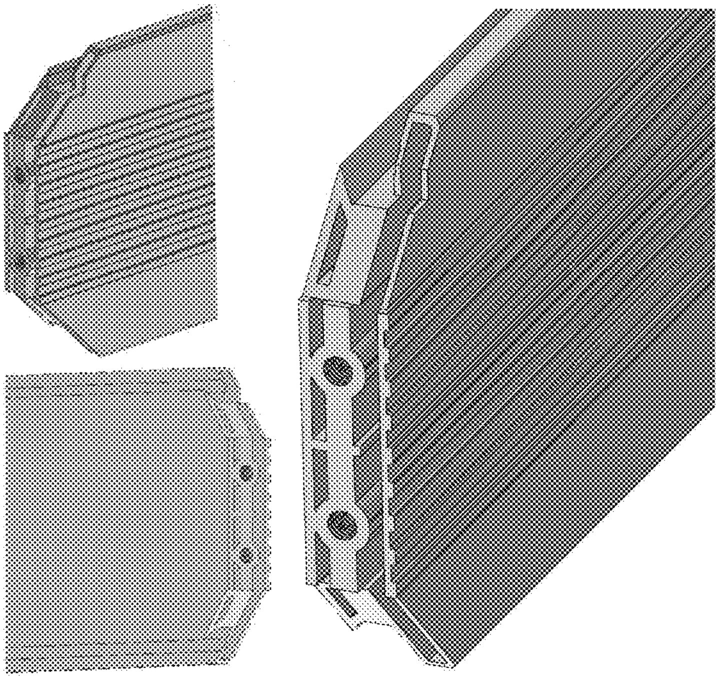
FIG. 90. Various views of the Hoistway Belt Frame front corner

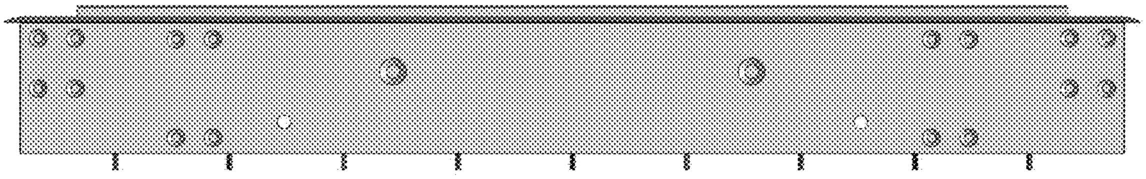
FIG. 91. Front view of the Hoistway Base Body
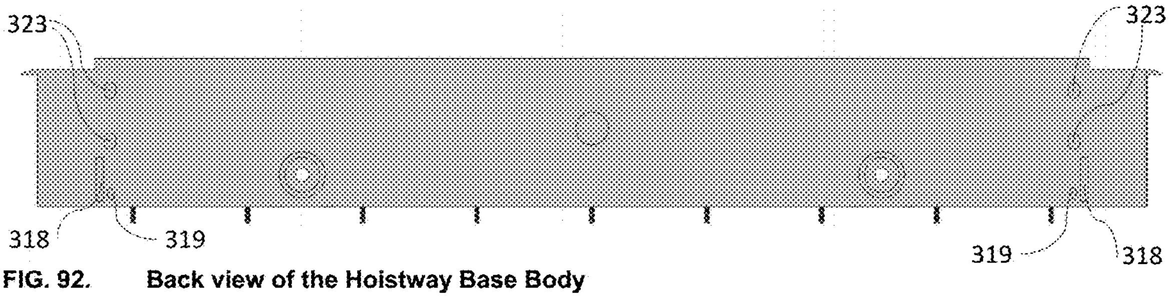
FIG. 92. Back view of the Hoistway Base Body
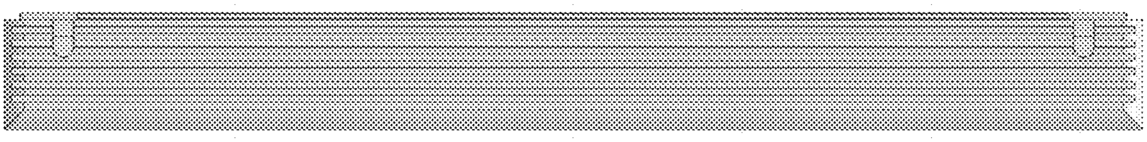
FIG. 93. Top view of the Hoistway Base Body
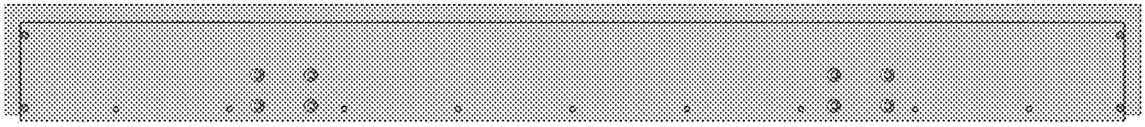
FIG. 94. Bottom view of the Hoistway Base Body
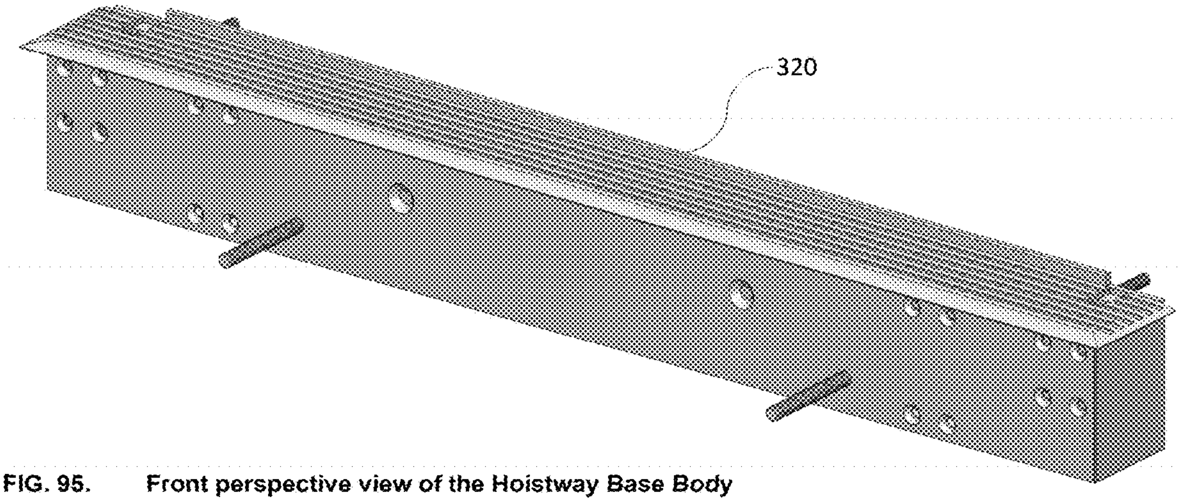
FIG. 95. Front perspective view of the Hoistway Base Body

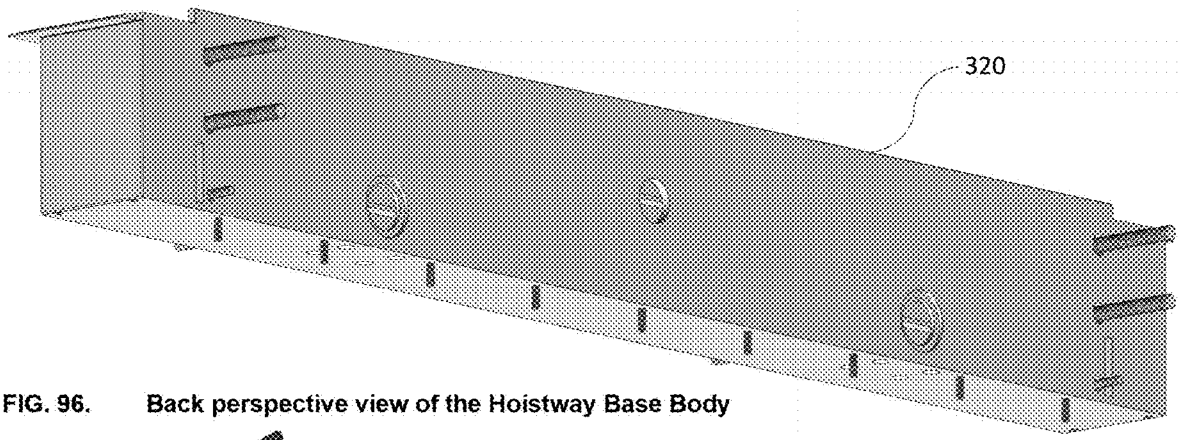
FIG. 96. Back perspective view of the Hoistway Base Body
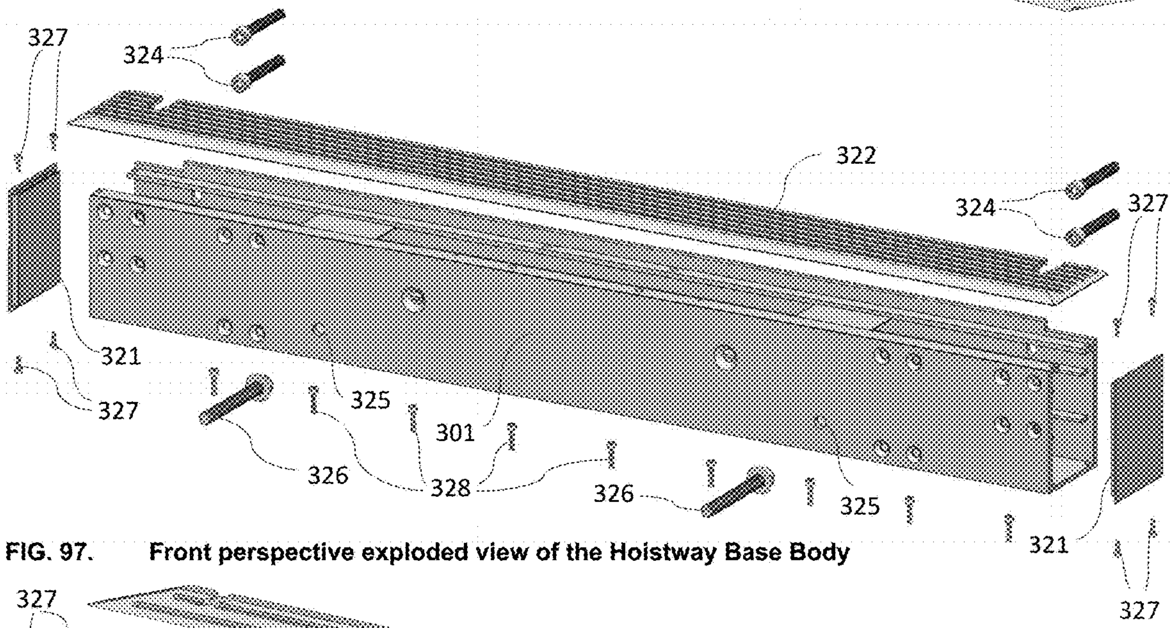
FIG. 97. Front perspective exploded view of the Hoistway Base Body
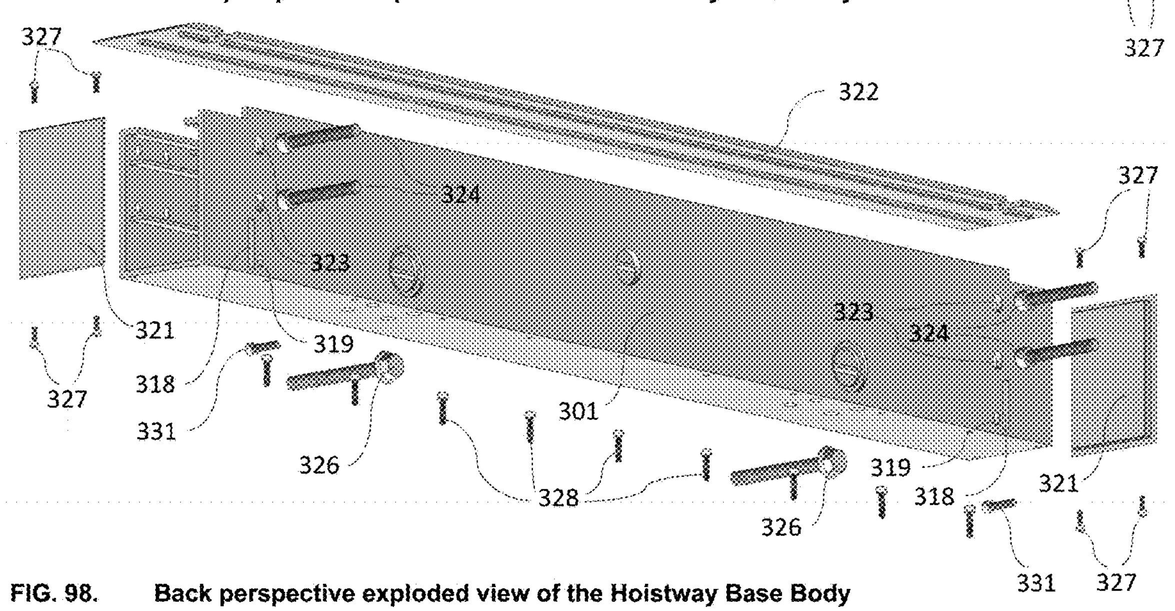
FIG. 98. Back perspective exploded view of the Hoistway Base Body

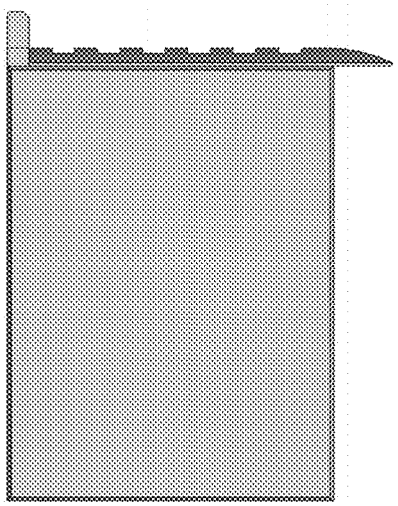
FIG. 99. Side view of the Hoistway Base Body
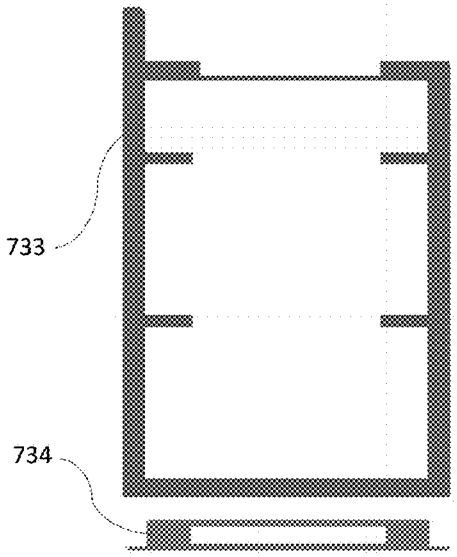
FIG. 100. Cross-sectional views of the Hoistway Base Body and the side cover
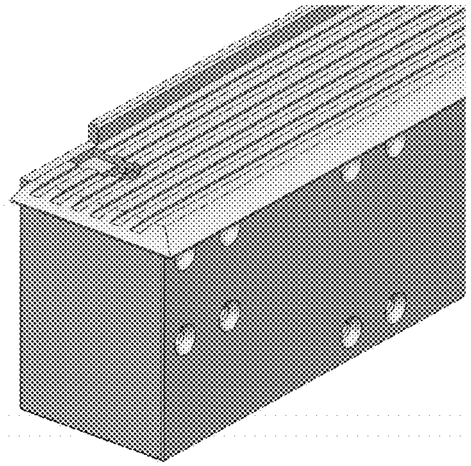
FIG. 101. Zoomed front angle view of the Hoistway Base Body
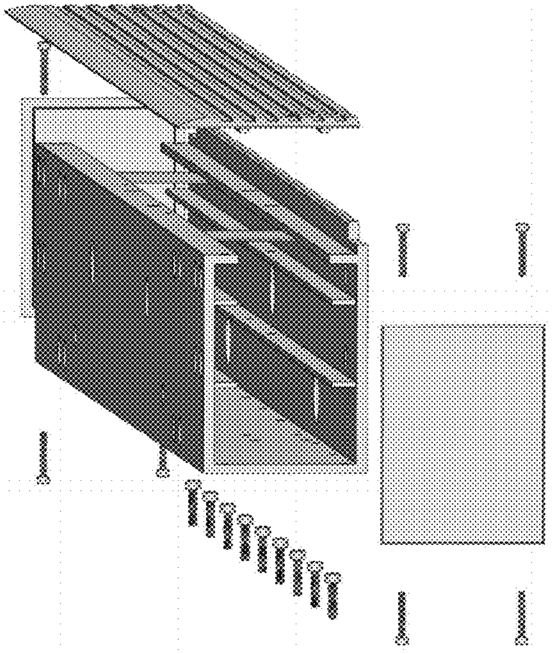
FIG. 102. Exploded angle view of the Hoistway Base Body
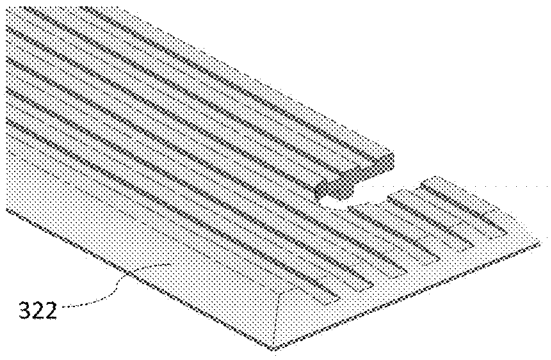
FIG. 103. Perspective zoomed and cross-section views of the Hoistway Base top cover

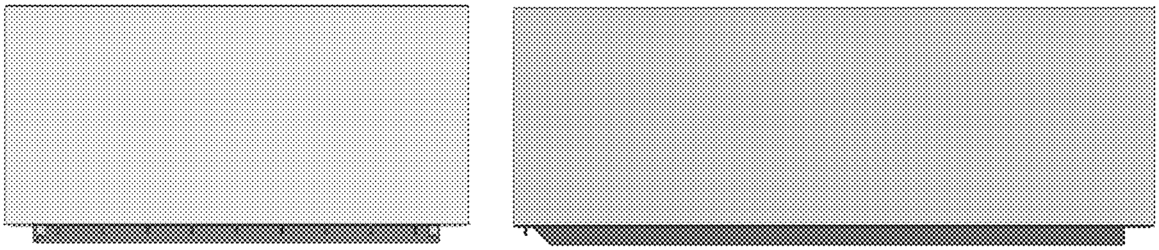
FIG. 104. Front and side views of the Machine Room (MR)
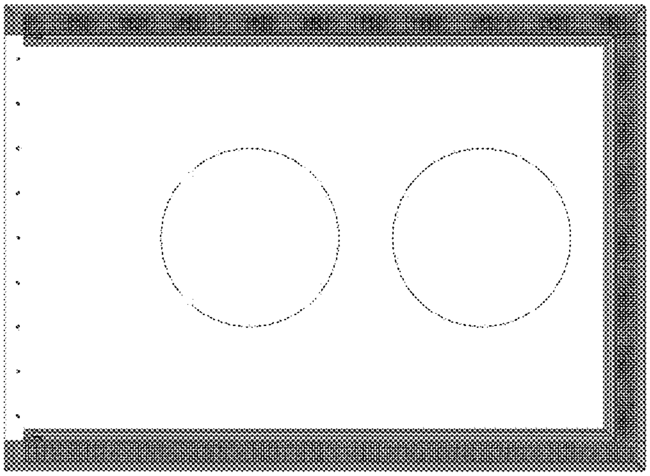
FIG. 105. Bottom view of the MR
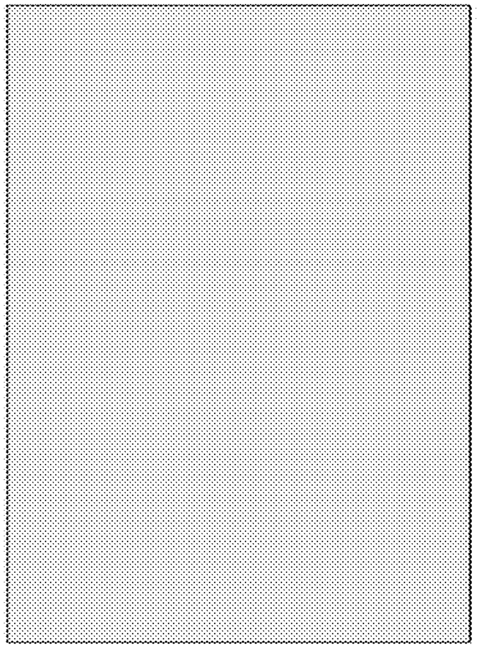
FIG. 106. Top view of the MR
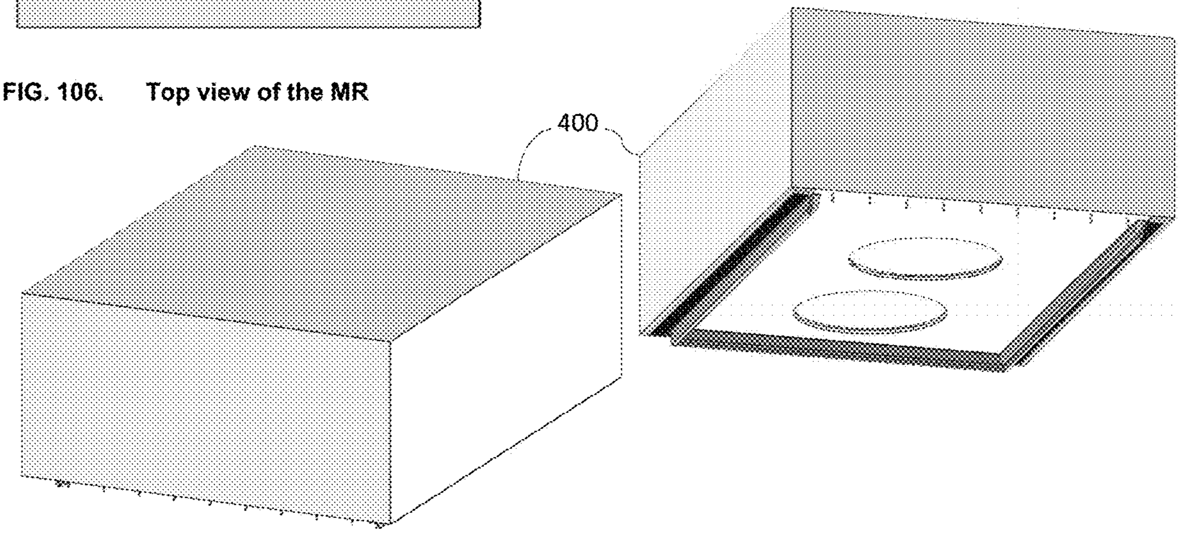
FIG. 107. Top and bottom perspective views of the MR

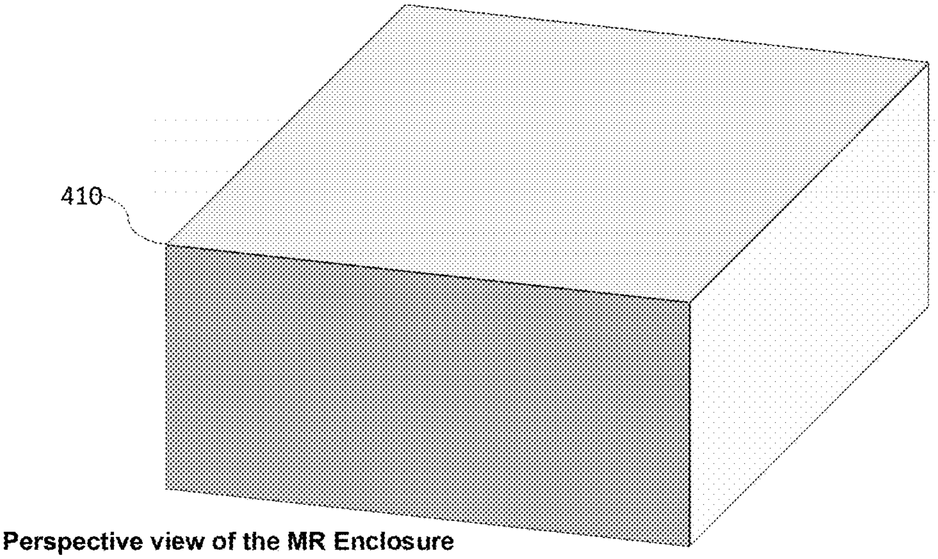
FIG. 108. Perspective view of the MR Enclosure
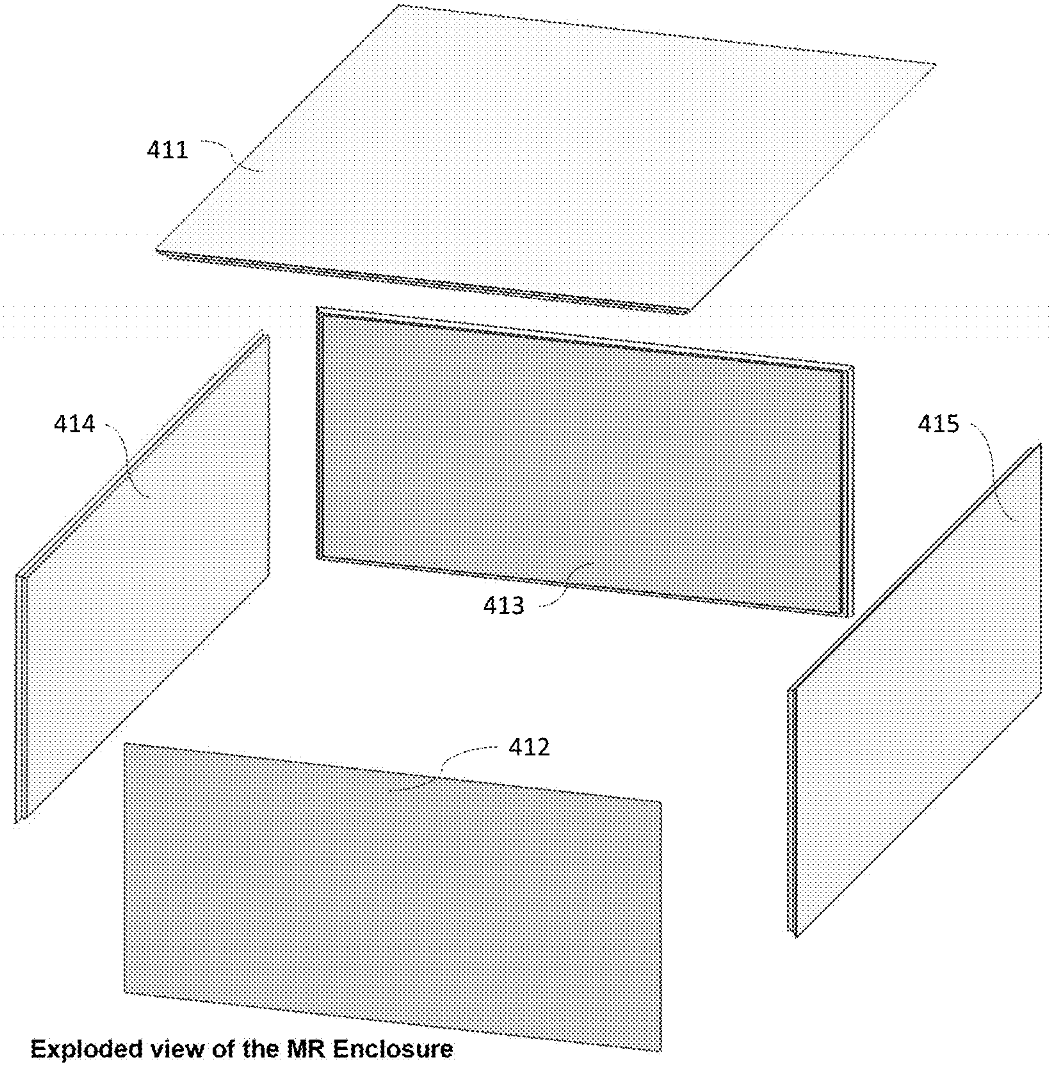
FIG. 109. Exploded view of the MR Enclosure

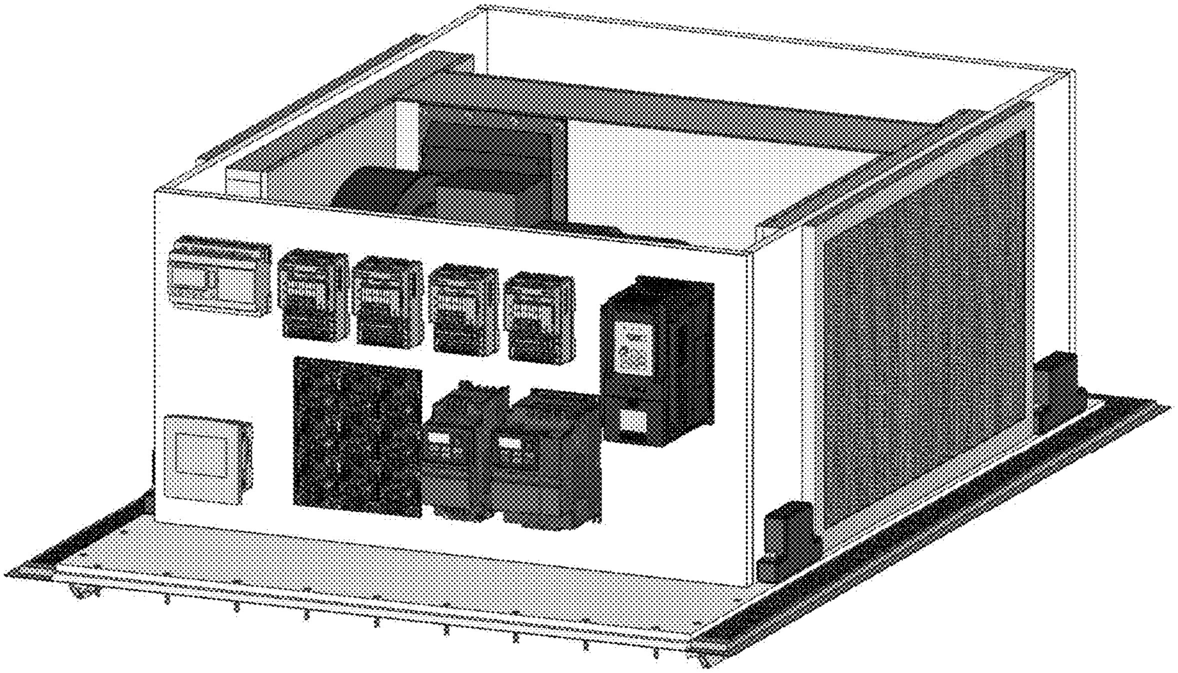
FIG. 110. Perspective view of the MR with exposed MR Electronics
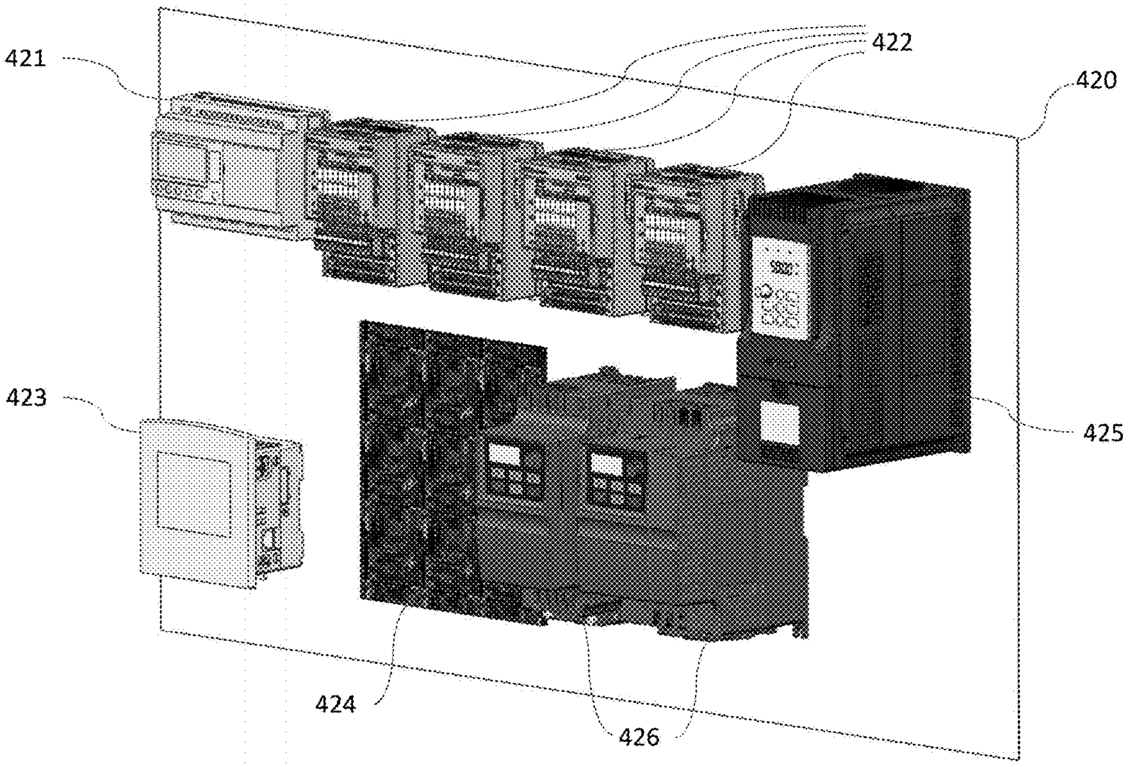
FIG. 111. Perspective views of the MR Electronics

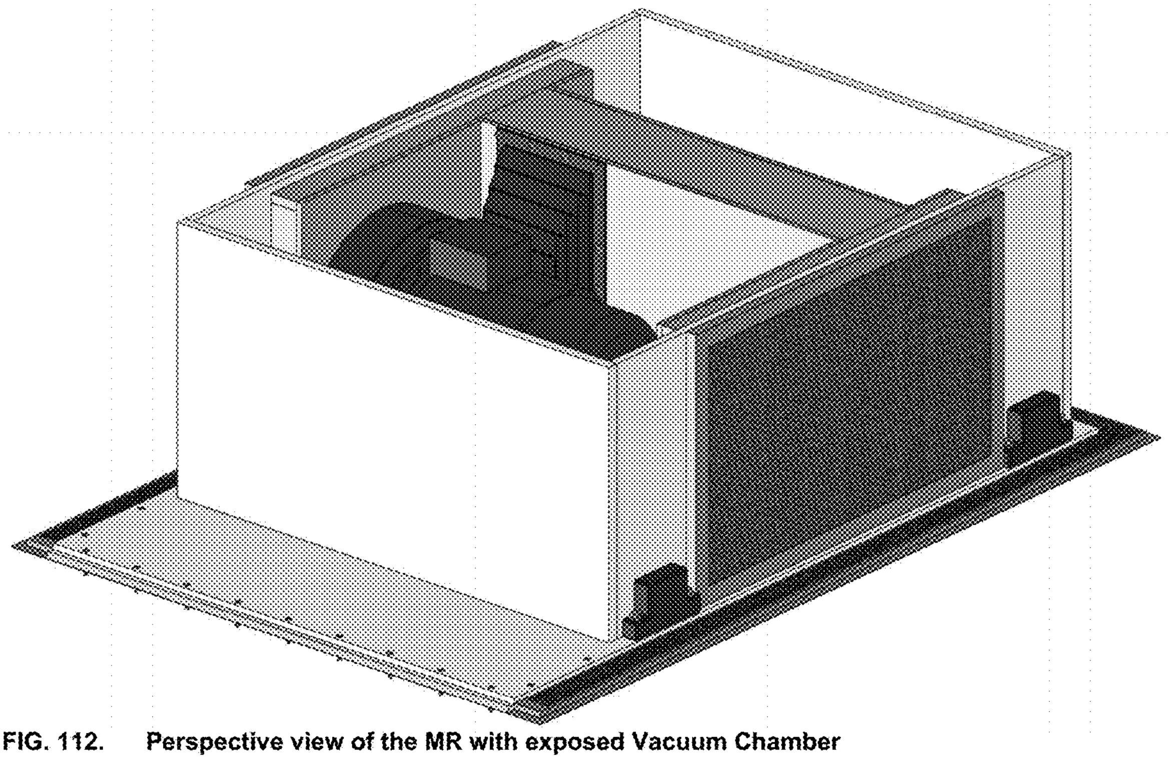
FIG. 112. Perspective view of the MR with exposed Vacuum Chamber
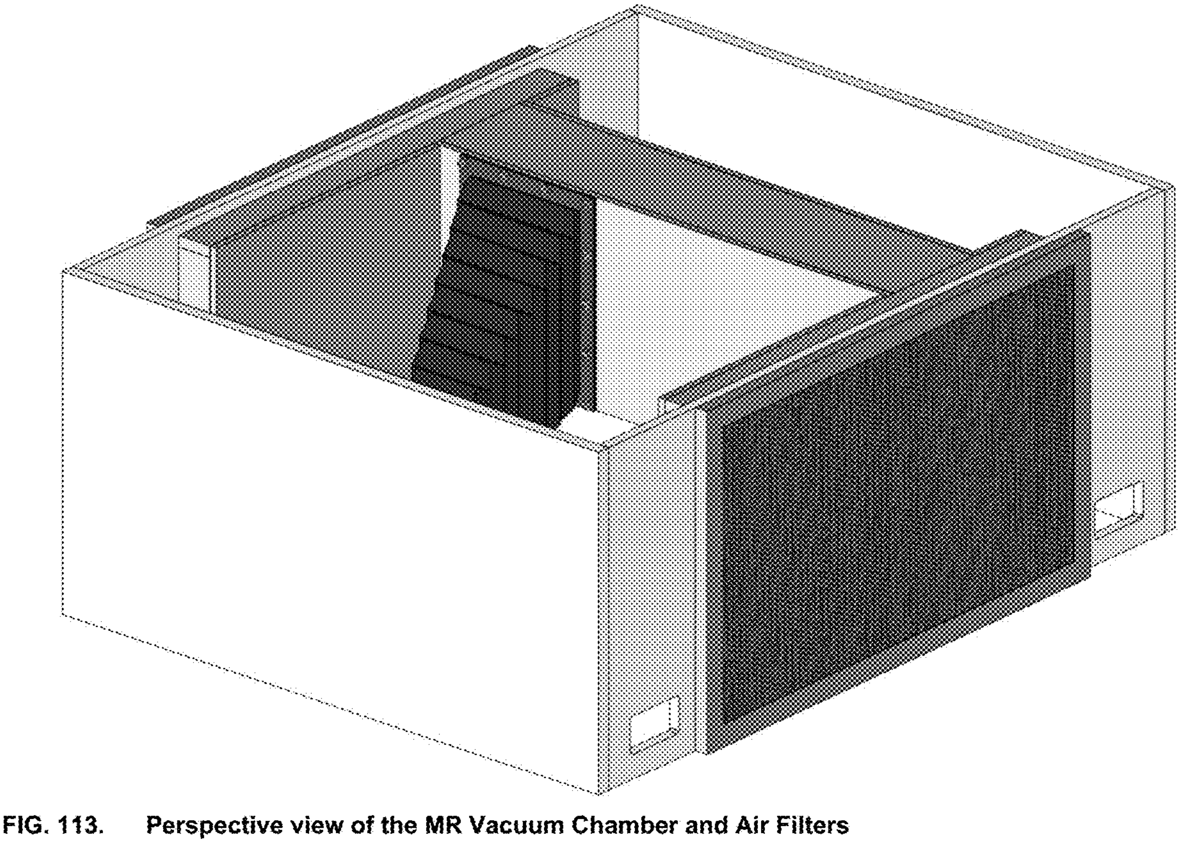
FIG. 113. Perspective view of the MR Vacuum Chamber and Air Filters

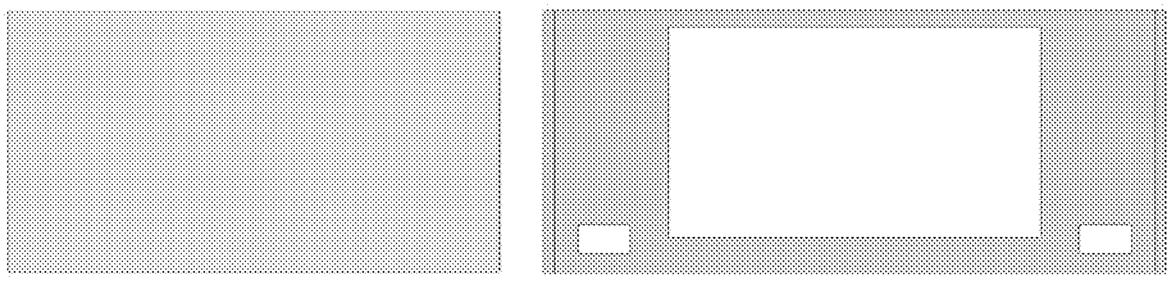
FIG. 114. Front and side views of the MR Vacuum Chamber
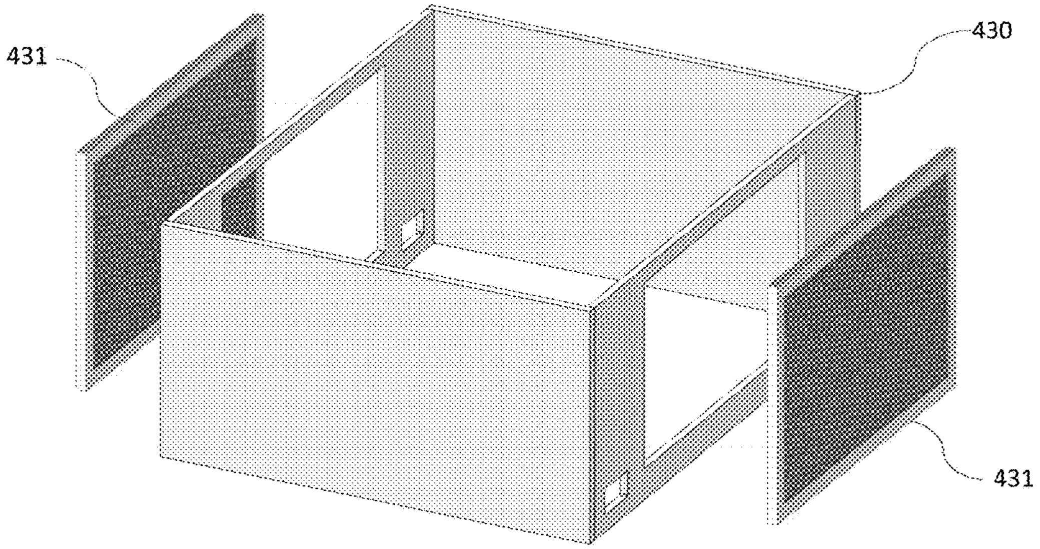
FIG. 115. Perspective view of the MR Vacuum Chamber
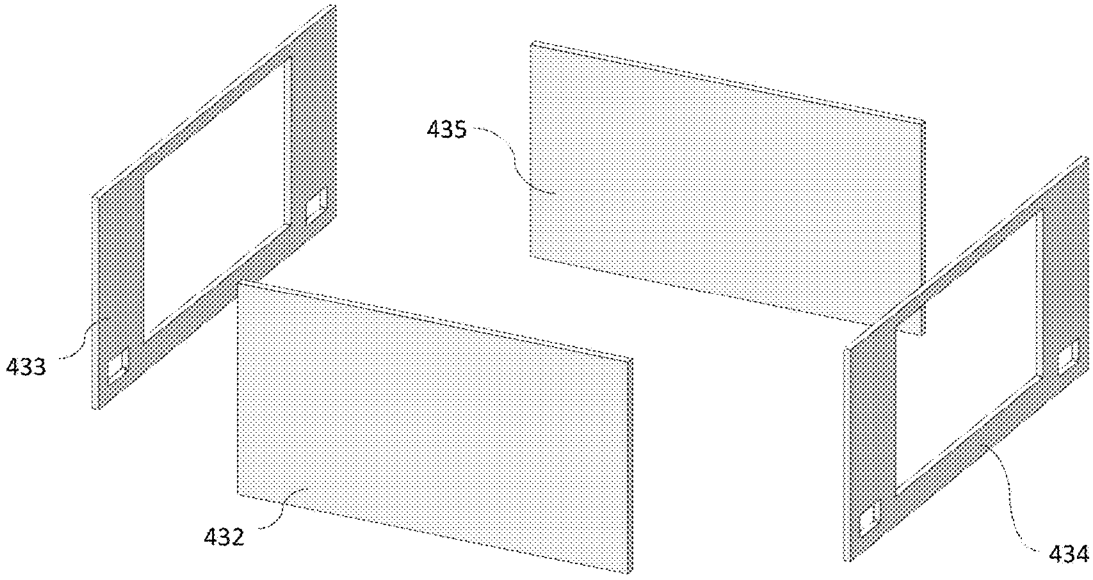
FIG. 116. Exploded view of the MR Vacuum Chamber

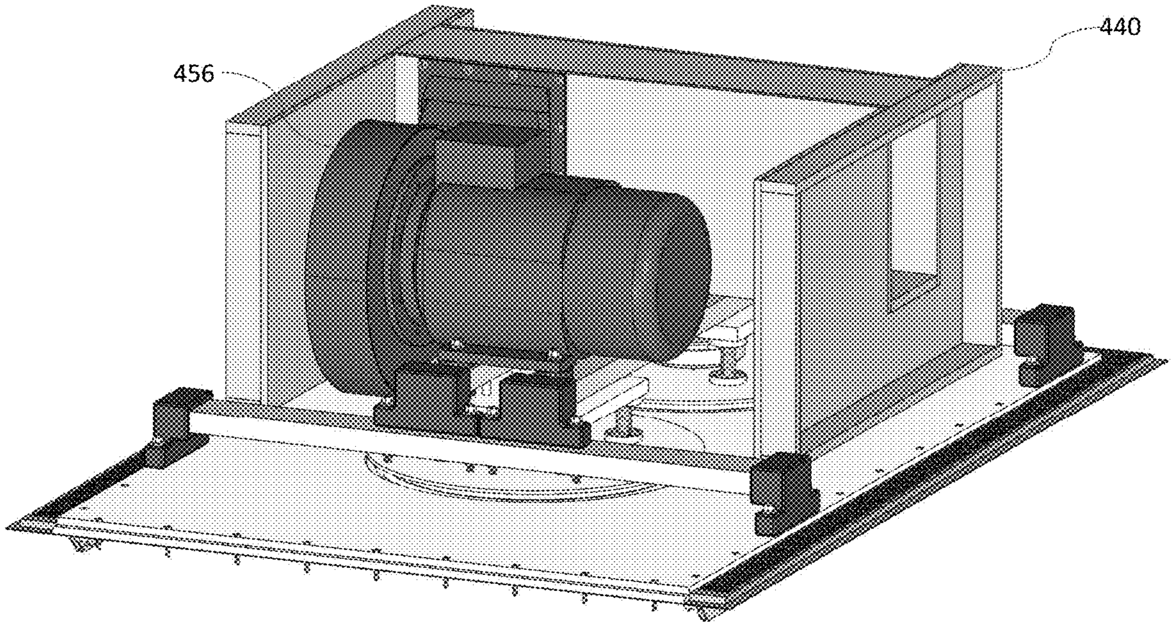
FIG. 117. Perspective view of the exposed Vacuum Compressor and Exhaust Duct
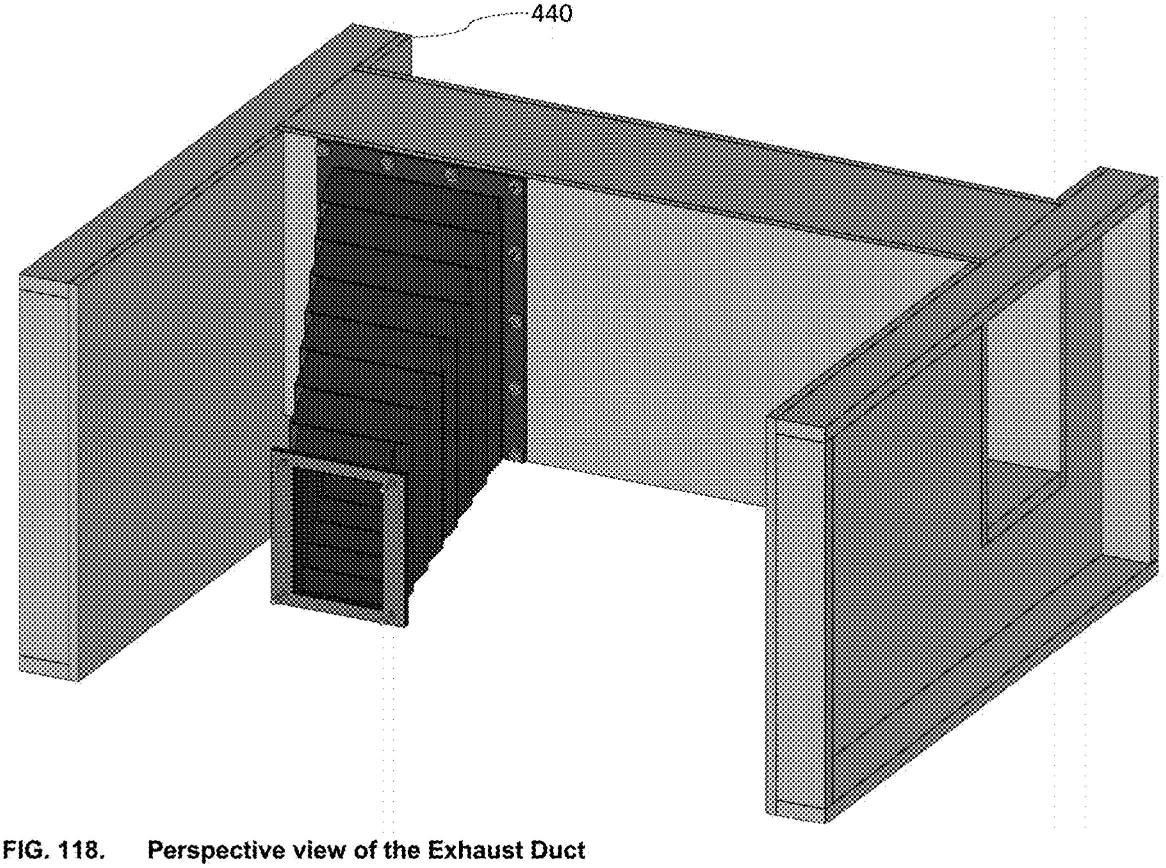
FIG. 118. Perspective view of the Exhaust Duct

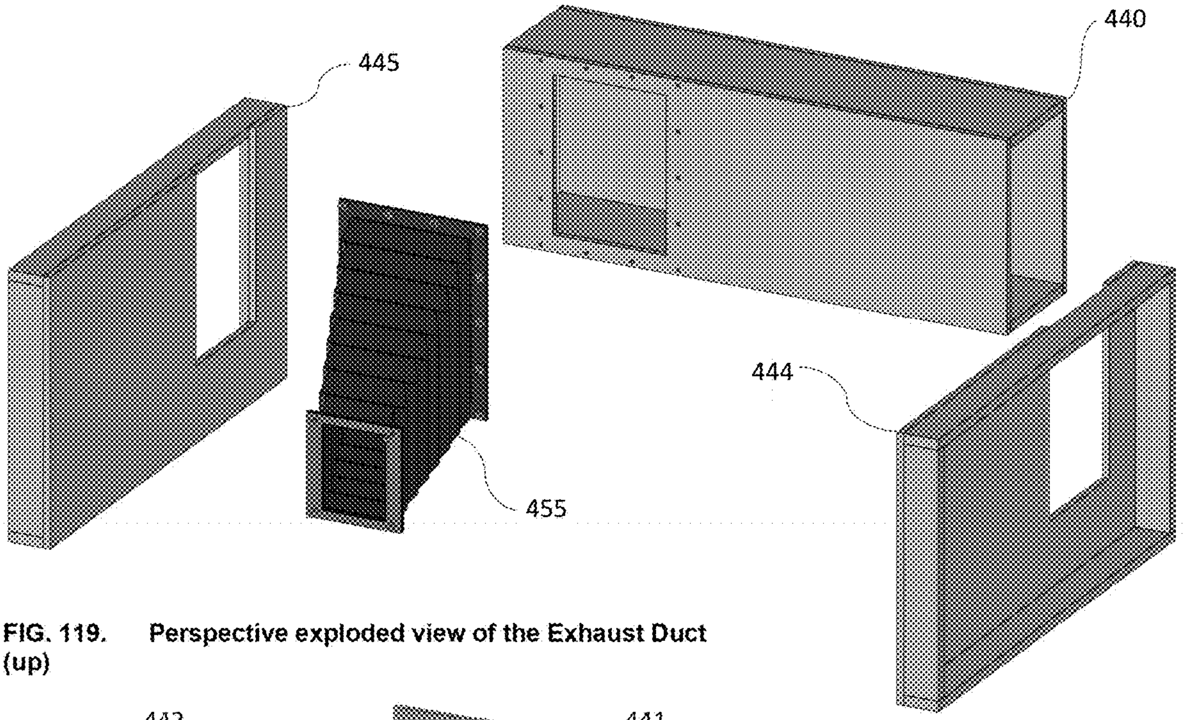
FIG. 119. Perspective exploded view of the Exhaust Duct (up)
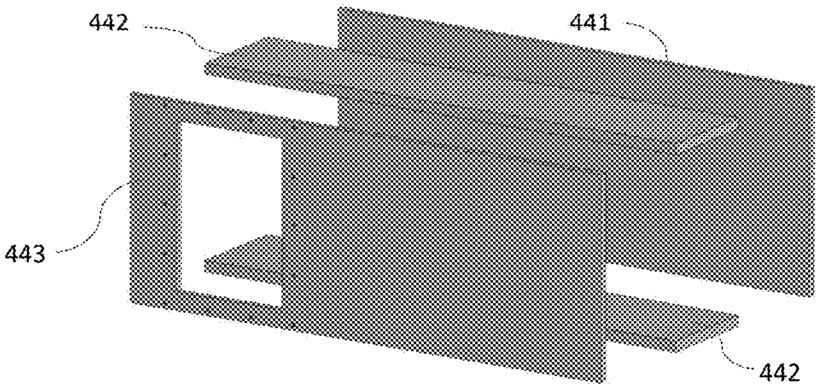
FIG. 120. Perspective exploded view of the Exhaust Duct central channel (up)
FIG. 121. Exploded and perspective views of an Exhaust Duct Air Pocket (right)
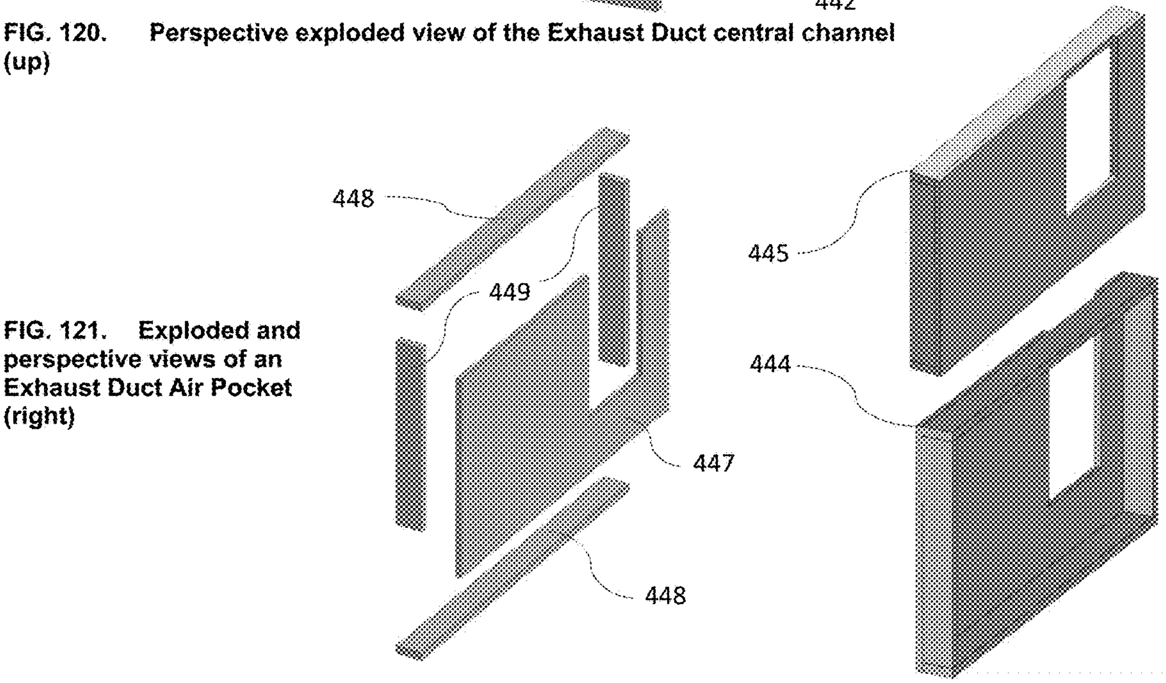

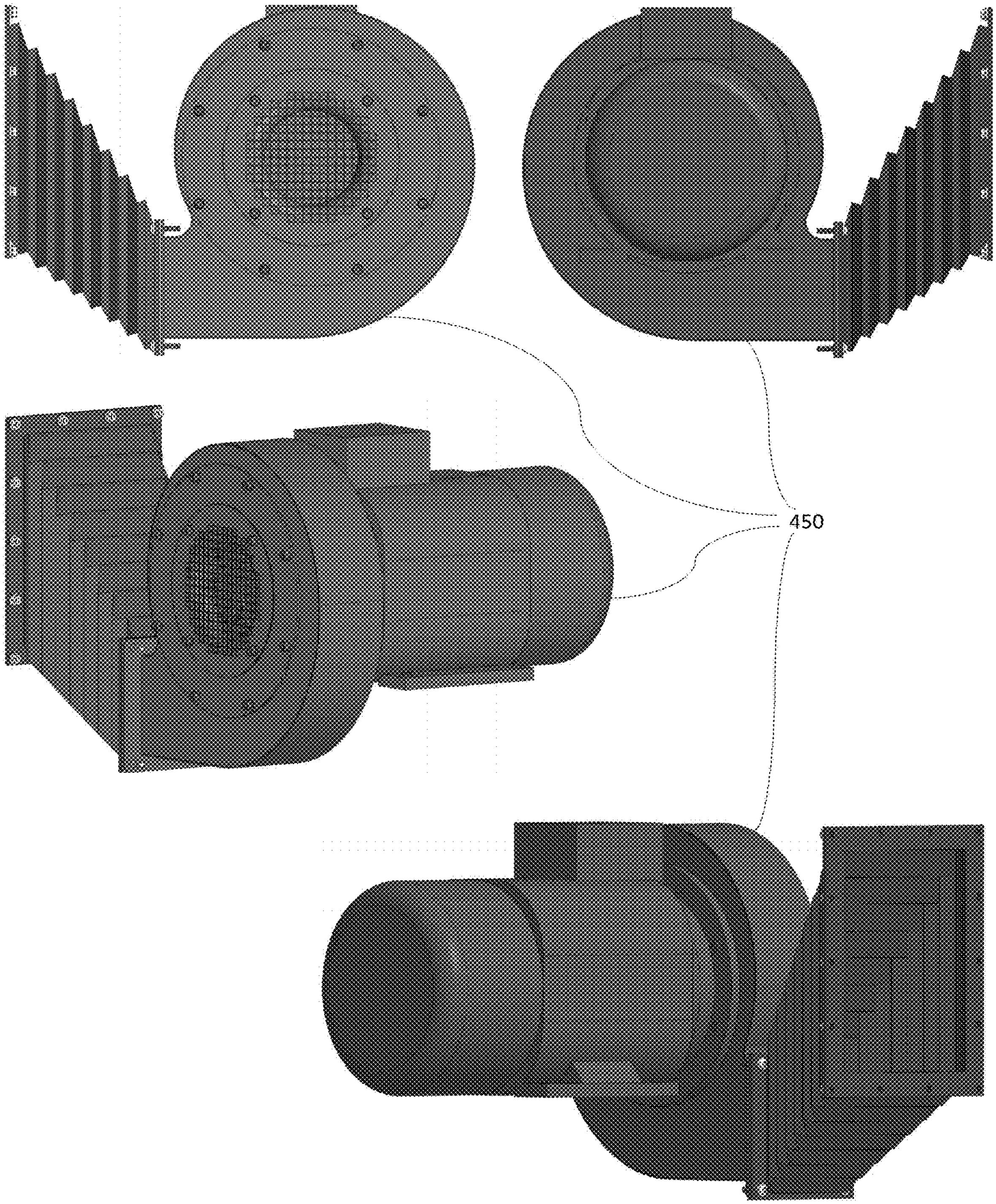
FIG. 122. Various views of the MR Vacuum Compressor with MR Exhaust Flange (example)

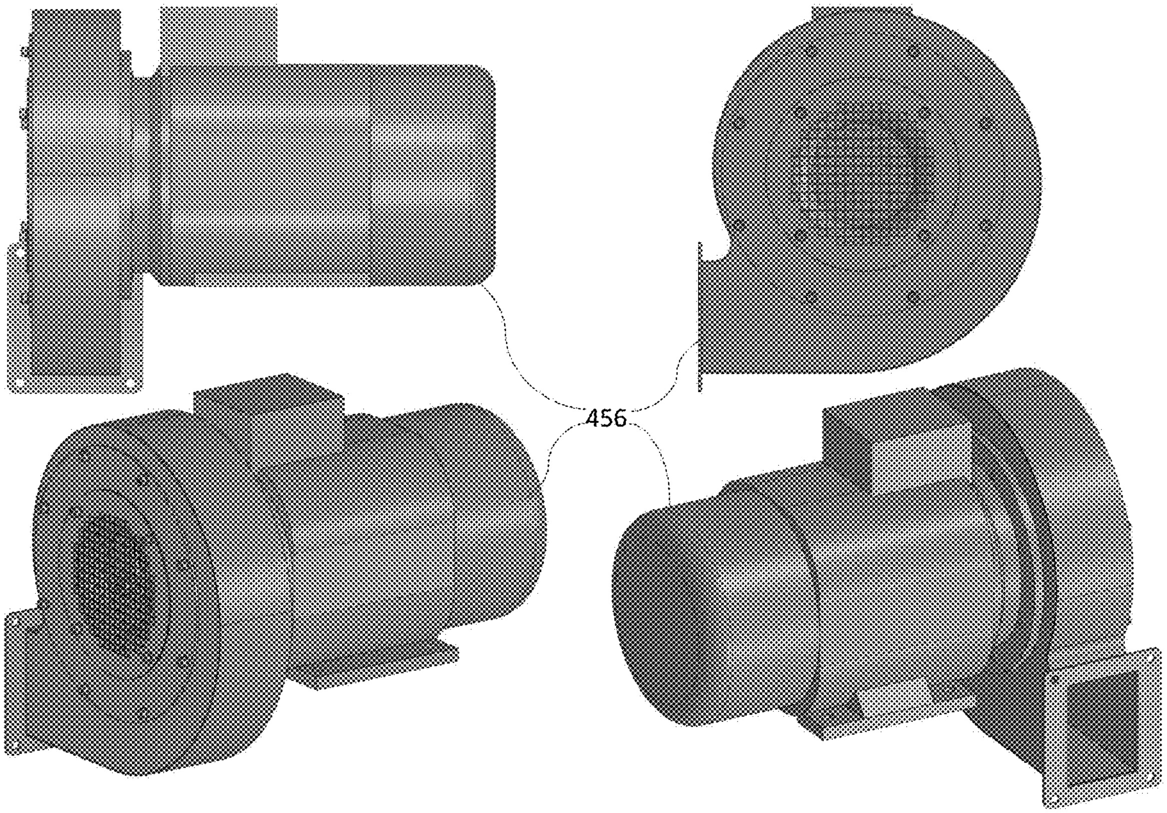
FIG. 123. Various views of the MR Vacuum Compressor (example)
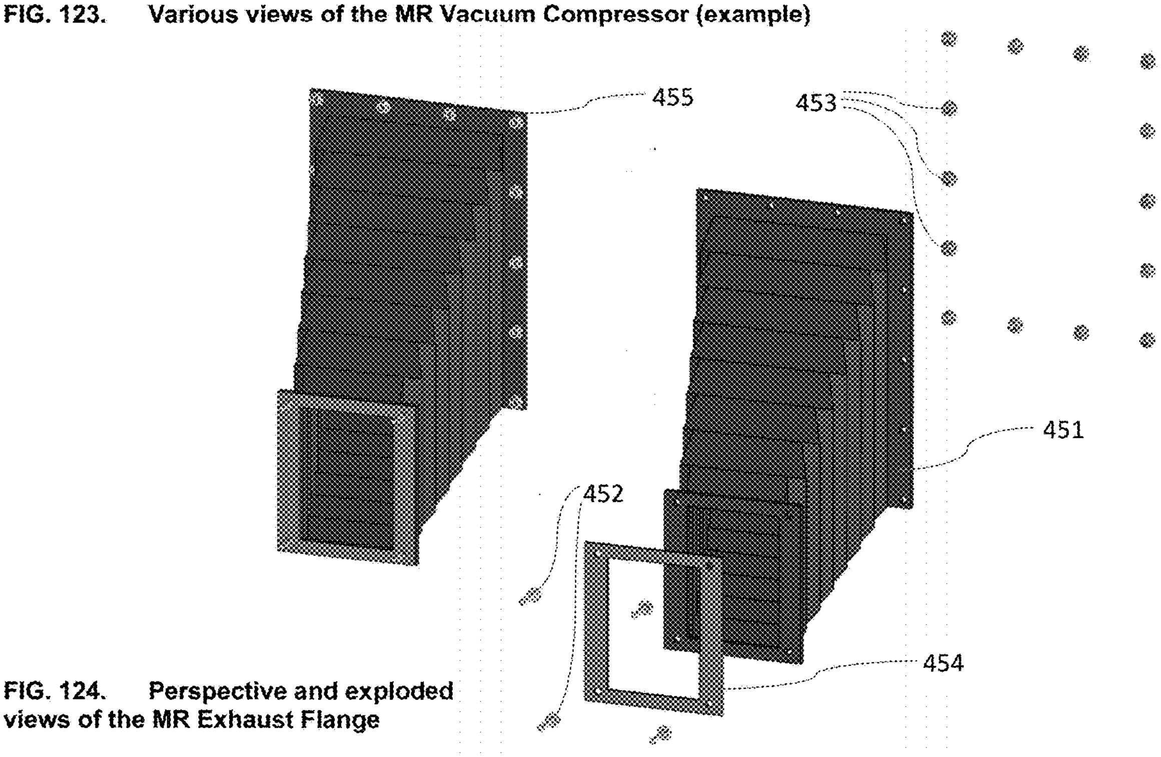
FIG. 124. Perspective and exploded views of the MR Exhaust Flange

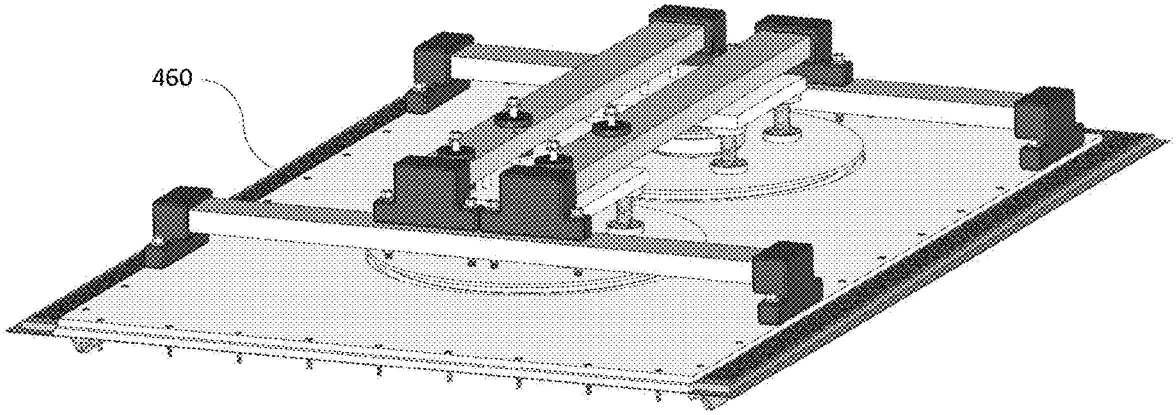
FIG. 125. Perspective view of the exposed MR Compressor Frame
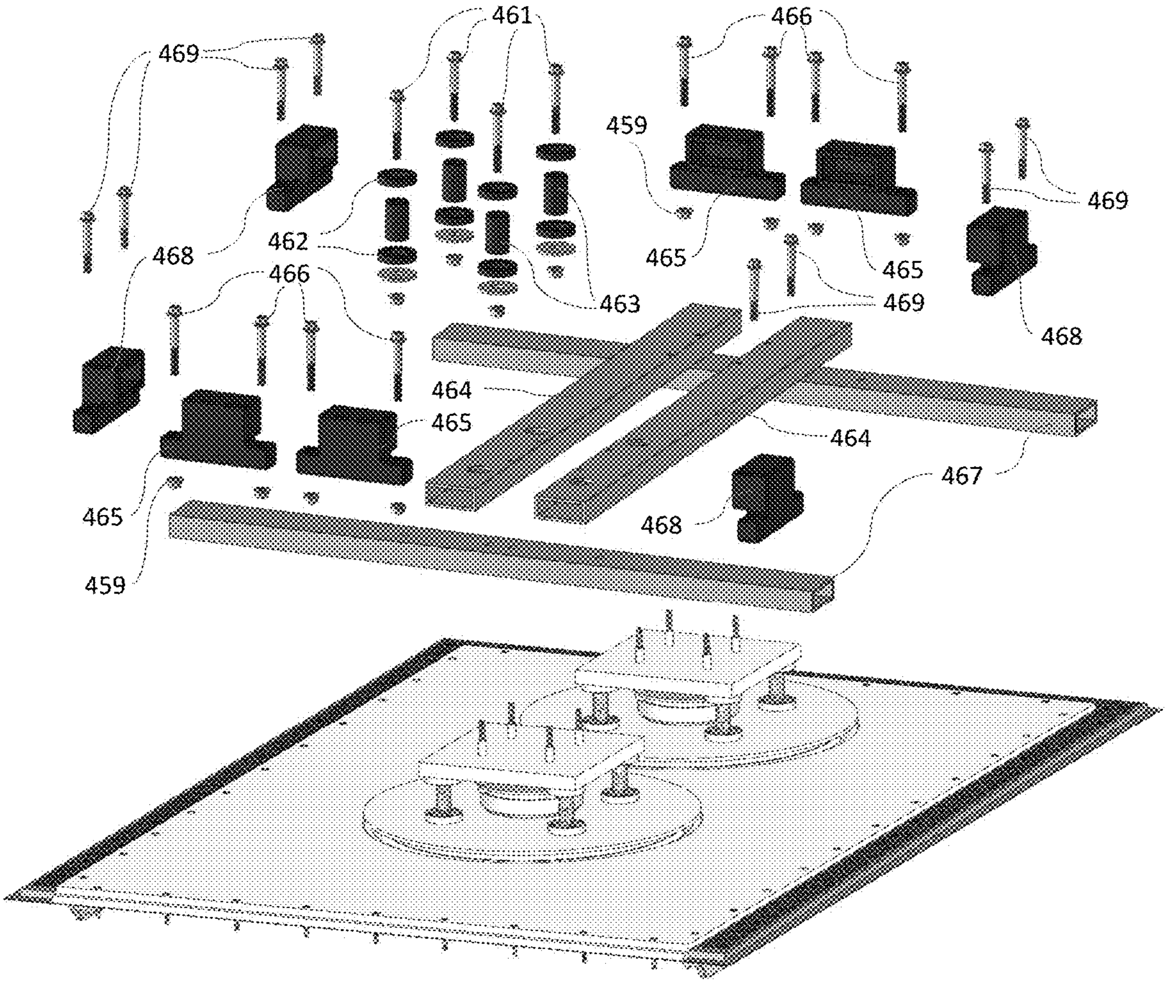
FIG. 126. Exploded view of the MR Compressor Frame and MR Base Frame

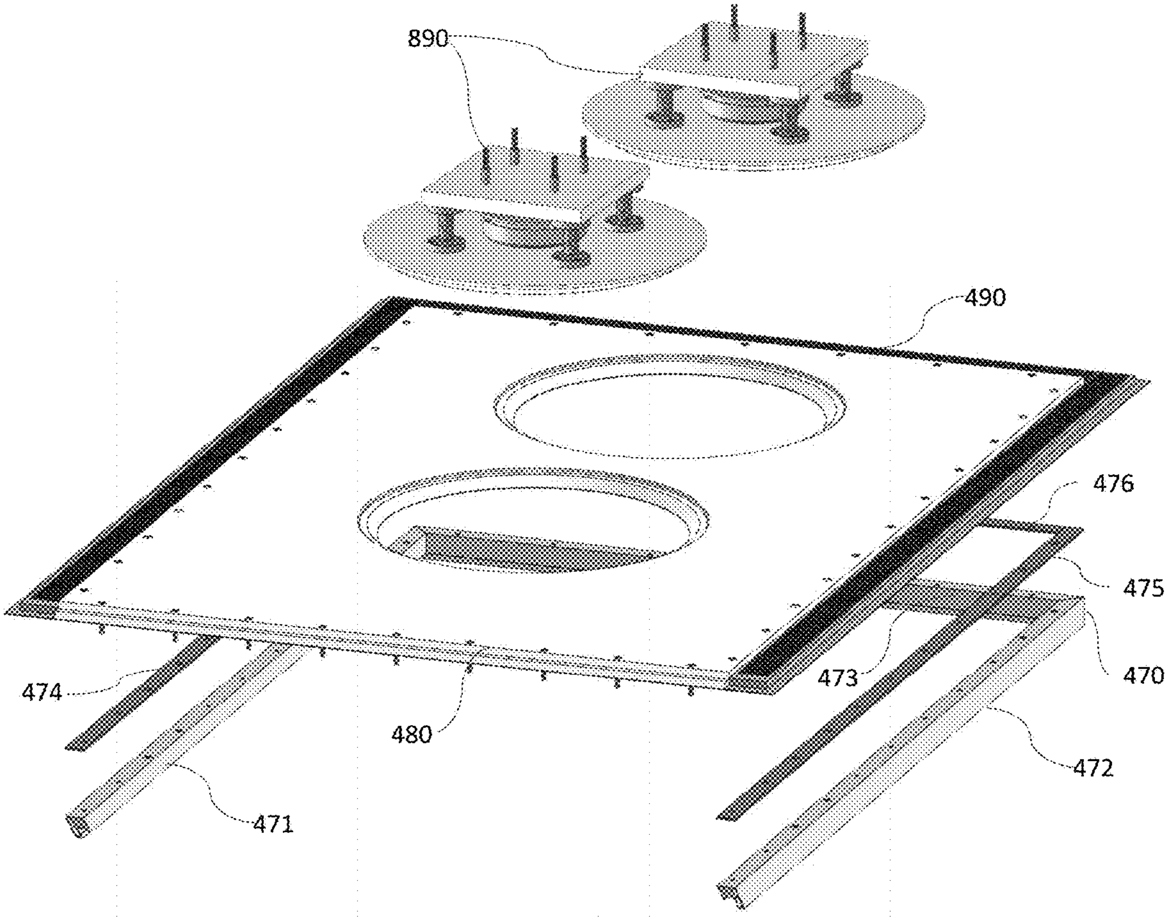
FIG. 127. Perspective views of MR Edge Frame, MR Base Frame and Emergency Brakes
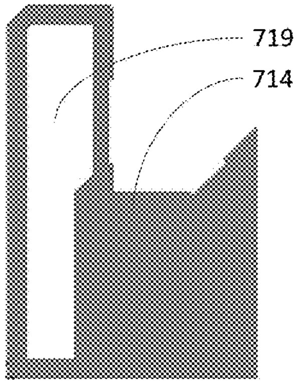
FIG. 128. MR Edge Frame Profile
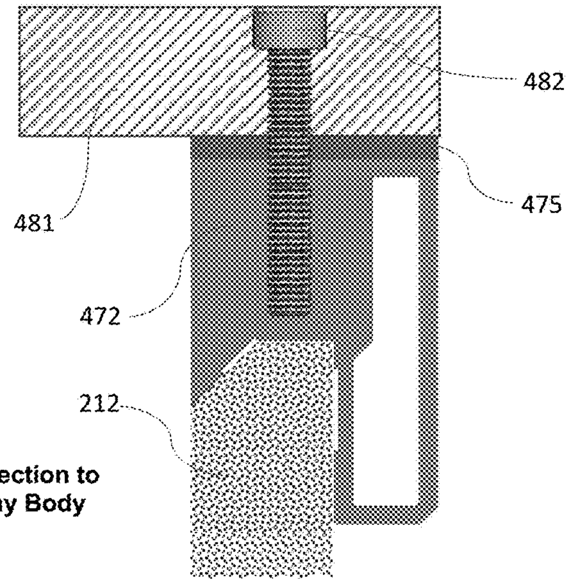
FIG. 129. MR Edge Frame connection to the MR Base Frame and Hoistway Body (right)

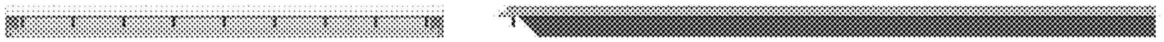
FIG. 130. Front and side views of the MR Base Frame
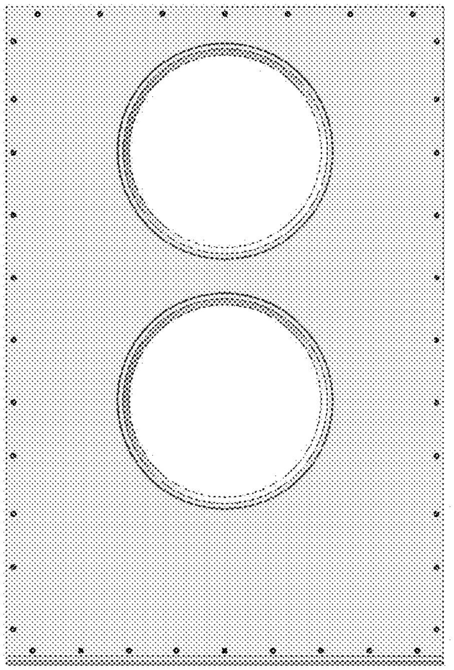
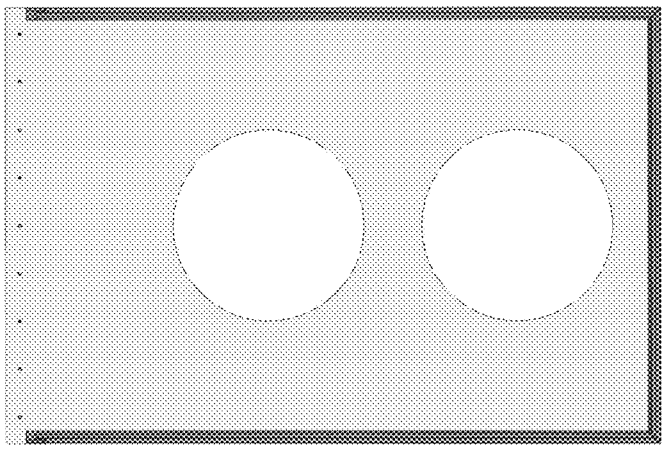
FIG. 131. Bottom view of the MR Base Frame
FIG. 132. Top view of the MR Base Frame
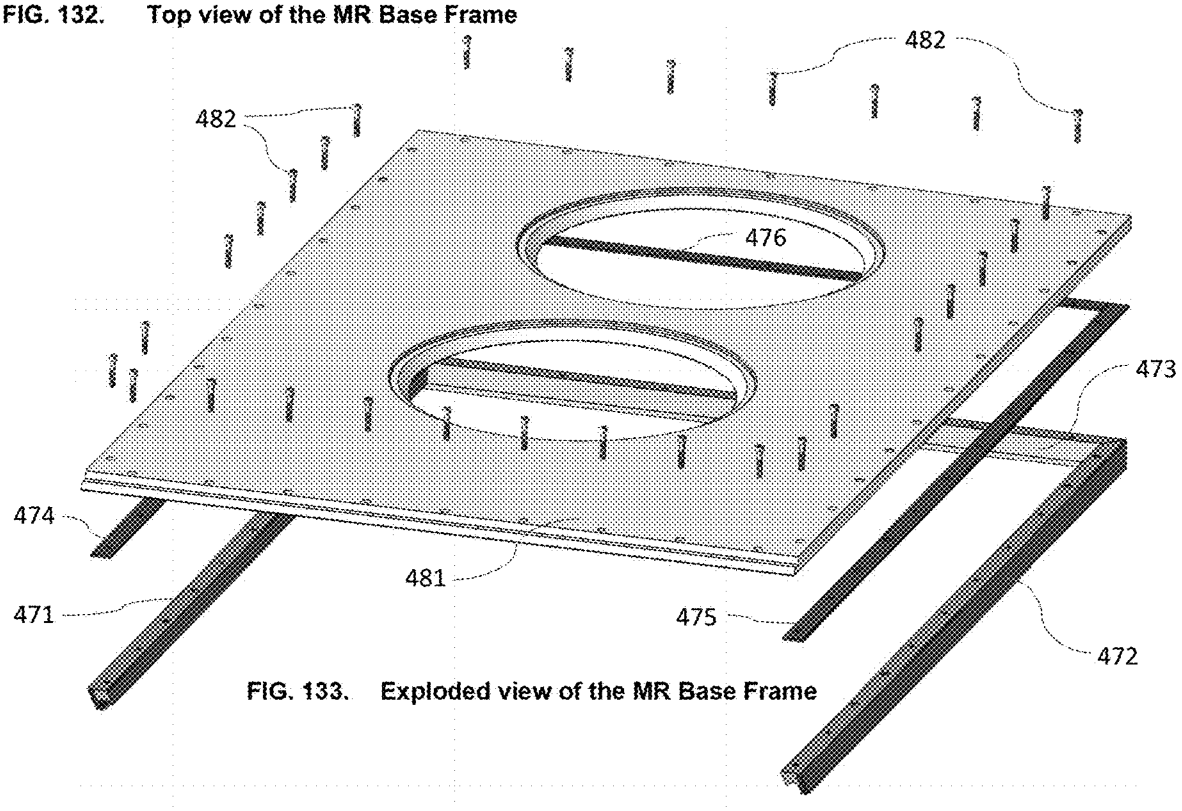
FIG. 133. Exploded view of the MR Base Frame FIG. 134. Front and side views of the Exhaust Grill
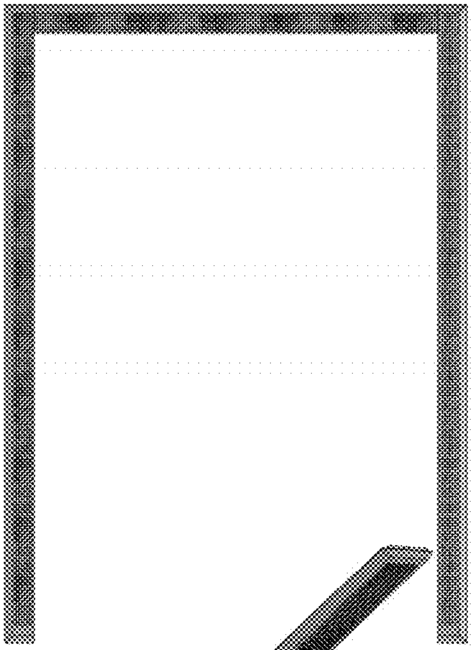
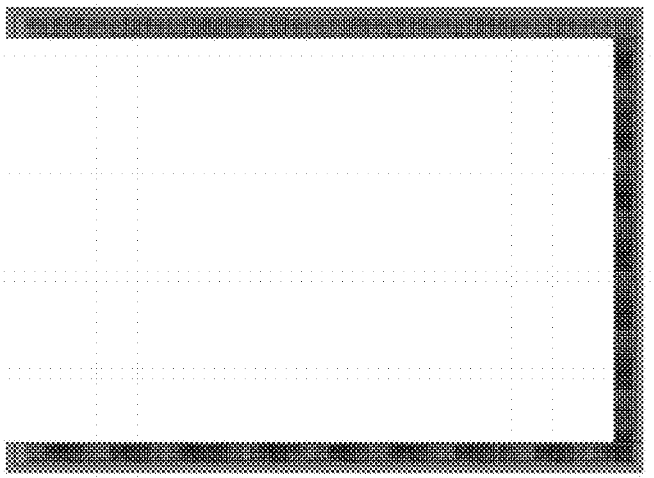
FIG. 135. Top and bottom views of the Exhaust Grill
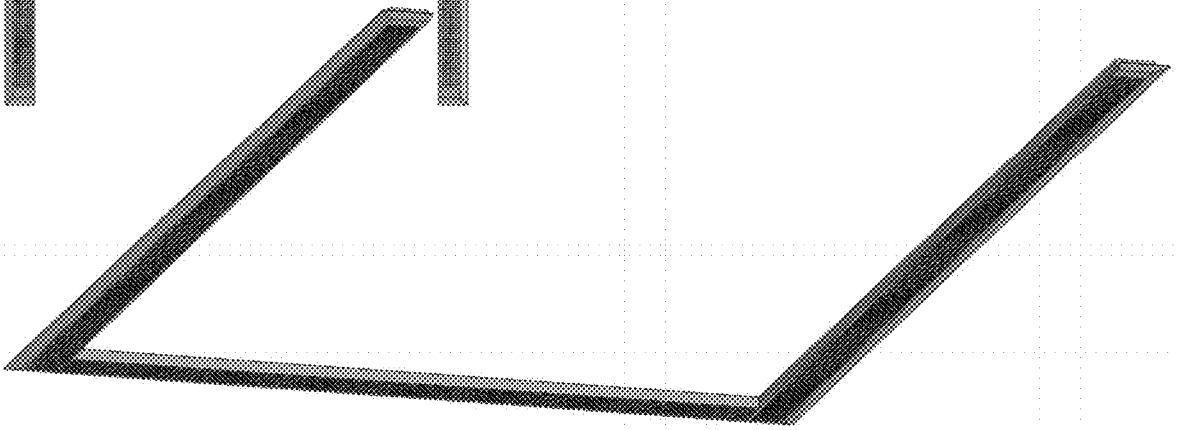
FIG. 136. Bottom perspective view of the Exhaust Grill
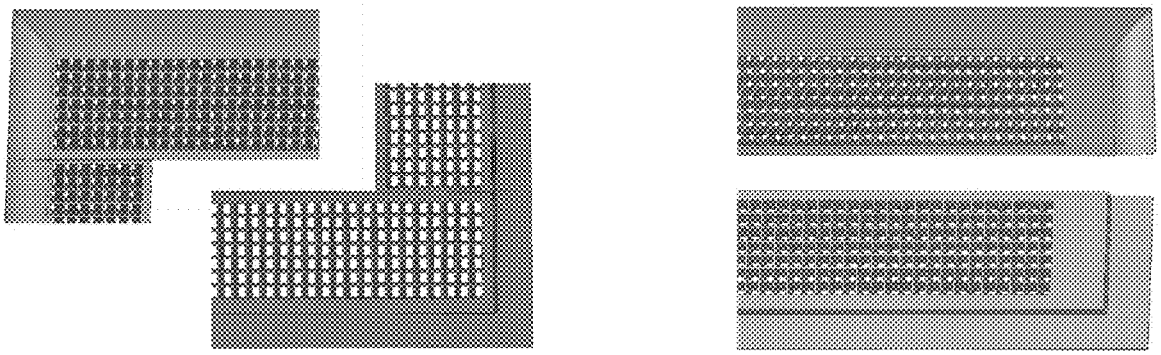
FIG. 137. Fragments of the Exhaust Grill

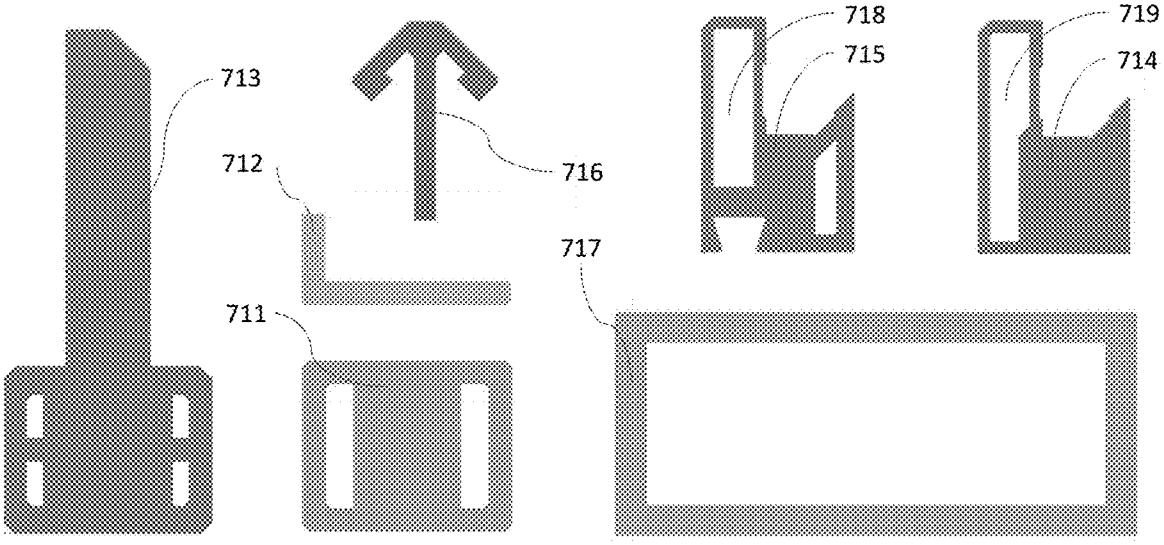
FIG. 138. Profiles used in the Hoistway Foundation, Body and Head construction
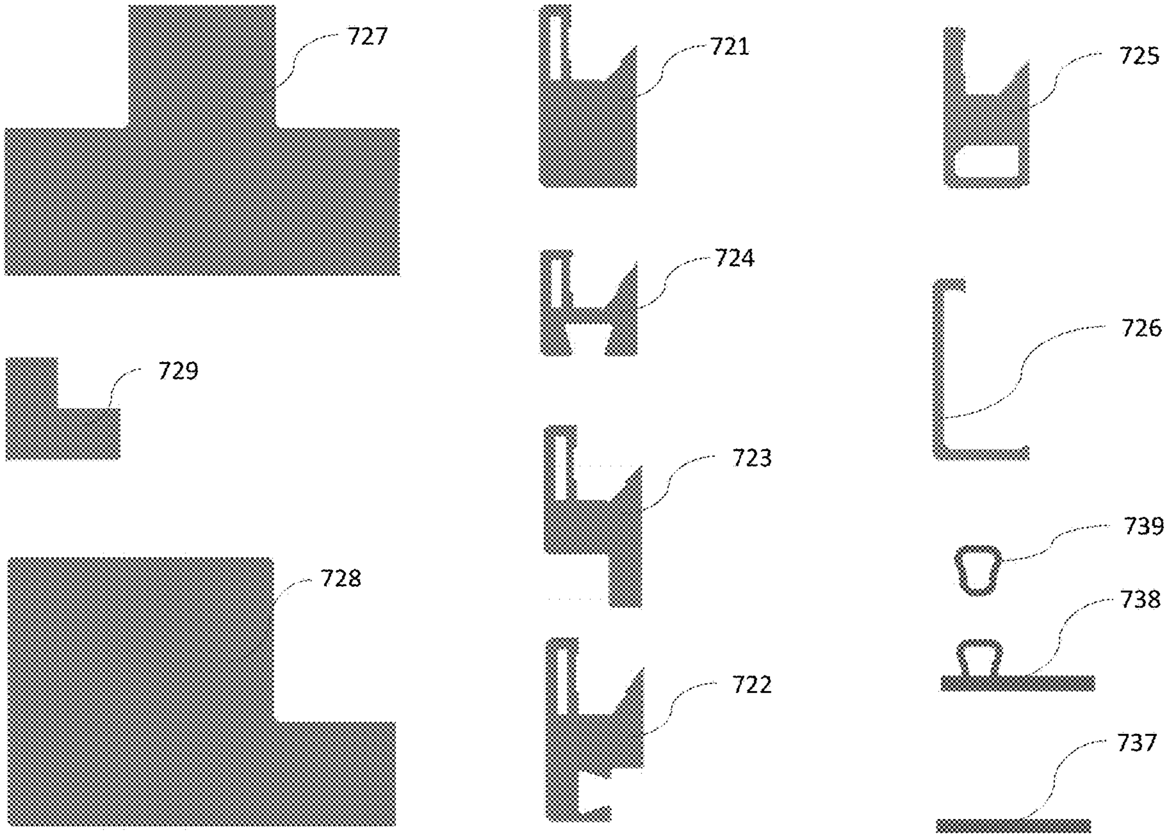
FIG. 139. Profiles used in the Hoistway Doors, Hinges and Front Panel construction

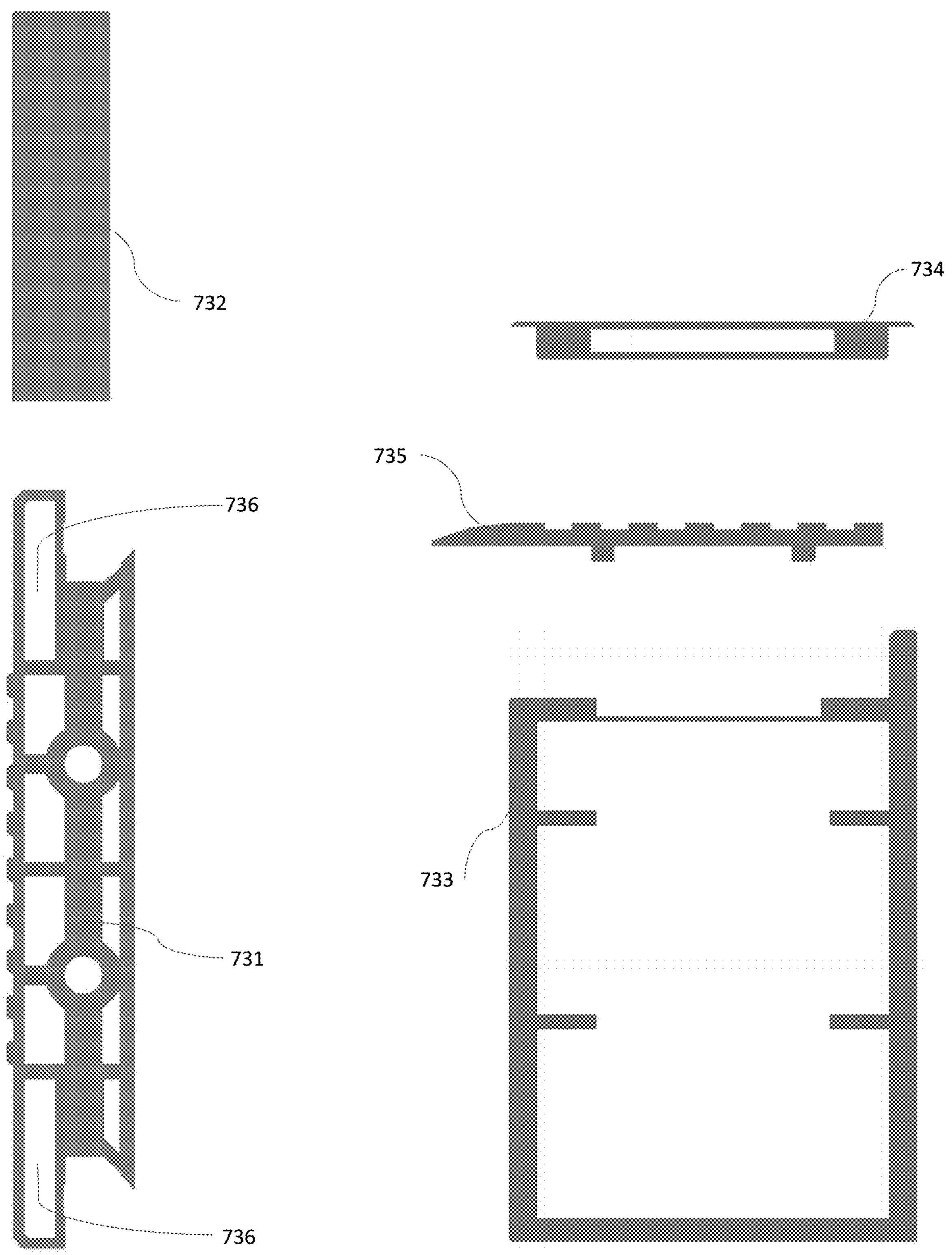
FIG. 140. Profiles used in the Hoistway Belt construction

HOISTWAY MECHANICS OF PANORAMIC VACUUM ELEVATOR

1. BENEFIT CLAIM

This application claims the benefit under 35 U.S.C. § 120 as a continuation of application Ser. No. 17/371,019, filed Jul. 8, 2021, which claims the benefit under 35 U.S.C. § 119(e) of provisional application 63/049,642, filed on Jul. 9, 2020, the entire contents of which are hereby incorporated by reference for all purposes as if fully set forth herein.

2. FIELD OF INVENTION

The present approaches are in the field of elevators, for transporting people, animals and things in an elevator cabin in a vertically situated or vertically inclined elevator shaft. More specifically, the present approaches are in the field of vacuum elevators, where the elevator cabin is brought into motion in a vertically situated or vertically inclined and hermetically sealed elevator shaft by means of aerial pressure differential above and below the elevator cabin.

3. BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Existing elevator designs differ by means of operation; they have significant limitations.

Traction Elevators are the most common type of elevator, where the cabin is raised and lowered by traction steel ropes or belts on a pulley system.

Due to concrete shaft, rails, guides, and counterweights, traction elevators are not space-efficient—traction elevators occupy a large footprint and usually require a separate machine room on top of the elevator shaft. In addition, Traction elevators are expensive to install and maintain and are not suited for low-rise buildings or for use in a private setting inside a dwelling unit or small office due to occupying large footprint, having high cost of installation and high cost of maintenance, and bearing health risks due to voluminous lubricating oils carrying cancer agents. Traction elevator designs use a counterweight to offset the weight of the cabin and its occupants. With such design, the motor does not have to move as much weight. Traction elevators may be geared or gearless. In geared elevators, there is a gearbox attached to the motor that drives the wheel and moves the ropes. Geared machines can reach speeds of up to 500 ft./min. These models may have a middle-of-the-road cost in terms of initial investment, maintenance costs and energy consumption. In gearless traction elevators, the sheave is attached directly to the end of the motor. These models can reach speeds of up to 2,000 ft./min. These models have a high initial cost investment and average maintenance costs. Gearless traction elevators are, however, more energy-efficient than geared traction elevators.

Traction elevators are best suited in high rise buildings in a ventilated shaft located outside the living space, where the large footprint overhead and high installation and maintenance cost are tolerable.

Hydraulic Elevators don't use overhead hoisting machinery. Instead, these elevators lift the cabin by using a hydraulic fluid-driven piston that is mounted inside of a cylinder.

The hydraulic fluid has traditionally been synthetic oil-based, creating an environmental impact where installed.

The limitations of hydraulic elevators are low-rise, low speed, high cost of installation and maintenance, high energy cost and high environmental impact, which makes these type elevators unsuitable for installations in private houses. Hydraulic elevators are often found in buildings of up to five stories high, due to low speeds of operation—typically 150 ft./min. or less.

Another reason for the height limitations of hydraulic elevators is the construction of the hydraulic cylinder and the piston that cannot spread to longer heights due to technological limitations. In addition, the power consumption of hydraulic elevators is higher compared to other elevator types.

There are three different types of hydraulic elevators: Holed, Hole-less and Roped. The Holed type of hydraulic elevator has the hydraulic cylinder(s) placed inside of a drilled hole and allows up to 60' of travel. The Hole-less hydraulic elevators do not require a drilled hole, making this type of elevator ideal for existing buildings or in areas where drilling would be too difficult or expensive. Hole-less elevators should not be installed anywhere that requires more than 40 feet of travel. Roped Hydraulic Elevators use a combination of ropes and a piston to move the elevator, and their maximum travel distance is about 60 feet.

Machine-Room-Less (MRL) Elevators are traction elevators that do not have a dedicated machine room above the elevator shaft. The machine sits in the override space and is accessed from the top of the elevator cab when maintenance or repairs are required.

MRL elevators are not suited well for usage in private houses or single dwelling units due to environmental impact, relatively high noise level, large footprint, and the mid-to-high prohibitive cost of installation and maintenance.

The control boxes are located in a control room that is adjacent to the elevator shaft. MRL elevators have a maximum travel distance of up to 250 feet and can travel at speeds up to 500 feet-per-minute. MRL elevators are comparable to geared traction elevators in terms of initial and maintenance costs, but MRL elevators have relatively low energy consumption compared to geared elevators. Machine-room-less elevators are becoming the most popular choice for mid-rise buildings where the travel distance is up to 250 feet. MRL elevators are energy efficient, require less space, and their operation and reliability are on par with gear-less traction elevators. The main reason that MRL elevators have been adopted so slowly in the United States is that the building codes had provisions that did not allow the motor to be situated within the hoistway.

Shaftless Elevators are small residential elevators designed to fit into 2-story living with minimal disruption during installation. They are a good alternative to a stairlift or shafted elevator.

The limitations of shaftless elevators are many, including safety concerns, which mandate this elevator to travel one floor only, as it represents a fall hazard due to the "open" shaft construction, due to high risk of injury from potential limb cuts. Hence, the shaftless elevators are equipped with multitude of sensors to stop the cabin from motion, should it encounter an obstacle on its way up/down. For safety reasons, this construction is equipped with constant pressure controls, meaning a person to press and hold an elevator call or destination floor buttons to bring and keep the cabin in motion. In addition, this elevator type is noisy, has a negative environmental impact, and has high maintenance costs.

As the name suggests, this type of elevator does not have a shaft and represents an "open" construction, where the rails/guides of the elevator are open and exposed, and the cabin travels up and down the open elevator rails. The motor is installed on top of the elevator cabin and uses ropes/cables to pull the cabin up/down.

Pneumatic Elevators use a partial vacuum in the "shaft" on top of the cabin to move the cabin up and down in a hermetically sealed hoistway shaft.

Due to technical limitations, pneumatic elevators have slow speed and small load capacity, they usually can lift a small load (up to 500 lbs for the largest model) and have significant installation limitations. Another disadvantage of pneumatic elevators is the use of acrylic material for the shaft—it wears out, scratches, and dims over time due to the friction with the cabin's vacuum seal. Among other disadvantages—are round tube shape making the shaft bulky in a private setting when accommodating a wheelchair and making it practically impossible for retrofit. Finally, high noise levels make this unique type of elevators far from being a preferred choice for private installations.

In pneumatic elevator designs, in order to keep the cabin at the same elevated level, a valve that is situated on top of the "shaft" is shut in conjunction with a diaphragm or a piston used as a "brake". The "brake" is also used if there's a sudden increase in pressure above the cabin. To go down, pneumatic elevator designs employ a valve so that the air can pressurize the "shaft", allowing the cabin to descent by its own weight. In case of power outage, the cabin automatically and slowly descends to the ground floor. The ride is not smooth, but rather "bumpy"—e.g., in order for the cabin to go down, first it needs to go a little up, so that brake pistons can retract, only then the cabin can go down by either reducing the vacuum forces or letting the outside air to enter the "shaft" and allowing the cabin to descend by its own weight. The same "bumpiness" is also evident during the ascend—when the cabin needs to stop at a certain floor, first it needs to go a little higher than the floor level, allowing brake pistons to retract, then descend to the floor level and rest on the retracted pistons. The "shaft" is made of acrylic material and has a round shape due to technological limitations of pneumatic elevator designs.

The shortcomings of existing solutions, that the present approaches aim to overcome, may be summarized as follows:

- Poor design. Elevators are usually associated with clunky-chunky structures carrying loads of concrete and heavy metal in their construction. While these elements seem necessary at first, the core architecture of elevators has not changed for over 100 years and cries for a big change both in the technology and in the aesthetic design. In fact, the technological approaches, that are traditionally used in elevators over many years, impose certain restrictions on the size, shape, materials used and the aesthetics of the elevator design, representing a considerable challenge for the aesthetics. For that reason, the elevators in private homes are usually concealed to cover-up the ugly construction elements like rails, guides, chains, ropes, counterweights, pulleys and gears. As such, existing elevator systems have become an expensive item in buyer's budget, where the elevator is considered as a "need-to-have" solution in multi-story living for handicapped, disabled and impaired
- Unsafe. Ropes and cables can break, introducing risk of a free fall, and the system is dependent on emergency brakes that may fire up when cables are broken. The emergency brakes mechanism always requires rails to be present in the construction, as the brakes are being latched on rails. Loss of vacuum in pneumatic elevators creates free fall risk as well. The problem with safety is that any existing elevator design has its safety features dependent often on a single vital mechanism, like brakes latching to rails, which, with any failure, introduces a major safety hazard. Double and triple safety protection for a single feature is often considered a costly overhead. As a consequence, frequent maintenance becomes necessary with regular mandatory replacement of safety parts (e.g. cables, ropes, brakes) to ensure the operability of safety features at all times, which increases the cost of maintenance. In pneumatic elevators failure in electronics or valve control mechanism may create a free-fall risk as well. Shaftless elevators also possess serious risks of child injury and limb injury due to its open construction
- Health Hazard. Most of the elevators heavily use chemical oils to lubricate moving metal parts like gearboxes, rails, guides. In addition, hydraulic elevators use special synthetic hydraulic oils. All these oils have unwanted fumes carrying cancer agents and bringing unwanted oily smell into people's living. If placed in a common area with well-ventilated shaft (as modern mainstream installations are implemented), this is not a big problem. But when installed in a private house or a confined space—exposes occupants to hazardous fumes and becomes a health hazard
- Bulky—existing elevators occupy a large footprint. Traction, hydraulic and MRL elevators pretty much require a concrete shaft, a space for rails and guides, a space for sliding doors mechanism within the shaft and a space for counterweights, which extends the shaft footprint way beyond that of the cabin. As a matter of fact, traction, hydraulic and MRL elevators occupy a 3-5 times larger footprint than that of the cabin, making it "very bulky". Pneumatic elevators are shaped as round tubes and come in pre-assembled bodies, creating an installation challenge. These types of elevators also occupy substantially larger footprint than that of the cabin. For example, the pneumatic elevator model accommodating a wheelchair measures 5+ feet in diameter, which is unlikely to fit into any house door, becoming a retrofit showstopper. Shaftless elevators, on the contrary, occupy the smallest footprint, but are limited to one floor travel and represent a serious safety hazard. Bulky solutions have a major drawback when installing an elevator in existing houses and may be prohibitive when considering a retrofit elevator solution
- Noisy. The noise from a running motor, pulleys, guides, chains and, in case of the pneumatic elevator, a high noise air compressor—represent an additional challenge when considering an elevator installation into private houses and apartments
- Slow speed. All home elevators are extremely slow, traveling at speeds of 5-8 inches per second. Faster solutions are usually associated with bulkier and costlier alternatives
- High energy costs. Due to friction in gearboxes, pulleys, rails and guides of any existing system on the market, an elevator uses a substantial amount of power for overcoming friction, making the overall system energy non-efficient
- Expensive. Due to heavy metal structures like rails and guides, gearboxes, concrete shaft and lengthy installation, modern elevators bear high product and installation costs. In addition, due to frequent maintenance and replacement of wearable parts, the maintenance cost becomes high, making the high cost of installing and maintaining the elevator—a prohibitive factor.

The techniques presented in the current approaches down below in this document overcome the shortcomings outlined above.

4. BRIEF DESCRIPTION OF THE DRAWINGS

The approaches described herein may be better understood, and its numerous features and advantages made apparent to those skilled in the art by referencing the accompanying drawings. For case of understanding and simplicity, common numbering of elements within the illustrations is employed where an element with the same number is the same in different drawings.

The drawings enumerated below are to be regarded in an illustrative rather than a restrictive sense. Each of the drawings depicts one or more embodiments of the invention and does not in any way limit the scope of the invention. The sole and exclusive indicator of the scope of the invention, and what is intended by the applicants to be the scope of the invention, is the literal and equivalent scope of the set of claims that issue from this application, in the specific form in which such claims issue, including any subsequent correction.

FIG. 1. depicts front, side and back views of a 2-story Blissera Elevator system, in an embodiment.

FIG. 2. depicts Perspective views of a 2-story Blissera Elevator system with Cabin in motion, in an embodiment.

FIG. 3. depicts Upper front and lower back perspective views of a 2-story Hoistway, in an embodiment.

FIG. 4. depicts Front and side views of a 2-story Hoistway, in an embodiment.

FIG. 5. depicts Top and bottom views of the Hoistway, in an embodiment.

FIG. 6. depicts Front perspective zoomed view of a Hoistway Belt connection, in an embodiment.

FIG. 7. depicts Exploded view of the Hoistway, in an embodiment.

FIG. 8. depicts Front and side views of the Hoistway Foundation, in an embodiment.

FIG. 9. depicts Bottom view of the Hoistway Foundation, in an embodiment.

FIG. 10. depicts Top view of the Hoistway Foundation, in an embodiment.

FIG. 11. depicts Top perspective view of the Hoistway Foundation, in an embodiment.

FIG. 12. depicts Perspective exploded view of the Hoistway Foundation, in an embodiment.

FIG. 13. depicts Perspective view of the Hoistway Foundation Enclosure, in an embodiment.

FIG. 14. depicts Exploded view of the Hoistway Foundation Enclosure, in an embodiment.

FIG. 15. depicts Perspective view of the Hoistway Foundation Base, in an embodiment.

FIG. 16. depicts Exploded view of the Hoistway Foundation Base, in an embodiment.

FIG. 17. depicts Cross-section view of the Foundation Frame upper and lower profiles, in an embodiment.

FIG. 18. depicts Front and side views of the Hoistway Foundation Frame, in an embodiment.

FIG. 19. depicts Bottom view of the Hoistway Foundation Frame, in an embodiment.

FIG. 20. depicts Top view of the Hoistway Foundation Frame, in an embodiment.

FIG. 21. depicts Perspective view of the Hoistway Foundation Frame, in an embodiment.

FIG. 22. depicts Perspective exploded view of the Hoistway Foundation Frame, in an embodiment.

FIG. 23. depicts Cross-section view of the Hoistway Edge Frame profile, in an embodiment.

FIG. 24. depicts Cross-section view of the Foundation Frame back profile, in an embodiment.

FIG. 25. depicts Front and side views of the Hoistway Foundation Grill Frame, in an embodiment.

FIG. 26. depicts Bottom view of the Hoistway Foundation Grill Frame, in an embodiment.

FIG. 27. depicts Top view of the Hoistway Foundation Grill Frame, in an embodiment.

FIG. 28. depicts Zoomed fragments view of the Hoistway Foundation Grill Frame, in an embodiment.

FIG. 29. depicts Perspective view of the Hoistway Foundation Grill Frame, in an embodiment.

FIG. 30. depicts Front and side views of the Hoistway Shaft, in an embodiment.

FIG. 31. depicts Bottom view of the Hoistway Shaft, in an embodiment.

FIG. 32. depicts Top view of the Hoistway Shaft, in an embodiment.

FIG. 33. depicts Front perspective view of the Hoistway Shaft, in an embodiment.

FIG. 34. depicts Exploded view of the Hoistway Shaft, in an embodiment.

FIG. 35. depicts Top view of the Hoistway Doors in closed position, in an embodiment.

FIG. 36. depicts Top view of the Hoistway Doors in open position, in an embodiment.

FIG. 37. depicts Perspective and exploded views of the Hoistway Body, in an embodiment.

FIG. 38. depicts Back corner glass panels connections of the Hoistway Body, in an embodiment.

FIG. 39. depicts Perspective views of the front corner of the Hoistway Body, in an embodiment.

FIG. 40. depicts Front and side views of the Hoistway Doorway Frame, in an embodiment.

FIG. 41. depicts Exploded front view of the Hoistway Doorway Frame, in an embodiment.

FIG. 42. depicts Top and bottom views of the Hoistway Doorway Frame, in an embodiment.

FIG. 43. depicts Doorway Frame—upper and lower edges of Hoistway Doors, in an embodiment.

FIG. 44. depicts Front view of middle edge connection of Hoistway Doors, in an embodiment.

FIG. 45. depicts Doorway Frame—back perspective view of Hoistway Doors upper edge, in an embodiment.

FIG. 46. depicts Cross-section view of the Doorway Frame gaskets, in an embodiment.

FIG. 47. depicts Exploded back view of the Doorway Frame, in an embodiment.

FIG. 48. depicts Hoistway Doorway Frame—frame side door hinge perspective views, in an embodiment.

FIG. 49. depicts Hoistway Doorway Frame hinge connection with and without vacuum seal, in an embodiment.

FIG. 50. depicts Hoistway Doorway Frame—side door hinge exploded view, in an embodiment.

FIG. 51. depicts Hoistway Doorway Frame side hinge connection to Hoistway Door upper hinge, in an embodiment.

FIG. 52. depicts Hoistway Doorway Frame side hinge with the Hoistway door middle hinge, in an embodiment.

FIG. 53. depicts Hoistway Doorway Frame hinge with the door hinge with call button housing, in an embodiment.

FIG. 54. depicts Hoistway Doorway Frame side hinge with the Hoistway door lower hinge, in an embodiment.

FIG. 55. depicts Top, front, bottom and side views of the Front Panel, in an embodiment.

FIG. 56. depicts Front perspective view of the Front Panel, in an embodiment.

FIG. 57. depicts Back perspective view of the Front Panel, in an embodiment.

FIG. 58. depicts Front perspective exploded view of the Front Panel, in an embodiment.

FIG. 59. depicts Front perspective view of the Front Panel upper corner, in an embodiment.

FIG. 60. depicts Front perspective zoomed view of the Front Panel lower edge, in an embodiment.

FIG. 61. depicts Back perspective zoomed view of the Front Panel lower edge, in an embodiment.

FIG. 62. depicts Front perspective zoomed view of the Front Panel upper edge, in an embodiment.

FIG. 63. depicts Cross-section exploded view of the Doorway Frame and Front Panel connection FIG. 64. depicts Perspective exploded view of the Doorway Frame and Front Panel connection, in an embodiment.

FIG. 65. depicts Cross-section view of the Doorway Frame and Front Panel connection, in an embodiment.

FIG. 66. depicts Cross-section view of the Doorway Frame and the Hoistway Door connection, in an embodiment.

FIG. 67. depicts Middle side, back and hinge side views of the Hoistway Door, in an embodiment.

FIG. 68. depicts Top, front and bottom views of the Hoistway Door, in an embodiment.

FIG. 69. depicts Front perspective views of the Hoistway Door lower edge, in an embodiment.

FIG. 70. depicts Front exploded view of the Hoistway Door, in an embodiment.

FIG. 71. depicts Perspective exploded views of the Hoistway Door lower and upper edges, in an embodiment.

FIG. 72. depicts Back perspective views of the Hoistway Door lower edge, in an embodiment.

FIG. 73. depicts Back exploded view of the Hoistway Door, in an embodiment.

FIG. 74. depicts Front and back top exploded views of the Hoistway Door upper hinge, in an embodiment.

FIG. 75. depicts Top and bottom front exploded views of the Hoistway Door upper hinge, in an embodiment.

FIG. 76. depicts Front and back exploded views of the Hoistway Door lower hinge, in an embodiment.

FIG. 77. depicts Perspective views of the Hoistway Door middle hinge, in an embodiment.

FIG. 78. depicts Perspective views of the Hoistway Door middle hinge with call housing, in an embodiment.

FIG. 79. depicts Bottom perspective view of the Hoistway Door middle hinge, in an embodiment.

FIG. 80. depicts Perspective view of the Hoistway Belt connected to the Hoistway Base, in an embodiment.

FIG. 81. depicts Front and side views of the Hoistway Belt, in an embodiment.

FIG. 82. depicts Front perspective view of the Hoistway Belt option at the upper floor levels, in an embodiment.

FIG. 83. depicts Top view of the Hoistway Belt, in an embodiment.

FIG. 84. depicts Front perspective view of the Hoistway Belt option at the foundation floor level, in an embodiment.

FIG. 85. depicts Front exploded view of the Hoistway Belt, in an embodiment.

FIG. 86. depicts Various zoomed views of the Hoistway Belt back corner connection, in an embodiment.

FIG. 87. depicts Inside views of the front and back corners of the Hoistway Belt, in an embodiment.

FIG. 88. depicts Front and back perspective views of the Hoistway Belt

FIG. 89. depicts Cross-section view of the Hoistway Belt and Hoistway Glass Panels, in an embodiment.

FIG. 90. depicts Various views of the Hoistway Belt front corner, in an embodiment.

FIG. 91. depicts Front view of the Hoistway Base Body, in an embodiment.

FIG. 92. depicts Back view of the Hoistway Base Body, in an embodiment.

FIG. 93. depicts Top view of the Hoistway Base Body, in an embodiment.

FIG. 94. depicts Bottom view of the Hoistway Base Body, in an embodiment.

FIG. 95. depicts Front perspective view of the Hoistway Base Body, in an embodiment.

FIG. 96. depicts Back perspective view of the Hoistway Base Body, in an embodiment.

FIG. 97. depicts Front perspective exploded view of the Hoistway Base Body, in an embodiment.

FIG. 98. depicts Back perspective exploded view of the Hoistway Base Body, in an embodiment.

FIG. 99. depicts Side view of the Hoistway Base Body, in an embodiment.

FIG. 100. depicts Cross-sectional views of the Hoistway Base Body and the side cover, in an embodiment.

FIG. 101. depicts Zoomed front angle view of the Hoistway Base Body, in an embodiment.

FIG. 102. depicts Exploded angle view of the Hoistway Base Body, in an embodiment.

FIG. 103. depicts Perspective zoomed and cross-section views of the Hoistway Base top cover, in an embodiment.

FIG. 104. depicts Front and side views of the Machine Room (MR), in an embodiment.

FIG. 105. depicts Bottom view of the MR, in an embodiment.

FIG. 106. depicts Top view of the MR, in an embodiment.

FIG. 107. depicts Top and bottom perspective views of the MR, in an embodiment.

FIG. 108. depicts Perspective view of the MR Enclosure, in an embodiment.

FIG. 109. depicts Exploded view of the MR Enclosure, in an embodiment.

FIG. 110. depicts Perspective view of the MR with exposed MR Electronics, in an embodiment.

FIG. 111. depicts Perspective views of the MR Electronics, in an embodiment.

FIG. 112. depicts Perspective view of the MR with exposed Vacuum Chamber, in an embodiment.

FIG. 113. depicts Perspective view of the MR Vacuum Chamber and Air Filters, in an embodiment.

FIG. 114. depicts Front and side views of the MR Vacuum Chamber, in an embodiment.

FIG. 115. depicts Perspective view of the MR Vacuum Chamber, in an embodiment.

FIG. 116. depicts Exploded view of the MR Vacuum Chamber, in an embodiment.

FIG. 117. depicts Perspective view of the exposed Vacuum Compressor and Exhaust Duct, in an embodiment.

FIG. 118. depicts Perspective view of the Exhaust Duct, in an embodiment.

FIG. 119. depicts Perspective exploded view of the Exhaust Duct, in an embodiment.

FIG. 120. depicts Perspective exploded view of the Exhaust Duct central channel, in an embodiment.

FIG. 121. depicts Exploded and perspective views of an Exhaust Duct Air Pocket, in an embodiment.

FIG. 122. depicts Various views of the MR Vacuum Compressor with MR Exhaust Flange (example), in an embodiment.

FIG. 123. depicts Various views of the MR Vacuum Compressor (example), in an embodiment.

FIG. 124. depicts Perspective and exploded views of the MR Exhaust Flange, in an embodiment.

FIG. 125. depicts Perspective view of the exposed MR Compressor Frame, in an embodiment.

FIG. 126. depicts Exploded view of the MR Compressor Frame and MR Base Frame, in an embodiment.

FIG. 127. depicts Perspective views of MR Edge Frame, MR Base Frame and Emergency Brakes, in an embodiment.

FIG. 128. depicts MR Edge Frame Profile, in an embodiment.

FIG. 129. depicts MR Edge Frame connection to the MR Base Frame and Hoistway Body, in an embodiment.

FIG. 130. depicts Front and side views of the MR Base Frame, in an embodiment.

FIG. 131. depicts Bottom view of the MR Base Frame, in an embodiment.

FIG. 132. depicts Top view of the MR Base Frame, in an embodiment.

FIG. 133. depicts Exploded view of the MR Base Frame, in an embodiment.

FIG. 134. depicts Front and side views of the Exhaust Grill, in an embodiment.

FIG. 135. depicts Top and bottom views of the Exhaust Grill, in an embodiment.

FIG. 136. depicts Bottom perspective view of the Exhaust Grill, in an embodiment.

FIG. 137. depicts Fragments of the Exhaust Grill, in an embodiment.

FIG. 138. depicts Profiles used in the Hoistway Foundation, Body and Head construction, in an embodiment.

FIG. 139. depicts Profiles used in the Hoistway Doors, Hinges and Front Panel construction, in an embodiment.

FIG. 140. depicts Profiles used in the Hoistway Belt construction, in an embodiment.

5. DETAILED DESCRIPTION OF THE INVENTION

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The present approaches include a Panoramic Vacuum Elevator system for transporting people, animals and things in a vertically situated or vertically inclined elevator shaft, in which large tempered glass panels are used as main construction elements of the elevator hoistway (Hoistway) and the elevator cabin (Cabin), in an embodiment.

Contrary to the popular use of glass panels, where glass is traditionally used as a filler in a constructive metallic frame skeleton, the glass panels in the present techniques, are the main construction elements of the Panoramic Vacuum Elevator system and are the “exoskeleton” of the system, carrying the weight of the entire construction, in an embodiment.

The glass panels, when used in the Hoistway construction, are stacked atop a “Hoistway Belt” assembly, made of aluminum alloy, in an embodiment, and which is holding the glass panels tight and together, resisting from imploding forces of atmospheric pressure in case of low-pressure inside the shaft and resisting exploding forces of high-pressure, if any, inside the shaft, thus forming a sturdy constructive assembly, in an embodiment.

The combination of a Hoistway Belt and one-story glass panels assembly forms a one-story Elevator Shaft assembly with smooth surface inside the Elevator Shaft assembly, in an embodiment. This example one-story elevator shaft assembly has a doorway entry on one side, “sitting” atop the “Hoistway Belt” and allowing people, animals and things to enter in and exit out of the elevator Cabin, in an embodiment.

Multiple one-story elevator shaft assemblies (also referred to herein as “hoistway sections” or “shaft sections”) may be stacked on top of each other, forming an elevator Hoistway with a plurality of stories (floors) assemblies with a doorway entry at each floor level and having a uniform (and/or flat) surface inside the Hoistway for smooth Cabin ride and proper vacuum operation, in an embodiment. For example, (vertically) uniform, smooth, even, or uniformly smooth/even surface for any portion of the inner surface of the hoistway, may be determined by the ground vertical projection of all inward-facing points of the surface for the portion, forming a closed contour of the hoistway, or at least a portion thereof, whereas the width of the contour (portion) is limited to the tolerance margins of the hoistway shaft dimension variations.

Hoistway Belts at each floor level may be leveled-up with the floor and affixed to the floor, making the whole construction steady. In an embodiment, the Hoistway Belts lie within the thickness of the floor, thus making the glass panels appear to run from floor to ceiling.

The entire construction is resting on a plurality of pins, which are freely resting on the foundation frame, in an embodiment. Thus, the whole construction is detached from the Hoistway Foundation 100, allowing the system to resist earthquake shakes and shocks, in such an embodiment.

The walls of the elevator Cabin are also made from tempered glass and are affixed to the Cabin floor and the Cabin top (ceiling), in an embodiment, and carry the weight of the Cabin together with its load.

The glass-made Cabin is sliding in a glass-made Hoistway shaft (Hoistway Shaft), supported by vacuum forces via the creation of lower air pressure above the Cabin, in an embodiment, allowing the higher atmospheric pressure below the Cabin to push the Cabin up, overcoming the gravity forces imposed on the Cabin and its load.

The lower air pressure above the Cabin is created via a high airflow compressor equipment that “sucks” the air from the elevator Hoistway above the Cabin and creates enough aerial pressure difference in the Hoistway above and below the Cabin—to push the Cabin up.

The advantages of a glass vacuum elevator system include the following benefits compared to other existing solutions:

- is not required for the elevator system to incorporate any rails, guides, hydraulics, ropes, belts, pulleys, gears, chains, or counterweights, and, therefore, is simpler to install and maintain has significant aesthetic advantages, since translucent large glass panels are a better fit into practically any interior, even if installed in the middle of the room the construction is very compact, occupying several times smaller footprint compared to any other existing solution is safer to use compared to traditional elevator models, in particular, it is child-safe, fall-proof, fireproof, shockproof, shatterproof, power outage friendly has a lower cost of manufacturing due to lower cost of used materials has inherent transportation and assembly advantages due to less bulky parts has lower maintenance costs due to a small number of wearable parts and absence of lubrication is eco-friendly, does not require lubricants and is fully recyclable after demolition.

In one embodiment the glass Hoistway—is a triangular shaped Hoistway, comprising of 3 large glass panels running from floor to ceiling and a doorway entry at each one-story assembly. In this embodiment a triangular shaped Cabin is installed in the Hoistway.

In an alternate embodiment the glass Hoistway—is a rectangular shaped Hoistway, comprising of 4 large glass panels running from floor to ceiling and a doorway entry at each one-story assembly. In this embodiment a rectangular shaped Cabin is installed in the Hoistway.

In an alternate embodiment the glass Hoistway—is a pentagonal shaped Hoistway, comprising of 5 large glass panels running from floor to ceiling and a doorway entry at each one-story assembly. In this embodiment a pentagonal shaped Cabin is installed in the Hoistway.

In an alternate embodiment the glass Hoistway may be of a hexagonal form, comprising of 6 large glass panels, running from floor to ceiling on each floor. Doorway entry may be installed within 2 adjacent Hoistway glass panels.

In another embodiment the glass Hoistway is of an octagonal shape comprising of 8 large glass panels, running from floor to ceiling on each floor. This embodiment may be visualized as a rectangular shaped Hoistway, where the angular edges of the Hoistway are "flattened" to form additional panels. These "angular flat edges" allow reducing the width of other "non-angular flat" edges of the Hoistway. Such embodiment becomes handy for large size elevator models where the width of the Hoistway may be substantially wider than the opening of the Hoistway door.

In another embodiment the glass Hoistway is of a cylindrical shape with a straight vertical axis. In such an embodiment, a cylindrical shaped Cabin is placed in a cylindrical Hoistway. This embodiment is more suitable for larger models carrying more people and heavier loads.

In a different embodiment the glass Hoistway has an ellipsoid shape with straight vertical axises. In such an embodiment, an ellipse-shaped Cabin is placed inside an ellipsoid-shaped Hoistway and is more suitable for larger models carrying large groups of people and heavy loads.

In a different embodiment the glass Hoistway has a horseshoe shape with straight vertical axises. In such an embodiment, an ellipse-shaped Cabin with a flattened side is placed inside an ellipsoid-shaped Hoistway with a flattened side and is more suitable for larger models carrying large groups of people and heavy loads.

As discussed in the above embodiments, the approaches described herein include a multitude of different shapes for the Hoistway and a multitude of different shapes for the Cabin.

An alternate embodiment, the Hoistway and/or the Cabin includes multi-layer tempered glass panels, where a multitude of tempered glass panels are glued together by means of a special adhesive, forming a "safety glass" panel.

In another embodiment, one or more panels of the Hoistway are made of matte tempered glass, to obscure the contents of the Hoistway and/or Cabin—for the specific taste of elevator users. In an alternate embodiment, one or more panels of the Hoistway are painted or covered with a semi-translucent or non-translucent film, to hide the contents of the Hoistway and or Cabin, for the specific taste of elevator users.

In an alternate embodiment, the Cabin's one or more panels, or their parts, are made of matte glass, to obscure the contents of the Cabin—for the taste and comfort of elevator users. In an alternate embodiment, one or more panels of the Cabin or their parts are painted or covered with a semi-translucent or non-translucent film, to hide the contents of the Cabin completely or partially, for the taste and comfort of elevator users.

In one embodiment the vacuum compressor is situated atop the elevator Hoistway, thus forming a machine room (MR) atop the Hoistway.

In an alternate embodiment the vacuum compressor may be detached and remotely located in an attic, roof, or other location and connecting the Hoistway to a remote vacuum compressor via pipes for remote air intake and exhaust.

An alternate embodiment of the glass vacuum elevator system includes a feedback pipe from the compressor airflow exhaust connected to the bottom of the Hoistway for circulating the air from the top of the Cabin to its bottom. Such a system maintains the required pressure difference above and below the Cabin for normal elevation operation, while reducing the pressure variations on each glass panel compared to atmospheric. For example, in such a system, Hoistway glass may have a reduced thickness, as Hoistway glass panels are exposed to a fraction of (e.g., ½) of the air pressure swings in relation to atmospheric. This embodiment may include complex construction of the Hoistway Doors, as such doors need to withstand both the inward and the outward pressures at different times.

In one embodiment the Cabin roof incorporates additional mechanisms, like lighting, ventilation system, voice communication.

In an alternate embodiment, the roof of the Cabin is made of translucent glass, having a thin frame at its edges. For example, this and other embodiments may leave little or no space for mechanisms like the ventilation system. For that purpose, the air ventilators may be installed under the Cabin floor with air intake at the floor level and pushing the air outside and around the Cabin to the Hoistway through air slits below the floor. This suction of the air from the Cabin and slight increase of air pressure outside and around the Cabin creates an air inflow into the Cabin from air slits at the roof frame, resulting in air inflow from the Cabin's roof, in an embodiment. This embodiment provides a constant airflow of the ventilation system in the Cabin where the air flows from the Cabin's roof while there may be no visible means of ventilators or pipes that can direct the air inflow. The upper and lower Cabin seals ensure a constant air pressure outside and around the Cabin for the ventilation system to work, in such an embodiment.

In one embodiment the Cabin has an embedded docking mechanism allowing the Cabin to dock to the destination floor by means of self-guided extendable and retractable pins that extend from the Cabin floor and dock to the Hoistway after the Cabin arrives at the destination floor.

After docking, the vacuum compressor shuts down, thus keeping the entire system in low-energy idle mode, awaiting passengers. In an embodiment, the Cabin includes a single docking mechanism, thus having one docking mechanism working for multiple floors. In this embodiment, the Hoistway has a significantly simpler and lower construction cost, while the Cabin cost may increase slightly.

In an alternate embodiment the docking mechanism is implemented at each floor level in the Hoistway and not in the Cabin, thus increasing the cost of the Hoistway, but simplifying the cost and operation of the Cabin.

In one embodiment the Cabin has a separate extendable and retractable pin or pins that mechanically open and close the Cabin and Hoistway Doors. The benefit of having the doors opening/closing mechanism implemented and operating from inside the Cabin is—one door opening mechanism working for multiple floors, without having a door opening mechanism duplicated for each floor. Also, this is a safer approach, as it eliminates the possibility of Hoistway Doors opening accidentally in case of an absent Cabin, due to failed electronics controls.

In an alternate embodiment the door opening/closing mechanism is implemented at each floor level in the Hoistway and not in the Cabin, thus increasing the cost of the Hoistway, and may be reducing the safety of the system.

At the Hoistway Belt level of each floor there is a closed enclosure—the Hoistway Base. The Hoistway Base is attached to the Hoistway Belt on one side and to the floor of the dwelling space on the other side, thus fixating the Hoistway to the house construction at each floor level.

The Hoistway Base is installed within the thickness of the floor and is covered with a special rigid and ribbed metal cover serving as a pathway/entrance to the Cabin. Once the cover is removed, it exposes the Hoistway Base contents for Hoistway Base service works.

The Hoistway Base includes one or more of the following mechanisms, in an embodiment:

- Sensors detecting the position of the Cabin in the Hoistway
- Receptacles for the docking pins along with electrical contacts for Cabin battery recharging
- Doors opening/closing spring-chain mechanisms along with sensors detecting obstacles in the path of the Hoistway doorway and failures of the spring-chain mechanism, if occurred
- Vertical adjustment mechanism tuning the Hoistway Doors for proper vacuum operation
- Locking mechanism that locks the Hoistway Doors in the absence of the elevator Cabin
- Electrical and electronic circuitry ensuring power supply for battery charging, sensors operation and communication with Hoistway PLC controller.

In one embodiment the Hoistway and Cabin doors are opening/closing in a slide operation sitting on and rolling over special rails. This embodiment is better suited for circular or ellipsoid shaped elevator Hoistway. Another benefit of this approach is that both the Hoistway and the Cabin doors are not extending from the Hoistway's footprint, adding more flexibility to the space limitations at the Cabin entrance.

In an alternate embodiment the Hoistway and Cabin doors are opening/closing in a parallel swing by means of levers that keep doors substantially parallel to their opening while swinging the doors to open/close. This embodiment is better suited for hexagonal, octagonal, circular and ellipsoid type Hoistway. It is less space-efficient than the sliding opening mechanism above.

In a different embodiment the Hoistway and Cabin doors are opening/closing in a swing operation sitting on hinges. This embodiment is better suited for rectangular, hexagonal and octagonal shaped Hoistway, although it may be suitable for circular and ellipsoid Hoistway too.

In one embodiment both the Hoistway and the Cabin have a single-leaf door. This embodiment simplifies the construction of both the Hoistway and the Cabin but may require extra clearance for the Hoistway Doors due to a large swing of a single-leaf door. This embodiment may be a preferred choice for low-cost, compact models in the line of elevator products.

In an alternate embodiment both the Cabin and the Hoistway have double-leaf doors. The double pair doors are opening in an outward swing (sliding, parallel or circular) and take less space compared to single-leaf embodiment. This type of construction may be a preferred choice for higher-priced models in an upper (more luxury) line of elevator products.

In one embodiment, the doorway entries at each floor level of the Hoistway and the Cabin—are facing the same direction. In such an embodiment, people need to enter and exit the Cabin from the same side at each floor level.

In an alternate embodiment the doorway entries at each floor level may be facing different directions depending on the architectural requirements and the layout ergonomics of the living space (different side entry).

For rectangular-, hexagonal-, octagonal- and ellipsoid-shaped Hoistway implementations, in the different side entry embodiments, the Cabin, in addition to the first set of doors, may need to be equipped with an additional set of doors and door mechanisms at the opposite side of the Cabin—opposite to the first set of doors. This approach allows people to enter from one side of the Cabin and exit at the opposite side, when required so. Such an embodiment complicates the construction of the Cabin and increases its cost, but best accommodates the architectural restrictions and the requirements of living space, when needed.

For circular shaped Hoistway different side entry embodiment may be accommodated by having the double and opposite door operating mechanisms in the Cabin. Alternatively, a circular Cabin may have just a single door operating mechanism but enabling the Cabin to rotate around Hoistway's vertical axis and to modify and adjust its position to match the position of Hoistway Doors at the destination floor, as needed. This Cabin's rotation may be performed during its vertical motion, resulting in an overall spiral motion of the Cabin during ascend or descend, while the Cabin orients itself, to position the Cabin doors with the Hoistway entrance. In such an embodiment the Cabin's rotation may be accomplished by rubber wheels attached to the Cabin and pressed to the circular Hoistway Shaft. Rotation of such rubber wheels in horizontal plane results in a horizontal rotation of the Cabin. Precise electronics can control the amount of rotation the Cabin needs to undergo, in order to position with the destination floor properly.

In an embodiment, the Hoistway is equipped with an upper valve situated at the top of the Hoistway that may shut-off the airflow and prevent the air from escaping or entering the Hoistway at the top. Such mechanism is needed for emergency brakes as part of the safety mechanism which allows halting the Cabin in mid-air if a fall risk situation is detected, e.g., an electricity outage while the Cabin was in motion or compressor failure due to its physical damage and impeller break—all resulting in a sudden loss of vacuum operation. Once the upper valve is activated, the Cabin soon stops its free fall, being supported by atmospheric pressure from the bottom and is "hanging" from the lower air pressure at the top, which is created by Cabin's own weight (syringe effect). The upper valve can also be activated automatically in other scenarios when a failure condition is detected in lower-level door mechanisms, door locks and seals that can potentially compromise the vacuum operation and the safety of passengers, even if no imminent fall risk is detected. Once the upper valve has been shut-off, the Cabin quickly halts its motion and gradually and slowly descends to the ground floor due to natural air leaks of the system.

In an embodiment, the upper valve is activated by an electromagnetic lever powered by rechargeable batteries that operate with and without external power. As part of the safety mechanism, additionally or alternatively, the upper valve may be activated by means of automated mechanical deployment in case the electrical circuitry failed to intervene (failure one of the: electromagnetic lever, the accelerometer at the Cabin, the control block or the reserve battery supply). This mechanical deployment of the upper valve—may serve as a redundant safety mechanism that improves the overall safety of the system.

Additionally, or alternatively, the Hoistway may be equipped with a lower valve situated at the bottom of the shaft that may shut-off the airflow and prevent the air from escaping or entering the Hoistway at the Hoistway bottom. Such a mechanism is part of the safety mechanism, which is activated when one or more safety risk factors are detected. In addition to the fall-risk factors defined above, e.g., failure of the vacuum seal (Vacuum Seal) of the Cabin, an unlikely scenario of partial destruction of the upper portion of the shaft resulting in a sudden loss of vacuum operation, when the upper valve is not sufficient to prevent the air from escaping the shaft may trigger the described safety mechanism(s). Once the lower valve has been shut-off, the Cabin quickly halts its motion, supported by higher than atmospheric air pressure below the Cabin, and gradually and slowly descends to the ground floor due to natural air leaks of the system. In other words, the Cabin is "sitting" on an air cushion with higher pressure, while "hanging" from a thin air, thus, preventing the Cabin from falling.

The lower valve may be activated by an electromagnetic lever powered by rechargeable batteries that operate with and without external power and may have a redundant mechanical deployment mechanism in case the electromagnetic mechanism fails, similar to electro-mechanical redundant deployment implementation of the upper valve.

In an embodiment, both the upper and lower valves complement each other and ensure the safety of Cabin passengers during different risk factors of the system and provide a safety mechanism effectively eliminating any and all fall risks. If the system detects one of the failure risks described above, while the Cabin was docked to a floor, the system flags an error condition, and the Cabin stays docked to that floor until the error condition is resolved in the system, without a need to deploy the emergency brakes—the upper and/or lower valves, in an embodiment.

In addition to upper and lower valves that slow-down Cabin's descent in case of sudden loss of vacuum, the system, in an embodiment, may be equipped with suspension mechanism placed at the Hoistway Foundation that catches Cabin and slows it down to full stop, similar to suspension shocks and struts used in cars.

In an embodiment, the Hoistway has a set of electromechanical and electronic sensors connected electrically to a Hoistway controller device (e.g. Programmable Logic Controller, hereinafter referred to as the "Hoistway controller" or the "Hoistway PLC"), which detects signals from sensors and forms controlling signals to Hoistway actuators and motor invertor for controlling the work of the vacuum compressor. Additionally, the controller may process signals from elevator call buttons from different floors and can put the calls in a queue for processing and ensuring the optimal operation of the elevator.

The Cabin, in an embodiment, has a set of its own electromechanical and electronic sensors connected electrically to, in some embodiments, a separate controller device (e.g. Programmable Logic Controller, hereinafter referred to as the "Cabin controller" or the "Cabin PLC"), situated inside the Cabin and processing signals from Cabin sensors and sending signals to the Cabin control mechanisms, the docking mechanism, the doors opening/closing, controlling Cabin lights and ventilation, the emergency communication, also detecting Cabin call commands and putting call commands in a queue ensuring the optimal operation of the elevator.

In other embodiments, a single controller may perform the functions of the Cabin and the Hoistway controllers.

In one embodiment, an electrical cable is connected between the Cabin and the Hoistway, supplying electrical power to the Cabin and providing means of communication between the Cabin PLC and the Hoistway PLC.

In an alternate embodiment, the Cabin PLC communicates with the Hoistway PLC via a wireless channel (IR, Bluetooth or Wi-Fi), eliminating the need for an electric cable connecting the Cabin and the Hoistway. In this embodiment the Cabin incorporates a rechargeable battery, providing local power supply in the Cabin. The Cabin rechargeable battery may recharge itself when the Cabin is docked to a floor—via electric wiring through the docking pins, ensuring an automatic charging of Cabin batteries during the docked mode, thus, ensuring uninterrupted power supply to the Cabin at all times, whether docked or in motion, or during short power outage.

When the Cabin is in motion, the Cabin rechargeable batteries provide life support of the Cabin: the lights, the fan, communication between the Hoistway and Cabin PLCs and means of emergency communication with the worldwide technical support 24/7.

In an embodiment, the Hoistway too is equipped with rechargeable batteries, providing life support for the Hoistway controller and its sensors, the upper and lower emergency brake valves and the suspension mechanism, in case of power outage and until the Cabin comes to a full stop and docks to the ground floor, awaiting the restoration of power or liquidation of failure scenarios.

In an embodiment, during vacuum operation, the Hoistway Doors are pressed against the Hoistway by atmospheric pressure with significant force (around 1 ton), preventing from opening by manual means, without special tools designed for that purpose. Hoistway Doors may also lack any handles, making it practically impossible to tamper with the doors during vacuum operation.

In addition, Hoistway Doors may be equipped with automatic locks, preventing the doors from opening in the absence of the elevator Cabin. Hoistway Doors may be opened in the presence of a docked Cabin at that floor, by mechanisms installed either in the Cabin or in the Hoistway. This mechanism is child-safe and is designed in a way that prevents any possibility of tampering with the system for foul play or irresponsible actions.

The main Vacuum Seal is installed at the top of the Cabin, enabling the vacuum operation and lower air pressure above the Cabin, while maintaining normal atmospheric pressure inside the Cabin, for the comfort of its passengers.

Additionally, or alternatively, the secondary or auxiliary Vacuum Seal is installed at the bottom of the Cabin for the following reasons:

- Serving as a back-up seal in case of the main vacuum seal failure
- Protecting people and animals in the Cabin from a sudden increase of pressure in case the lower valve is deployed in an unlikely case of an emergency brake. This is done for the comfort of passengers, who otherwise may experience air popping in their cars from a sudden change in the Cabin pressure due to a sharp increase of the air pressure below the Cabin, and causing it to slow-down, preventing a fall.

In one embodiment the Vacuum Seal is implemented from HDPE (High Density Polyethylene) material that has low friction with glass and excellent longevity properties. In this embodiment the Vacuum Seal is slightly extended from the Cabin sides and is pressed against the Hoistway wall by vacuum damper that may be made of multitude of springs or a spongy resin tube pushing the Vacuum Seal to the Hoistway wall alongside the entire seal length. This Vacuum Seal may be placed on each side of the Cabin. Such construction allows the Vacuum Seal to float during motion, accommodating Hoistway manufacturing imperfections, while being constantly attached to the Hoistway wall for proper vacuum operation.

In an alternate embodiment, the Vacuum Seal is made from materials other than HDPE, also having low friction and high longevity properties, e.g., Polytetrafluoroethylene (also known as Teflon) or combination of aluminum alloys or other metals coated with Teflon.

In one embodiment the Vacuum Seal is implemented in the form of horizontal stripes. This form simplifies the construction of the seal; however, it presents a disadvantage of having an intermittent “flappy” noise sound when the seal is crossing edges of the Hoistway Belt and Hoistway glass panels. Such “flappy” noise may be tolerable for most installations.

In a different embodiment the Vacuum Seal is implemented in form waves, or angled beams or zigzags, or saw-like shape, or any other shape, allowing the seal shape to be “spread” vertically, in order to stretch in time the crossing of the Hoistway Belt seam by the Vacuum Seal, thus “spreading” the “flappy” noise across a longer time period, which ultimately reduces unwanted noise levels. This complicates the construction of the Vacuum Seal and makes it more expensive to manufacture, for the comfort of elevator passengers and may be better suited in “luxury” elevator installations.

The safety of the system is ensured at multiple levels, in an embodiment:

- Shatterproof. The tempered glass panels of the Hoistway and the Cabin are unbreakable
- Shockproof. Resistant even to strong earthquakes
- Fall-proof. Equipped with suspension and emergency brakes with multiple redundancy
- Fireproof. Withstands strong fires, as the system is made of non-burning materials
- Child-safe, injury hazard free. No child tampering or injury is possible throughout the system
- Accident-proof. Doors are locked during operation, impossible to tamper with Hoistway Doors
- Trap-proof. If stuck in the elevator, there is manual override, enabling escape from the Cabin
- Eco-friendly—no hazardous chemicals, all recyclable materials, lubricated for life
- 24/7 monitoring. Constant monitoring of sensors and reporting to the Tech. Support via TCP/IP The present solution is also an aesthetically pleasing design. The elevator system may include large translucent glass panels running from floor to ceiling, translucent Cabin with glass walls and glass ceiling, and thin aluminum profiles. In particular, embodiments of the system do not exhibit any visible means of bolts and nuts both from the outside and from the inside of the Hoistway at any floor level. In the meantime, the system is assembled from many hundreds of pieces that are put together with bolts and nuts and other means of mechanical connectivity. The whole construction may be implemented in a way that hundreds of bolts are nuts are concealed from eyesight by design features (not by masking tapes), thus, making the entire design sleek and stylish. This challenging task was carried forward to improve the design aesthetics of the system and puts the present solution in the class of luxury machinery and luxury property.

In addition, there are not any visible bolts and nuts or any sticking out connectors to the Cabin either, whether from inside or outside—for the luxury and comfort of its passengers according to embodiments. The Cabin too—may be comprised hundreds of parts that are put together with classical bolts and nuts invisible to an observer, thanks to the special construction of the system manifesting this unique and luxury design property.

This bolt-less and nut-less design implementation, further referred to as “spotless” design, allows achieving smooth surfaces in the entire construction. Large glass panels and sleek aluminum frames from edge to edge—this is one of the unique aesthetic design features of the present solution.

And last, but not least, the design features of the metal frames, lines, curves and angles are smoothly transitioning and continuing a design pattern, upon sharp turn of metal frames (e.g. frames at four different sides of a glass panel), thus, complementing the “spotless” design style.

The present approaches may be better understood and reproduced by those skilled in the art by referencing the accompanied drawings with detailed description of machinery, operating modes, and principles.

While the foregoing written description of the approaches enables one of ordinary skill to make and use what is considered presently to be the best mode thereof, those of ordinary skill may understand and appreciate the existence of variations, combinations, and equivalents of the specific embodiment, method, and examples herein. The invention should therefore not be limited by the below described embodiment, method, and examples, but by all embodiments and methods within the scope and spirit of the invention.

For the purposes of simplicity, the Detailed Description section is divided into chapters, each chapter representing a particular feature, design, or a technical solution.

Hoistway Mechanics

Chapter 1. Panoramic Vacuum Elevator System

The present techniques rely on vacuum forces to move the elevator Cabin up and down in an airtight sealed Hoistway Shaft, whereas a vacuum compressor, situated atop the Hoistway Shaft, in an embodiment, pumps the air out of the Hoistway section above the Cabin (further Upper Hoistway Chamber), thus creating a low air pressure in the Upper Hoistway Chamber, while maintaining atmospheric pressure level in the Hoistway section below the Cabin (further Lower Hoistway Chamber). The air pressure difference between the Lower Hoistway Chamber and the Upper Hoistway Chamber is called "vacuum" and the percentage of the pressure difference between the two chambers compared to atmospheric pressure is called "vacuum level". When the vacuum level reaches a certain threshold, the higher atmospheric pressure under the Cabin overcomes the gravitational forces exerted on the Cabin and pushes the Cabin up the Hoistway Shaft, thus bringing the elevator Cabin into a vertical motion.

For example, 0% vacuum level means full atmospheric pressure below and above the Cabin, 50% vacuum means half of the atmospheric pressure above the Cabin and 100% vacuum means absence of any air pressure above the Cabin.

Relatively small level of vacuum is sufficient for bringing a Cabin with a heavy load into vertical motion. For example, an elevator Cabin together with 4 adult passengers may weigh anywhere between 1,000-1,400 lbs and occupy a Cabin floor space of 12-15 sq.f. In this example, approximately 5% of vacuum above the Cabin, while maintaining atmospheric pressure below the Cabin, is sufficient to lift such a Cabin and its heavy load up the Hoistway Shaft.

As long as the Cabin is interfacing the Hoistway Shaft by means of low-friction Vacuum Seal and the vacuum compressor is maintaining a threshold of 5% vacuum—this vacuum level creates a sufficient vertical force to push the elevator Cabin up the Hoistway. Lowering the vacuum level below this threshold of 5% vacuum results in the Cabin descending the Hoistway Shaft.

Alternatively, the vacuum level can be reduced to 0% and the cabin descent can be controlled by the drag that atmospheric pressure imposes on compressor impellers. In this case, the compressor motor can act like a generator, producing electricity on cabin's descent, similar to electric cars like Tesla, generating power when the car brakes.

The Hoistway walls are made to be smooth and enable the Cabin Vacuum Seal to slide up and down the Hoistway Shaft unimpeded and with minimal friction—to fulfill its purpose effectively. For the purposes of presented techniques, low-friction or minimal friction means, that the additional force, required to overcome the friction forces of the Vacuum Seal, in addition to lifting an empty Cabin, is within 10% of the empty Cabin's weight.

In an embodiment, silicate-based glass (also known as "floating glass") panels are used in the present approaches as a material of choice in the composition of Hoistway walls because of smooth and even surface properties of glass.

Furthermore, in an embodiment, for the Hoistway material the present approaches use tempered glass panels, that are about 5-7 times stronger than regular floating glass and may withstand pressures comparable or exceeding to that of steel. These tempered glass panels run from floor to ceiling of each floor (furthermore referred to as a "one-story Hoistway body"), making the construction truly panoramic.

The tempered glass itself, unlike acrylic glass, is an extraordinarily strong and scratch-resistant material, however, it may be fragile on its edges. A sharp blow with an iron hammer to an edge of a tempered glass panel may potentially shatter the glass. If such an edge of a glass panel is protected, even with a thin frame, then such a tempered glass panel becomes virtually unbreakable. This technique may be employed throughout the entire Hoistway construction—all edges of the glass panels used in the construction of the Hoistway are covered and protected by metal frames, protecting glass panels from shock damage.

For example, protecting edges of glass panels with metal-made (e.g. aluminum alloy) frames make the Hoistway construction truly shatterproof. The metallic edge frames not only protect the glass panels from accidental shattering, but also strengthen and support the entire construction.

As the Hoistway, in an embodiment, is mostly made of tempered glass and metal edges, the whole construction becomes fire-proof, as the melting point of tempered glass is remarkably high at around 1,400-1,700° C. (2,550-3,000° F.).

Since elevators may run several floors high, a single glass panel may not be used to accommodate for the entire height of the Hoistway Shaft due to manufacturing, technological and other limitations. For that reason, in an embodiment, the maximum height of the Hoistway glass panel is limited to the height of a single floor of the Hoistway Shaft. In such an embodiment, to connect multiple sections of the Hoistway, a mechanism is employed, in which a glass panel section of one floor of the Hoistway interacts with glass panels of the Hoistway sections at above or below floors in such a way, that a uniform smooth surface of the Hoistway is formed, thus allowing smooth sliding of the Cabin Vacuum Seal alongside the Hoistway wall for the elevator's seamless operation.

To connect Hoistway glass panels of adjacent floors a "belt" type structure is employed (also referred herein as "Hoistway Belt", "belt frame" or "belt assembly"), in an embodiment, that connects Hoistway glass panels of one floor to Hoistway glass panels at adjacent floors, forming a smooth surface of the Hoistway for proper vacuum operation. The belt keeps the glass panels intact and prevents from imploding vacuum forces during the vacuum operation, as well as from exploding forces that may form in special circumstances. For example, in case of the Cabin example above having 12-15 sq.f. of the Cabin floor surface and 1,000-1,200 lbs load, each glass panel of the Hoistway that runs from floor to ceiling may experience an imploding force of 3,000-4,000 lbs (this force is evenly distributed across the entire area of a glass panel). Glass panels of the Hoistway are made of sufficiently thick glass to withstand imploding or exploding forces at the levels of several thousands of pounds across its surface area.

The example one-story Hoistway Shaft of each floor contains at its bottom a Hoistway Belt that holds Hoistway panels tight and together, resisting from exploding and imploding forces. The Hoistway Belts at each floor level are leveled-up with the floor and affixed to the floor, making the whole construction steady. The belts may lie within the thickness of the floor, thus making the glass panels appear to run from floor to ceiling, making the entire construction truly panoramic. In the case of an open space environment, the belts may also run in between the floors, serving as a medium for connecting vertically-ran glass panels together.

The belt is strong enough to carry the weight of the Hoistway Body, it is able to resist both imploding and exploding forces and is made of a special shape to form a smooth surface alongside with Hoistway glass panels. These properties put certain restrictions on the form and material used in the belt. The belt, in an embodiment, is made of strengthened aluminum alloys, demonstrates particularly good performance characteristics and may be easily and affordably manufactured.

The vertical edges of the Hoistway glass panels are covered by thin metal frames and the horizontal edges of the Hoistway glass panels are covered by belts. Both the metal frames and the belts are affixed to Hoistway glass panels by means of silicon-based adhesive or other adhesive that has good adhesion properties of glass with aluminum or with other metal alloys.

Referring now to the present approaches in more detail, the FIG. 1 and FIG. 2 depict different views of the Blissera Elevator system, in an embodiment and FIG. 3-FIG. 7 depict different views and parts of the Blissera Elevator system Hoistway.

The Hoistway is comprised of the Hoistway Foundation 100, plurality of Hoistway Shaft members 200, plurality of Hoistway Belt members 300, and the Hoistway Head 400, as shown in FIG. 3-FIG. 5, FIG. 7. For simplification purposes of the drawings, the Hoistway Belt 300 is incorporated into the Hoistway Shaft 200.

The Hoistway Foundation 100 includes the following main components, in an embodiment:

- Hoistway Foundation Enclosure 110, as shown in FIG. 12, FIG. 13 and FIG. 14, in an embodiment and comprised of:
  - Hoistway Foundation Enclosure bottom plate 111, as shown in FIG. 14
  - Hoistway Foundation Enclosure left plate 112, as shown in FIG. 14
  - Hoistway Foundation Enclosure right plate 113, as shown in FIG. 14.
  - Hoistway Foundation Enclosure back plate 114, as shown in FIG. 14
  - Hoistway Foundation Enclosure front plate 115, as shown in FIG. 14.
  - Hoistway Foundation Enclosure bottom screws 116, as shown in FIG. 14
  - Hoistway Foundation Enclosure side screws 117, as shown in FIG. 14
- Hoistway Foundation Base 120, as shown in FIG. 12, FIG. 15 and FIG. 16, in an embodiment and comprised of:
  - Hoistway Foundation Base front arm 121, having a profile cross-section of form 711, as shown in FIG. 16 and FIG. 17.
  - Hoistway Foundation Base left arm 122, having a profile cross-section of form 711, as shown in FIG. 16 and FIG. 17
  - Hoistway Foundation Base right arm 123, having a profile cross-section of form 711, as shown in FIG. 16 and FIG. 17
  - Hoistway Foundation Base back arm 124, having a profile cross-section of form 711, as shown in FIG. 16 and FIG. 17.
  - Hoistway Foundation Base front plate 125, having a profile cross-section of form 712, as shown in FIG. 16 and FIG. 17
  - Hoistway Foundation Base left plate 126, having a profile cross-section of form 712, as shown in FIG. 16 and FIG. 17
  - Hoistway Foundation Base right plate 127, having a profile cross-section of form 712, as shown in FIG. 16 and FIG. 17.
  - Hoistway Foundation Base back plate 128, having a profile cross-section of form 712, as shown in FIG. 16 and FIG. 17.
  - Hoistway Foundation Base fixating bolts 129, as shown in FIG. 16
- Hoistway Foundation Frame 130, as shown in FIG. 12, FIG. 18-FIG. 22, in an embodiment and comprised of:
  - Hoistway Suspension Platform 131, as shown in FIG. 20-FIG. 22
  - Front edge frame 132, having a cross-section of form 715 with a channel 718 reserved for cabling, as shown in FIG. 20-FIG. 22, FIG. 23
  - Gasket 133, having a cross-section of form 738, as shown in FIG. 20-FIG. 22.
  - Left and right edge frames 134, having a cross-section of form 713, as shown in FIG. 20-FIG. 22, FIG. 24
  - Front base edge frame 135, as shown in FIG. 21-FIG. 22.
  - Back edge frame 136, having a cross-section of form 713, as shown in FIG. 20-FIG. 22, FIG. 24
  - Earthquake resistant bolts 137, as shown in FIG. 18, FIG. 19, FIG. 21, FIG. 22
  - Knee connectors 138, as shown in FIG. 18, FIG. 19, FIG. 22.
  - Bolts 139, connecting knee connectors 138 to the left and right edge frames 134 and the back edge frame 136, as shown in FIG. 19, FIG. 22.
  - Bolts 145, connecting front base edge frame 135 to the left and right edge frames 134, as shown in FIG. 18, FIG. 21, FIG. 22
- Hoistway Foundation Grill Frame 140, as shown in FIG. 12, FIG. 27-FIG. 29, in an embodiment and comprised of:
  - Left Grill Frame 141, as shown in FIG. 25-FIG. 29
  - Right Grill Frame 142, as shown in FIG. 25-FIG. 29
  - Back Grill Frame 143, as shown in FIG. 25-FIG. 29
- Suspension Mechanism 800, as shown in FIG. 12
- Emergency Brakes 880, as shown in FIG. 12

The Hoistway Belt 300 includes the following main components, in an embodiment:

- Hoistway Base Body 320, as shown in FIG. 80, FIG. 88, FIG. 91-FIG. 103, in an embodiment and comprised of:
  - Hoistway Base Body Frame 301, with a cross-section of form 733, as shown in FIG. 97, FIG. 98, FIG. 100, FIG. 102 and FIG. 140.
  - Hoistway Base side plates 321, with a cross-section of form 734, as shown in FIG. 95-FIG. 99, FIG. 101, FIG. 102 and FIG. 140.
  - Hoistway Base cover plate 322, with a cross-section of form 735, as shown in FIG. 95-FIG. 99, FIG. 101-FIG. 103 and FIG. 140.
  - Hoistway Body bolts 324, 326, 327, 328, as shown in FIG. 96-FIG. 98
- Hoistway Belt Frame 309 and 310, as shown in FIG. 80-FIG. 86, FIG. 88-FIG. 90

In FIG. 80, FIG. 82-FIG. 85, the Belt Frame 309 and 310 has three arms (sides) that serve as a foundation for each of the glass panels of the one-story Hoistway body—the left belt arm 311 (also referred to herein left edge frame 311), the right belt arm 312 (also referred to herein right edge frame 312) and the back belt arm 313 (also referred to herein back edge frame 313) (the left belt arm 311, the right belt arm 312 and the back belt arm 313 also together referred to herein belt arms or belt edge frames). As shown in FIG. 33, FIG. 34 and FIG. 37, the glass panels 211 and 213 are resting on and thus, conduct their weight and, in some cases, the weight of the machine room to the left and back arms 311/313 of the Belt Frame 309 or 310, respectively, and their vertical edges, that interface each other, are protected by means of edge frame 214, having a profile cross-section 716, as shown on FIG. 38 and FIG. 138. Similarly, the glass panels 212 and 213 are resting on the right and back arms 312/313 of the Belt Frame 309 or 310, respectively, and their vertical edges, that interface each other, are protected by means of the edge frame 215 with a profile cross-section 716, as shown on FIG. 38 and FIG. 138.

In an embodiment, the interface(s) between the glass panels 211, 212, 213 and arms 311, 312, 313 are slots 3111, 3121, 3131. Slots 3112, 3122 and 3132 may similarly provide an interface with the glass panels that are placed below belt 309. Each of the slots is an enclosure (e.g., cavity) that extends longitudinally either on the top and/or bottom edges of the arms 311/312/313 for inserting the corresponding glass panel, as depicted in FIGS. 85, 86 and 89. In such an arrangement, an adhesive material may be used to glue the glass panel to the corresponding slot.

In an embodiment, a slot may contain a groove collecting excess adhesive material of the adhesive material that affixes the glass panel to the slot. Such a groove collects the excess adhesive material and prevents the excess adhesive material from forming jaggedness on the inner surface of belt 309 or 310. This technique preserves the airtight properties of the hoistway shaft. For example, in FIG. 89, the glass panels 211 and 212 are glued to slots 3111, 3112, 3121 and 3122, with excess glue allowed to flow into grooves 3113 and 3114.

Additionally or alternatively, the edge of the glass panel is chamfered to match the slot on the arm(s) of belt 309 or 310. For example, in FIG. 89, the glass panels 211 and 212 have chamfered edges that are inserted into slots 3111, 3112, 3121 and 3122.

The Belt Frame 309 or 310 is closed on three sides and has an opening on the front side (FIG. 82, FIG. 84), in an embodiment. This open side is connected to the Hoistway Base 320, as shown in FIG. 80, in an embodiment. The Hoistway Base 320, in turn, serves as a foundation of the doorway entry for entering and exiting the Cabin, as shown in FIG. 33 example. In examples of FIG. 3 and FIG. 6, the top and bottom edges of the left, right and back glass panels 211, 212, 213 are protected by Belt arms 311, 312 and 313, respectively. The back vertical edges of the glass panels 211, 212 and 213 are protected by thin metal frames 214 and 215. The front vertical edge of the glass panel 211 is protected by the left frame 221 of the Doorway Frame 220, while the front vertical edge of the glass panel 212 is protected by the right frame 222 of the Doorway Frame 220, as depicted in FIG. 41, FIG. 47, FIG. 63 and FIG. 65. The Doorway Frames 221 and 222 have a cross-section 715 as shown in FIG. 63, FIG. 65 and FIG. 138.

The Doorway Frame 220 also serves as a medium for attaching Hoistway Hinges 226 and 227 in a swing-type operation, in an embodiment. As depicted in FIG. 138, the cross-section 715 of the Doorway Frame 220 (frames 221 and 222), has hollow structure inside, which reduces the weight and the cost of the system, as this frame does not have a requirement for carrying a heavy load of the Hoistway construction.

As shown in the description above, the edges of large glass panels are protected by means of protective frames, such as aluminum alloy-made frames.

In the description above, the vacuum compressor is situated in the Machine Room, atop the Hoistway Shaft 200, in the Hoistway Head 400. In an alternate embodiment, the Machine Room is located remotely and connected to the Hoistway Shaft 200 by means of intake and exhaust tubes for evacuating the air from or releasing the air into the Hoistway Shaft 200, respectively, for vacuum operation. For the purposes of this description, the embodiment of the Machine Room located in the Hoistway Head is further described and Machine Room and Hoistway Head are interchangeable terms.

The Machine Room (MR) includes the following main components, in an embodiment:

- MR Enclosure 410, as shown in FIG. 104-FIG. 107 and FIG. 108-FIG. 109
- MR Electronics 420, as shown in FIG. 110 and FIG. 111.
- Vacuum Chamber 430 with Chamber Front Panel 432, Chamber Left Panel 433, Chamber Right Panel 434, Chamber Back Panel 435 and air filters 431, as shown in FIG. 110, FIG. 112-FIG. 116
- Exhaust Duct 440 with Exhaust Duct Central Channel 440 and Air Pockets 444 and 445, as shown in FIG. 110, FIG. 112, FIG. 117-FIG. 121.
  - Exhaust Duct Central Channel 440 comprising of Duct Back Panel 441, Duct Upper and Lower Panels 442, Duct Front Panel 443.
  - Air Pockets 444 and 445 comprising of Air Pocket Main Plate 447, Air Pocket Upper and Lower Plates 448, Air Pocket Front and Back Plates 449
- Vacuum Compressor Assembly 450, with Vacuum Compressor 456 and MR Exhaust Flange 455, as shown in FIG. 122 and FIG. 123
- MR Exhaust Flange 455, as shown in FIG. 110, FIG. 123 and FIG. 124, and comprising of a flexible flange tube 451, bolts 452 connecting to the flange tube 451 to the MR Compressor 450, bolts 453 connecting the flange tube 451 to the Exhaust Duct 440 and a gasket 454
- MR Compressor Frame 460, comprising of, as shown in FIG. 125 and FIG. 126:
  - Bolts 461, fastening the Vacuum Compressor 450 to the MR Compressor Frame 460
  - Rubber washers 462, shielding the MR Vacuum Compressor Frame 460 from MR Vacuum Compressor vertical vibrations.
  - Rubber Inserts 463, shielding the MR Vacuum Compressor Frame 460 from MR Vacuum Compressor horizontal vibrations
  - First-level edge frames 464, made from a strong metal (e.g. steel) material from a profile with a cross-section of a form 717, as shown in FIG. 138. Serves as a base for MR Vacuum Compressor Frame 460 and an anchor for MR Emergency Brakes 890.
  - Rubber end caps 465, supporting the first-level edge frames 464.
  - Bolts 466 for fastening the rubber end caps 465 to the second-level edge frames 467 using nuts 459
  - Second-level edge frames 467, made from a strong metal (e.g. steel) material from a profile with a cross-section of a form 717, as shown in FIG. 138. Supports the first-level edge frames 464 via the rubber end caps 465.
  - Rubber end caps 468, supporting the second-level edge frames 467.
  - Bolts 469 for fastening the rubber end caps 468 to the MR Base Frame 480
- MR Edge Frame 470 with left edge frame 471, right edge frame 472, and back edge frame 473, all having cross-section of a form 714 with air-pocket 719 reserved for cabling
- Gasket left edge frame 474, gasket right edge frame 475 and gasket back edge frame 476
- MR Base Frame 480 with MR Base Frame Plate 481 and bolts 482, fastening the plate 481 to the MR Edge Frame 470 and to the upper floor Hoistway Front Panel 230
- MR Exhaust Grill 490

The MR Electronics 420 includes the following main components, as shown in FIG. 110 and FIG. 111, in an embodiment:

- MR PLC Controller 421 with controller extensions 422
- MR PLC Controller Display Unit 423
- MR Electronics PCB Board 424
- MR Vacuum Compressor Inverter unit 425

MR Uninterruptable Power Supply unit 426 with rechargeable batteries

In the description above, the Belt Frame 309 or 310 is made of an aluminum alloy material. In an alternate embodiment, the Belt is made of other metals and alloys, including but not limited to steel, however, certain aluminum alloys are chosen for their low cost and good performance characteristics.

In the description above, the glass Hoistway is of a rectangular shape, comprising of 3 glass panels, running from floor to ceiling, and a doorway entry at each floor.

In an alternate embodiment, the glass Hoistway is of a hexagonal shape, comprising of 6 glass panels, running from floor to ceiling of each floor, and a doorway entry installed within 2 adjacent Hoistway glass panels. In such embodiment, a hexagonal shaped Cabin is used.

In another embodiment, the Hoistway is of an octagonal shape, comprising of 8 glass panels, running from floor to ceiling on each floor. This may be visualized as a rectangular shaped Hoistway, where the angular edges of the Hoistway are flattened to form additional panels. These "angular flat edges" allow reducing the width of "non-angular flat edges" of the Hoistway. Such an embodiment becomes handy for large size elevator models where the width of the Hoistway is wider than the opening of the Hoistway door. This embodiment uses an octagonal shaped Cabin in the Hoistway.

In another embodiment, the glass Hoistway is of a cylindrical shape with a straight vertical or inclined axis and a cylindrical Cabin. This embodiment is more suitable for larger models carrying half a dozen and more people and heavy loads.

In a different embodiment, the glass Hoistway has an ellipsoid shape with straight vertical or inclined axises and an ellipsoid Cabin. This embodiment is more suitable for larger models carrying over dozen people and heavy loads.

In another embodiment, one or more panels of the Hoistway are made of matte tempered glass, to obscure the contents of the Hoistway and/or Cabin—for the specific taste of elevator users. In an alternate embodiment, one or more panels of the Hoistway are painted or covered with a semi-translucent or non-translucent film, to hide the contents of the Hoistway and or Cabin, for the specific taste of elevator users.

Further in the document a detailed description of a rectangular shaped elevator system is provided, using large translucent tempered glass panels. The concepts outlined in these approaches are adaptable to hexagonal, octagonal, cylindrical, and ellipsoid forms, or any other form, as well, including using matte, and/or painted, and/or tainted glass.

Chapter 2. Tempered Glass as the Hoistway Exoskeleton

The present approaches claim the benefits of the Panoramic Vacuum Elevator System described in Chapter 1. It was described how large tempered glass panels may be used in the construction of the Hoistway of the Panoramic Vacuum Elevator. It was shown how the edges of glass panels are protected by thin metal frames that are affixed to the edges of glass panels with silicon based or other adhesives, together forming a uniform smooth surface of the Hoistway. However, from that description it was not evident how said glass panels (Hoistway walls) and the metal frames are put together to form a steady Hoistway construction.

Large glass panels are very beautiful and are used in many applications, like large displays of storefronts, large windows, panoramic displays for buildings, etc. (collectively referred to as "display"), however, all these applications employ a hard metallic "frame" that is used as a skeleton of the "display" and glass panels are inserted into such metallic frame as a "filler".

Referring now to the present approaches, as glass panels of the Hoistway are stack-up together alongside with Hoistway belts several floors high, the overall weight of the Hoistway with glass panels, e.g. ½" or ¾" thick, may get to several tons. If glass panels of the Hoistway, in this example, are used as a "filler", then a metallic "frame" skeleton structure, that accommodates and holds the Hoistway glass panels, is strong and sturdy enough to get to several floors high and to carry the weight of Hoistway glass panels of several tons. Such metallic frame skeleton construction itself may be heavy, in addition to the cumulative weight of the Hoistway glass.

The present approaches take a drastic new approach in the construction of the Hoistway—the glass panels, that the Hoistway is made of, are not the "fillers" in the metallic "skeleton frame" of the Hoistway, but are the construction in itself, carrying the weight of the entire Hoistway. As such, the present approaches eliminate the need for a metallic skeleton frame in the Hoistway construction and replaces it with a glass-made "exoskeleton", that supports the weight of the entire Hoistway.

This glass-made exoskeleton approach enables using vertical metal edge-frames for protecting the edges of glass panels and not for the purpose of a skeleton frame. As a consequence, these edge frames may be very thin, decorative, thus, dramatically reducing the weight and the cost of the system, while improving it looks and ergonomics.

Hoistway walls, in an embodiment, include the Hoistway body 210, comprising of left, right and back glass panels 211, 212, 213, the front panel 230, the Hoistway Doors 240 and 250 and metallic frames, wrapping the edges of large glass panel elements, as shown in FIG. 33, FIG. 34, FIG. 37-FIG. 39, FIG. 40, FIG. 41 and FIG. 47.

The belt 310 covers and protects the horizontal edges of the glass panels 211, 212 and 213, as shown in FIG. 33, FIG. 34, in an embodiment.

The vertical metal edge frames 214 and 215, in an embodiment, that are used at the back side of the Hoistway, as shown in FIG. 37, having a profile cross-section 716, as shown in FIG. 138—are very thin, thanks to the glass-made exoskeleton of the Hoistway, and serve the following purpose:

- Protecting the vertical edges of the Hoistway glass panels 211, 212 and 213 interfacing the back side of the Hoistway Body 210
- Lining-up adjacent glass panels and forming a uniform smooth rectangular angle for the internal surface back corners of the Hoistway Body 210
- Covering-up uneven and potentially chipped edges of glass panels, as a result of manufacturing imperfections, transportation and handling induced minor damages—serving decorative purposes.

Similarly, the vertical metal edge frames 221 and 222 of the Doorway Frame 220, used at the front side of the Hoistway, in an embodiment, and facing Hoistway doorway entrance side, may be made of thin profiles too, thus, eliminating a need to support a skeleton-like construction, thanks to the glass-made exoskeleton Hoistway. As shown in FIG. 41, FIG. 45, FIG. 47 and FIG. 66, the frames 221 and 222 do not have to be substantially thick to form a skeleton of the Hoistway, but rather thick enough to accommodate the following usage of these frames:

Protecting the vertical edges of the Hoistway glass panels interfacing the front side of the Hoistway Lining-up with left and right glass panels 211, 212 and forming a uniform smooth surface of the left and right Hoistway walls Covering-up the uneven and potentially chipped front edges of Hoistway glass panels, as a result of manufacturing imperfections, transportation and handling induced minor damages, thus, serving decorative purposes Serving as a conduit for Hoistway electrical wiring Serving as a door frame for Hoistway Doors The glass-made exoskeleton design of the Hoistway allows using large glass panels and thin metal edge frames in the Hoistway construction, thus, achieving truly panoramic design properties of the present approaches without metal mesh skeleton frames and heavy metal structures, unlike other existing elevator systems, where heavy metal structures are traditionally part of any such elevator solution.

Chapter 3. Smooth Hoistway Shaft for Vacuum Operation

The present approaches claim the benefits of the Panoramic Vacuum Elevator System described in Chapter 1 and the Tempered Glass as the Hoistway Exoskeleton described in Chapter 2. It was described how large tempered glass panels may be used as an exoskeleton and constructive elements in the construction of the Panoramic Vacuum Elevator. It was shown how the edges of glass panels are protected by thin aluminum frames that are affixed to the edges of glass panels by means of silicon based or other adhesives. However, from that description it was not evident how these glass panels (Hoistway Shaft walls) and the metal frames are put together to form a smooth Hoistway Shaft 200 for vacuum operation. The present approaches describe in details of what shapes the glass panels and metal edge frames are used and how these structures are connected together to form a smooth surface of the Hoistway Shaft 200.

The belt frame 310, as shown in In FIG. 33, FIG. 34, FIG. 80, FIG. 82-FIG. 85, in an embodiment, has three arms of belt arms—the left belt arm 311, the right belt arm 312 and the back belt arm 313. As seen in FIG. 33 and FIG. 37, the left glass panel 211 is resting on the left belt arm 311 of the Belt Frame 310, the right glass panel 212 is resting on the right belt arm 312 of the Belt Frame 310 and the back glass panel 213 is resting on the back belt arm 313 of the Belt Frame 309 or 310.

The FIG. 82 shows an embodiment of a Front perspective view of the Hoistway Belt option at the upper floor levels, the FIG. 84 shows a Front perspective view of the Hoistway Belt option at the foundation floor level and the FIG. 89 shows Cross-section view of the Hoistway Belt and Hoistway Glass Panels for the left and right glass panel 211/212 connection. Similarly, that cross-section depicts connection also for the back-glass panel 213 connecting to back belt arm 313, in an embodiment. The cross-section 731 of the Belt Frame 309 or 310 profile is shown in FIG. 140, in an embodiment. As seen in the FIG. 89, the Belt Frame 309 or 310, together with glass panels above and below, is forming a uniform smooth surface inside the Hoistway Shaft 200 at the horizontal edges of the Hoistway Belt and Hoistway glass panels, which is necessary for proper Vacuum Seal operation. The channel 736 is reserved for lightweight construction and for electrical cabling, in an embodiment.

The vertical edges of Hoistway glass panels 211 and 213, that interface each other, are protected by means of aluminum alloy or other metal frame 214 having a profile cross-section 716, as shown on FIG. 38 and FIG. 138, in an embodiment. Similarly, vertical edges of Hoistway glass panels 212 and 213, that interface each other, are protected by means of the aluminum alloy or other metal frame 215 with a profile cross-section 716, as shown on FIG. 38 and FIG. 138, in an embodiment. The V-shape ending on the cross-section of the frames 214 and 215 fills the gap between glass panels and coincides with the internal surfaces of glass panels 211, 212 and 213, as well as with the internal surfaces of the belt arms 311, 312 and 313, respectively, thus, forming the required continuation of smooth surfaces and forming a perfect rectangular shape on the left, back and right edges of the Hoistway Shaft 200, which is necessary for proper Vacuum Seal operation.

The Belt Frame 309 or 310, in an embodiment, is closed on three sides and has an opening on the front side, as depicted in FIG. 82 and FIG. 84. This open side is connected to the Hoistway Base 320, as shown in FIG. 80. The Hoistway Base 320, in turn, serves as a doorway entry for entering and exiting the Cabin, as seen in FIG. 33.

The front vertical edge of the glass panel 211 is protected by the left frame 221 of the Doorway Frame 220, while the front vertical edge of the glass panel 212 is protected by the right frame 222 of the Doorway Frame 220, as seen in FIG. 41, FIG. 47 and FIG. 65, in an embodiment. The Doorway Frames 221 and 222 have a cross-section 715 with a cabling channel 718, as shown in FIG. 63, FIG. 65 and FIG. 138. The FIG. 65 shows a cross-section of the Doorway Frame 221 interfacing the glass panel 211 on one side and, through the gasket 223—the Front Panel Frame 233 and Cover Frame 237, on the other side, thus forming a uniform smooth surface of the Hoistway Shaft 200 on the front left and right sides of the Belt Frame 309 or 310, in an embodiment.

As shown in the description above, the left, right and back sides of the Belt Frame 309 or 310 and a one-story Hoistway Glass Body 210 form together smooth surfaces of the shaft, which is necessary for the Vacuum Seal operation. However, it is necessary for the front side of the Hoistway Shaft 200 to have smooth surface also. This front side of the Hoistway Shaft 200, the Doorway Frame 220, accommodates structures like the Hoistway Front Panel 230 (FIG. 34, FIG. 41, FIG. 47, FIG. 55-FIG. 65), the Hoistway Doors 240 and 250 (FIG. 30, FIG. 33, FIG. 34, FIG. 41, FIG. 66 and FIG. 67-FIG. 79), and the Hoistway Base 320 (FIG. 80, FIG. 91-FIG. 103), in an embodiment.

Referring now to the present approaches in more detail, the Front Panel 230, as shown in FIG. 33, FIG. 34, FIG. 40, FIG. 41, FIG. 47, FIG. 45, FIG. 56-FIG. 65, is built in a way, that the glass clement 231 of the Front Panel 230 is chamfered on 4 sides and is interfacing thin metal edge frames 232, 233, 234 and 235, also cover frames 237 and 238, in such a way, to form a uniform smooth surface on the inside of the Hoistway Shaft 200, as shown in FIG. 55-FIG. 65. The FIG. 63 and FIG. 65 show a Cross-section view of the Doorway Frame 220 and the Front Panel 230 with the glass panel 231 is connecting the left frame 233 and the left cover frame 237 of the Hoistway Front Panel 230. In a similar manner, the glass panel 231 is connecting the right frame 234 and the right cover frame 238 of the Hoistway Front Panel 230.

The left Hoistway door frame 252 is interfacing a door's glass panel 251 in such a way, to form a smooth surface inside the Hoistway, as shown in FIG. 66, depicting a Cross-section view of the Doorway Frame and the Hoistway Door.

In a similar fashion, the Hoistway Doors 240 and 250, as shown in FIG. 33, FIG. 34, FIG. 40-FIG. 45, FIG. 68-FIG. 73, are built in a way, that the door glass panel 251 is chamfered on 4 sides and interfaces thin door edge frames 252, 253, 254 and 255 in such a way, as to form together a uniform smooth surface on the inside of the Hoistway Shaft 200.

The door edge frame 252 is made from a metal frame with a cross-section 721, the door edge frame 253 is made from a metal frame with a cross-section 724 and the door edge frames 254 and 255 are made from a metal frame with a cross-section 722, in an embodiment, as shown in FIG. 70 and FIG. 139.

As shown in the description above, glass panels of the Hoistway are protected on the edges by means of aluminum alloy-made or other metal-made frames. These frames have one thing in common—an L-shaped opening for holding the glass that fixes both sides of the glass in its position resisting both exploding and imploding forces, yet forming a smooth surface on the inside of the Hoistway for proper vacuum operation, as shown in cross-section views of connection of these frames to Hoistway glass panels, in FIG. 65, FIG. 66 and FIG. 89.

In turn, the glass panels of the Hoistway, interfacing edge frames, have a chamfer that faces the lock of a metal edge frame, facing the Hoistway. Such alignment of glass chamfered edge and the lock of a metal edge frame ensures a smooth transition between a glass panel and an edge frame for proper Vacuum Seal operation, while locking the glass panel from moving for a sturdy Hoistway construction.

Chapter 4. Spotless Hoistway Design

The present approaches claim the benefits of the Panoramic Vacuum Elevator System described in Chapter 1, the Tempered Glass as the Hoistway Exoskeleton described in Chapter 2 and the Smooth Hoistway Shaft for Vacuum Operation described in Chapter 3. It was shown how large tempered glass panels may be used as an exoskeleton and constructive element in the construction of the Hoistway of the Panoramic Vacuum Elevator. It was shown how the edges of glass panels are protected by thin aluminum frames, what shapes of the edges of glass panels and protective metallic frames are, in order to form a smooth surface of the Hoistway Shaft for proper vacuum operation.

The present approaches describe ways of connecting metallic frames to glass panels and connecting metallic frames to each other, for forming a steady Hoistway construction.

There are two ways for connecting metallic frames to glass panels:

- Using bolts and nuts
- Using adhesives

Connecting adjacent glass panels using bolts and nuts—is widely used in the industry. The most common case is using special conical bolts and nuts, together with metallic corner connectors for connecting tempered glass panels together. The conical nuts may be leveled with Hoistway glass panels from inside, thus preserving the smooth surface of the Hoistway Shaft. The metallic corner connectors have to be placed from outside the Hoistway Shaft and may hold the glass panels at any given angle: 90 degrees in case of rectangular Hoistway shape or higher degree angle in case of hexagonal, or octagonal shapes. This approach, however, has several drawbacks:

- Conical nuts and bolts and metallic corner connectors are expensive
- The glass panels may require additional processing—drilling conical holes across the edges of glass panels, which increases the cost of a glass panel
- The conical holes of the glass are located at a substantial distance from glass edge due to tempering technological requirements, which mandates bulky and even more expensive metallic corner connectors
- Results in poor design due to multitude of sticking out metallic corner connectors together with conical bolts and nuts.

Considering all these drawbacks, this option is the least preferred choice.

Silicon based adhesive or other composite adhesive with good glass-to-metal adhesion properties are a better alternative solution and may be used whenever possible. Silicon based glue, in many cases, is preferred, because of its viscosity, the "softness" even after hardening, which, together with flexible tempered glass panels, makes up for flexible construction, that is better resistant to earthquake shocks. Also, it does not result in micro-cracks over time due to "softness" component of silicon resins. However, the adhesive alone is not sufficient to sustain a multi-ton construction in place. From the description outlined in previous chapters it was not evident of how the metal frames are connected to each other to form a steady Hoistway construction.

There are few reasonably obvious ways of bringing metal frames together to form a steady Hoistway structure:

- Weldments connecting metallic frames together
- Bolts and nuts connecting metallic frames By employing either one of these two methods the metallic frames may be connected together, which are, in turn, affixed to glass panels, thus resulting in a steady construction.

Weldments may not be practical for several reasons:

- Metallic frames welded together form a deadlock construction that is not flexible and may produce microcracks during mechanical stress, like small shocks from even mild earthquakes or uneven heat when exposed to a sun. These microcracks may potentially represent a major problem and result in unstable construction over time
- Micro-cracks may manifest when exposed to uneven heating, like sun rays
- Weldments cannot be used from inside the Hoistway, not to compromise the smooth surface of the Hoistway Shaft, plus it is against some building codes
- Weldments may, most likely, damage the adhesive layer of nearby connections
- Weldments may damage the anodized coating layer of aluminum frames resulting in degraded looks
- May be used only at the installation site, which makes the installation process cumbersome.

Bolts and nuts connecting metallic frames is the practical choice, as it is free from all the drawbacks outlined above, however, it leaves one concern—the look and feel. Imagine a multitude of sticking out bolts and nuts throughout the entire construction. In one embodiment these bolts and nuts may be specifically emphasized to make it a "design feature" and make it part of the signature line of the design. In an alternate embodiment the bolts and nuts may be concealed and away from a naked eye. The present techniques take the latter approach and use drastically new technique in using bolts and nuts for connecting the metallic frames together for building the Panoramic Vacuum Elevator, in which, despite the use of hundreds of bolts and nuts, screws, fasteners, connectors, these components may be concealed from a naked eye. Such techniques become more challenging, given the panoramic translucent nature of the entire design. This means, that due to the translucent design, the multitude of bolts and nuts in the system is preferable to be invisible from both the outside of the Hoistway and the inside of the Hoistway Shaft. It is shown in the forthcoming description that by employing special forms of metallic frames, in combination with special connection techniques, the multitude of bolts and nuts, that are used in the presented design, are completely concealed from a naked eye of an observer, whether observing the elevator from outside of the Hoistway or from inside of the Hoistway Shaft. It is also shown that these special design techniques are not just serving decorative purposes of concealing bolts and nuts from a naked eye, but such techniques are part of the construction itself.

There are several subsystems identified in the construction of the Hoistway, where the metallic frames are to be connected together, in an embodiment:

Hoistway Foundation 100
Hoistway Body 200
Hoistway Belt 300
Hoistway Head 400

Every such subsystem employs a special solution for connecting frames to each other by means of bolts and nuts in a way, that all these connections are obscured and are concealed from a naked eye of an observer, whether observing the system from outside the Hoistway or riding the elevator and observing the system from inside the Hoistway, thus, forming a unique "spotless" design signature pattern of the present approaches.

In an embodiment, the entire ergonomics of the design is implemented in a way, that all the edges of metal frames, that are attached to each other, include straight smooth lines and/or curves, that smoothly transition from one metal frame to another and continue even at the sharp turns of the edges (sides) of the Hoistway, complementing the unique "spotless" design signature pattern of the present approaches, further referred to as "Spotless" design style.

The FIG. 11 shows a Top perspective view of the Hoistway Foundation 1 and the FIG. 12 shows a Perspective exploded view of the Hoistway Foundation 1, in an embodiment. The Hoistway Foundation, in an embodiment, includes several modules, each is examined separately:

Hoistway Foundation Enclosure 110
Hoistway Foundation Base 120
Hoistway Foundation Frame 130
Suspension Mechanism 800
Emergency Brakes 880
Hoistway Foundation Grill 140

In more detail, the FIG. 13 shows a Perspective view of the Hoistway Foundation Enclosure 110 and the FIG. 14 shows an Exploded view of the Hoistway Foundation Enclosure 110, consisting of: the Foundation Enclosure Base Plate 111, the Foundation Enclosure Left Plate 112, the Foundation Enclosure Right Plate 113, the Foundation Enclosure Back Plate 114 and the Foundation Enclosure Front Plate 115.

The screws 116 are connecting the Foundation Enclosure plates 111, 112, 113, 114 and 115 together. These screws 116 are being attached from the outside of the Foundation Enclosure 110, which is located below the ground floor level, in the shallow pit and these screws are naturally concealed by the ground floor, conforming to the Spotless design style.

Further, the FIG. 15 shows a Perspective view of the Hoistway Foundation Base 120 and the FIG. 16 shows an Exploded view of the Hoistway Foundation Base 120. The bolts 129 are connecting the Foundation plates 125, 126, 127 and 128 to the Foundation Base frames 121, 122, 123 and 124, respectively. The bolts 129 are blocked from an outside view by the Foundation Enclosure 110 and are blocked from inside view by the Suspension Platform 131, as shown in FIG. 11 and FIG. 12, thus, the Hoistway Foundation Base 120 also conforms to the Spotless design style.

The Foundation Base frames 121, 122, 123 and 124 are made of a metal profile with a cross-section 711, as shown in FIG. 17 and FIG. 138, in an embodiment. The Foundation plates 125, 126, 127 and 128 are made of a metal profile with a cross-section 712, as shown in FIG. 17 and FIG. 138, in an embodiment.

The FIG. 21 shows a Perspective view of the Hoistway Foundation Frame 130 and the FIG. 22 shows a Perspective exploded view of the Hoistway Foundation Frame 130, comprising of the left and right edge frames 134 and the back edge frame 136 and made from a metal profile with a cross-section of the form 713, as shown in FIG. 24 and FIG. 138. The bolts 137 are affixed to the edge frames 134 and 136, and latter are connected to each other by means of knee connectors 138 with bolts 139, while the bolts 145 are connecting the front edge frame 132 to the left and right edge frames 134 via the front base edge frame 135, thus forming the Hoistway Foundation Frame 130, which is stacked atop the Hoistway Foundation Base 120. There may be several dozens of bolts in this subsystem, however, they may be concealed from the outside view by Hoistway Foundation Enclosure and from the inside view by the Suspension Platform 131, thus, conforming to the Spotless design style of the system, as well.

Further, the FIG. 12 shows a Perspective exploded view of the Hoistway Foundation with Suspension Mechanism 80 being part of the foundation, in an embodiment. Screws and bolts along with the whole Suspension Mechanism are being concealed from an outside observer by the Foundation Enclosure panels 111, 112, 113, 114 and 115 and from an inside observer—by the Suspension Platform 131. The latter has two large round holes, which are being obscured by Foundation Emergency Brakes 880, as shown in FIG. 11 and FIG. 12. The bolts, screws, fasteners and other small mechanics part of the Emergency Brakes 880 are obscured from a view by Emergency Brake Plates from the top and the Foundation Enclosure 110 from the sides and the bottom, thus, conforming to the Spotless design style.

Further, the FIG. 11, FIG. 12 and FIG. 26-FIG. 29 show various views of the Hoistway Foundation Grill with Grill frames 141, 142 and 143 being attached together by means of plastic locks embedded in the grill profile, thus no visible screws and bolts here as well.

On top of the Foundation 100, in an embodiment, the Hoistway is erected, include stacked-up one-story Hoistway Bodies 200, being separated by a Hoistway Belt 300 as shown in FIG. 30-FIG. 34. Hoistway Bodies 200 are affixed to Hoistway Belts 300 from top or bottom by means of silicon based or other adhesive The Hoistway Body 200, in turn, includes several modules, in an embodiment, each is examined separately:

Hoistway Shaft 210
Doorway Frame 220
Hoistway Doors 240 and 250

Hoistway Front Panel 230

Further, in an embodiment, the FIG. 37 shows a Perspective and exploded views. The Hoistway Shaft 210 includes Hoistway glass panels 211, 212 and 213 connected to Hoistway Back frames 214 and 215 by means of silicon sealing material (e.g. silicon resin) and no bolts and nuts or other fasteners were used to connect them, as shown in FIG. 38 and FIG. 39, in an embodiment.

Further, the Hoistway Shaft 210 is resting on and attached to the Hoistway Belt 309 or 310 by silicon-based or another adhesive, in an embodiment. On the front side, the Hoistway Shaft 210 is attached to the Doorway Frame 220 by means of silicon based or another adhesive, as well. The top of the Hoistway Shaft 210 is connected either to a Hoistway Belt 309 or 310 of the upper floor or to the Hoistway Head 400, again, using a silicon based or other adhesive, in an embodiment, thus, all connections of the Hoistway Shaft 210 do not employ any bolts or nuts, and the fastener used—is a silicon based or other adhesive material, in an embodiment.

Further, the Hoistway Doorway Frame 220, with edge frames 221 and 222, serves as a medium for connecting together the Hoistway Shaft 210, the Hoistway Front Panel 230 and the Hoistway Doors 240 and 250, as shown in FIG. 33, FIG. 34, FIG. 40, FIG. 41 and FIG. 47, in an embodiment.

The Hoistway Front Panel 230 includes the Hoistway Front Glass Panel 231, the lower edge frame 232 with a cross-section of the form 723, the left edge frame 233 with a cross-section of the form 725, the right edge frame 234 with a cross-section of the form 725, the upper edge frame 235 with a cross-section of the form 721, the gasket 236 with a cross-section of the form 737, and the left and right cover plates 237 and 238, respectively, with a cross-section of the form 726, as shown in FIG. 58, FIG. 61-FIG. 65 and FIG. 139, in an embodiment.

The Hoistway Front Panel 230 is attached to the edge frames 221 and 222 of the Doorway Frame 220 via bolts 239 that are bolted to the left and right edges 233 and 234 of the Front Panel 230, as shown in details in FIG. 41, FIG. 47, FIG. 58, FIG. 57, FIG. 63-FIG. 65. The bolts 239 are entirely located within the Hoistway Doorway Frame 220 with edge frames 221 and 222 and the Hoistway Front Panel edge frames 233 and 234 and are concealed by cover edge frames 237 and 238, as shown in FIG. 63-FIG. 65, in an embodiment.

The Hoistway Hinges 226 and 227 are connected to the Doorway Frame 220 edge frames 221 and 222 via the bolts 225, as shown in FIG. 41, FIG. 47, FIG. 49 and FIG. 64. For that purpose a special knee-type part 229 is bolted to the Hoistway Hinges 226 and 227 with the bolts 218, as shown in FIG. 48-FIG. 50. Then the Hoistway Hinge 226 is inserted into a specially cut hole 219, thus concealing the knee-part 229 and its bolts 218 from view, as shown in FIG. 41, FIG. 47 and FIG. 64. The knee-part 229, in turn, is bolted to the Hoistway Doorway Edge frames 221 and 222 via bolts 225, as shown in FIG. 49 and FIG. 64. At this point the "sticking out" bolts of the Door Frame are the bolts 225 shown in FIG. 49, which, in turn, is concealed by the vacuum seal 224, having a cross-section of a form 739, of the Hoistway Doorway Frame, as shown in FIG. 49, thus, concealing the bolts fastening Hoistway Hinges 226 and 227 to the Doorway Frame 220.

The Hoistway Hinges 226 and 227 are made from a metal profile with a cross-section of the form 728, as shown in FIG. 139, in an embodiment.

The knee-part 229 is made from a metal profile with a cross-section of the form 729, as shown in FIG. 139, in an embodiment.

Further, the Hoistway Doors 240 and 250 have the following bolts that keep the doors construction together, as shown in FIG. 67-FIG. 79, in an embodiment:

- Bolts 258 that connect the door middle frame 253 to the door lower frame 254 and upper frame 255. These bolts are concealed by the vacuum seal 257, having a cross-section of a form 739, and are not visible from any angle, as shown in FIG. 71-FIG. 73.
- Bolts 248 that connect the door lower hinge 241 to the door lower frame 254 and the door upper hinge 242 to the door upper frame 255. These bolts are concealed by the vacuum seals 256, having a cross-section of a form 739, at the bottom and top frames of the Hoistway door and are not visible from any angle, as shown in FIG. 74-FIG. 76.
- Bolts 249 that connect the 3 hinges 241, 242 and 243 to the door hinge frame 252. These bolts are hidden when the door is closed, as the bolts face the Door Frame and are visible when the door is open. In fact, this may be the only place where bolts are visible in the entire construction—at Hoistway Doors open position, as shown in FIG. 72 and FIG. 77.

As seen from the Figures, bolts, that are used in the design, are not visible from the outside, as they are contained within frame structures and, when closed, are also blocked from the view by the Hoistway Doorway Frame. Some of the bolts may be seen (on the edge frame 252) when the Hoistway Doors are open and when the viewer is located somewhere in between the Hoistway Doors.

The Hoistway Hinges 226 and 227 employ a door axle 228 that goes into the axle housing 245 of the Hoistway Door Hinges 242 and 243 or into the axle housing 246 of the Hoistway Door Hinge 241 of the Hoistway Doors 240 and 250, in an embodiment. The lower Hoistway Door Hinge 241 employs a lever 247 that is inserted into the Door Hinge 241 from the hinge bottom and rests on the Hoistway Door Axle Mechanism 820, which opens and closes the Hoistway Doors 240 and 250 by turning the lever 247, in an embodiment.

The Hoistway Door Hinges 242 and 243 are made from a metal profile with a cross-section of the form 727, as shown in FIG. 139, in an embodiment.

Further, the Hoistway Shaft 210 is resting upon the Hoistway Belt 300, that includes the Hoistway Belt 309 or 310 and the Hoistway Base 320. The FIG. 7 and FIG. 34 show the Hoistway Belt 309 or 310 in relation to the Hoistway Shaft 210 and the Hoistway Base 320, in an embodiment. The FIG. 80, FIG. 81-FIG. 86 show various parts of the Hoistway Belt 309 or 310, where the three edge frames 311, 312 and 313 of the Hoistway Belt 309 or 310 are cut at 45 degree angle on the corner edges (for hexagonal and octagonal shaped Hoistway this angle may differ) in a way, that when aligned together—the Belt edge frames 311, 312 and 313 form a perfect 90 degree angle, aligning with the shape of the Hoistway Shaft 210, as seen in FIG. 33, FIG. 34, FIG. 87-FIG. 88, thus, manifesting a smooth transition of external patterns of the Belt profile along the Belt form from outside and a smooth uniform Hoistway Shaft with 90 degree surface turns from the inside of the Hoistway.

In an embodiment, both edges of the back edge frame 313 are carved out in a way, to give room for the Belt Connecting Knee 314, that is affixed to the back edge frame 313 via bolts 315. Similarly, the back edges of the left and right edge frames 311 and 312 are carved out to give room for the remaining end of the Belt Connecting Knee 314 in a way, that when the left edge frame 311 and the right edge frame 312 are aligned with the back edge frame 313, forming a 90 degree angle, then the Belt Connecting Knee 314 on both left and right ends is fully submerged within the belt edge frames 311, 312 and 313, along with the connecting bolts 315, thus, concealing the Belt Connecting Knee 314 and the bolts 315 on both left and right ends of the back edge frame 313.

The left edge frame 311 is being fastened to the Belt Connecting Knee 314 on the left end of the back edge frame 313 using the bolts 316 on the top and the bottom sides of the left edge frame 311, and the right edge frame 312 is being fastened to the Belt Connecting Knee 314 on the right end of the back edge frame 313 using the bolts 316 on the top and the bottom sides of the back edge frame 313, thus, forming a sturdy Hoistway Belt 309 or 310. At this point both the left and the right Belt Connecting Knees 314 and their connecting bolts 315 are concealed and submerged within the construction of the Belt 309 or 310, exposing the bolts 316, which, in turn, are concealed by the glass panels 211 and 212 and the underlying sealing adhesive material (e.g. silicon resin), once the Belt is connected to the Hoistway Glass Body 210, thus concealing all the bolts used to build the Hoistway Belt construction.

The Belt Connecting Knee 314 is made from a metal profile with a cross-section of the form 732, as shown in FIG. 140, in an embodiment.

The Hoistway Base 320, in an embodiment, includes:

- Hoistway Base Body 320 of the profile with cross-section of the form 733, as shown in FIG. 100 and FIG. 140
- Hoistway Base side plates 321 of the profile with cross-section of the form 734, as shown in FIG. 100 and FIG. 140
- Hoistway Base cover plate 322 of the profile with cross-section of the form 735, as shown in FIG. 101-FIG. 103 and FIG. 140.

As seen in FIG. 96-FIG. 98, the Hoistway Base 320 is fastened to the Hoistway Belt 309 or 310, in an embodiment, via bolts 324, which are completely concealed from the view, as bolts 324 are inserted from the inside of the Hoistway Base 320 and are coming out from the holes 323, and being fastened to the Hoistway Belt 309 or 310 via the corresponding threads in the Hoistway Belt 309 or 310. Thus, the sides of the Hoistway Belt 309 or 310 conform to the Spotless design style—no visible bolts and nuts here, either.

Further, the Hoistway Base 320 has several groups of bolts coming out of the Hoistway Base Body 320, as shown in FIG. 95-FIG. 98 and FIG. 102, in an embodiment:

- bolts 324, coming out from the holes 323 of the back side, facing the Hoistway Shaft and connecting to the Hoistway Belt 309 or 310, as described in the previous paragraph
- bolts 331, coming out from the holes 319 of the back side, facing the Hoistway Shaft and connecting to the Hoistway Doorway Frames 221 and 222 of the lower floor (at upper floors), or connecting to the Hoistway Foundation Fame left and right edge frames 134 (at the foundation floor)
- bolts 326, coming out from the holes 325 of the front side, facing the entrance to the Hoistway, and connecting to the floor material at each floor level. These bolts are concealed, by being submerged in the floor material
- bolts 328 coming out of the bottom side of the Hoistway Base Body 320 and connecting to the Front Panel 230 (of the floor below) through the gasket 236 or connecting to the frame 132 of the Hoistway Foundation Frame 130 (at the bottom floor level) through the gasket 133.

The heads of the above-mentioned bolts are submerged within the Hoistway Base Body 320 and their ends are concealed within the bodies of structures that the bolts are connected to, thus, concealing all the bolts coming out of the Hoistway Base 320 and conforming to the Spotless design style.

Note that holes 323, 318 and 319 of the Hoistway Base 320 are concealed by the Hoistway Belt 309 or 310 and Hoistway Doorway Frame 220. The holes 318 are used as a cable conduit coming in and out of the Hoistway Base 320.

There are also different groups of bolts that are going into the Hoistway Base 320 from outside, as shown in FIG. 97 and FIG. 98, in an embodiment:

- Bolts 327 are connecting the left and right Hoistway Base side plates 321 to the Hoistway Base Body 320. Top bolts 327 are covered by the Hoistway Base cover plate 322, while the bottom bolts 327 are submerged within the floor material, therefore concealed from a naked eye
- Other bolts fastening various mechanisms, as part of the Hoistway Small Mechanics, inside the Hoistway Base Body 320. These bolts are being inserted from the front side or the bottom side of the frame 320 and their heads are submerged within the thickness of the floor material, therefore these bolts are too concealed from a naked eye.

Furthermore, still referring to the present approaches, the Machine Room 400 (MR) is built in such a way that there are no external bolts that hold together the construction of the Machine Room, although everything is put together by using mostly bolts and some few glue. The MR may require maintenance of mechanisms inside, therefore uses bolts and screws to open up its compartments for technical maintenance and support. The Hoistway Glass Body 210 is glued to the MR Base Frame 370, similar to the technique for gluing the Hoistway Glass Body 210 to the Hoistway Belt Strap 310, thus attaching the MR to the Hoistway Body with glue, so no screws and bolts here either, as shown in FIG. 3, FIG. 4, FIG. 7, FIG. 33, FIG. 34, FIG. 107, FIG. 127-FIG. 129.

At the top of the Hoistway, the top level Hoistway Shaft 210 is connected to the Machine Room (MR) 400 by means of silicon based or other adhesive material, in an embodiment. Further, the front side of the MR 400 is bolted to the Front Panel 230 of the top floor via bolts 482 located on the MR Base Frame 480, as shown in FIG. 127-FIG. 129, FIG. 133. The heads of the front side bolts 482 are, in turn, concealed by the MR Enclosure 410, as shown in FIG. 107, FIG. 108, FIG. 109. The bodies of the front side bolts 482 are submerged within the top edge 235 of the top Front Panel 230, thus attaching the Front Panel 230 to the MR without any visible bolts from outside or inside the Hoistway.

The rest of the sides (left, right and back) of the MR Base Frame 480, in an embodiment, have bolts 482 along the edges of the MR Base Frame 480, that connect the MR Base Frame 480 to the MR Edge Frame 470. The bodies of these bolts 482 are submerged within the body of the MR Edge Frame 470, while the heads of these bolts 482 are concealed by the MR Enclosure 410, thus concealing all the bolts of the Machine Room, connecting the MR to the "outside world". All other bolts of the MR are located inside the MR and are not exposed to an observer located inside or outside the Hoistway.

MR Enclosure 410 includes: MR Enclosure Top Plate 411, MR Enclosure Front Plate 412, MR Enclosure Back Plate 413, MR Enclosure Left Plate 414 and MR Enclosure Right Plate 415, as shown in FIG. 108 and FIG. 109, in an embodiment.

As shown in the above description, the parts of the Hoistway of the present approaches may be affixed together using a silicon based or other adhesive, when a metal part is being fastened to a glass part or being bolted together when two non-glass parts are being fastened together. In these cases of bolts used in the Hoistway construction, the bolts are concealed from an observer view, whether looking from inside or outside the Hoistway, complementing the panoramic view, thus, forming the unique Spotless signature design properties of the present approaches.

Furthermore, metal edges that are connected together at 90 degree angle or other angle relation, are pre-cut on the connection edge at 45 degree angle (in case of rectangular shaped Hoistway), forming an angled chamfer in such a way, that alignment of these metal frames via a chamfered edge results in a precise alignment of the curves and design features of the profiles, example of which is shown in FIG. 80, FIG. 86, FIG. 88, complementing the unique Spotless signature design properties of the present approaches.

What is claimed is:

1. An elevator apparatus comprising:

a hoistway apparatus comprising a hoistway shaft;

a cabin apparatus, the cabin apparatus moving vertically through the hoistway shaft of the hoistway apparatus caused by maintaining a difference in air pressure between overhead air pressure above the cabin apparatus and underneath air pressure below the cabin apparatus;

wherein, when the difference in air pressure between the overhead air pressure and the underneath air pressure meets ascending criteria, the cabin apparatus ascends through the hoistway shaft, and, when the difference in air pressure between the overhead air pressure and the underneath air pressure fails to meet the ascending criteria, the cabin apparatus descends through the hoistway shaft;

wherein the difference in air pressure is maintained at least by forcing airflow in and out the hoistway shaft;

one or more valves controlling the airflow in and out the hoistway shaft;

wherein, when an emergency is detected, at least one of the one or more valves is activated, thereby preventing, at least in part, the airflow from entering or escaping the hoistway shaft, and thereby decelerating movement of the cabin apparatus through the hoistway shaft.

2. The elevator apparatus of claim 1, wherein the ascending criteria are based at least in part on a vacuum pressure threshold.

3. The elevator apparatus of claim 2, wherein the vacuum pressure threshold is an equilibrium air pressure, which is caused by the difference in air pressure between the overhead air pressure and the underneath air pressure and, when exerted on the cabin apparatus in an upward direction, causes a force that is opposite but equal to a gravitational force of the cabin apparatus.

4. The elevator apparatus of claim 2, the vacuum pressure threshold, at least in part, depends on one or more of: a load of the cabin apparatus or an altitude above sea level where the elevator apparatus is installed.

5. The elevator apparatus of claim 2, wherein the vacuum pressure threshold is 5 percent of atmospheric pressure.

6. The elevator apparatus of claim 2, wherein the ascending criteria is met when the underneath air pressure is greater than the overhead air pressure by more than the vacuum pressure threshold.

7. The elevator apparatus of claim 1, wherein, when the at least one of the one or more valves is activated, at least a portion of the hoistway shaft becomes air-tight.

8. The elevator apparatus of claim 1, wherein the one or more valves are one or more upper valves situated at top of the hoistway apparatus, and wherein, when the at least one of the one or more valves is activated, the one or more upper valves prevent the airflow from entering and escaping the hoistway shaft from the top of the hoistway apparatus.

9. The elevator apparatus of claim 8, wherein, the activation of the one or more upper valves, which prevents the airflow from entering and escaping the hoistway shaft from the top of the hoistway apparatus, generates partial vacuum above the cabin apparatus, thereby preventing the cabin apparatus from descending.

10. The elevator apparatus of claim 1, wherein the hoistway apparatus further comprises a hoistway machine room apparatus situated atop the hoistway shaft;

wherein the hoistway machine room apparatus comprises a machine room base frame plate, having one or more apertures for air to flow in and out from at least a portion of the hoistway shaft above the cabin apparatus;

wherein, when activated, the one or more valves close off the one or more apertures of the machine room base frame plate, thereby preventing the airflow from entering or escaping the at least portion of the hoistway shaft, and thereby preventing the cabin apparatus from descending.

11. The elevator apparatus of claim 1, wherein the one or more valves are one or more lower valves situated at bottom of the hoistway apparatus, and wherein, when activated, the one or more lower valves prevent the airflow from entering and escaping the hoistway shaft from the bottom of the hoistway apparatus.

12. The elevator apparatus of claim 11, wherein, the activation of the one or more lower valves, which prevents the airflow from entering and escaping the hoistway shaft from the bottom of the hoistway apparatus, generates escalating air pressure below the cabin apparatus, thereby preventing the cabin apparatus from descending.

13. The elevator apparatus of claim 1, wherein the hoistway apparatus further comprises a hoistway foundation apparatus comprising hoistway suspension platform, having one or more apertures for air to flow in and out from at least a portion of the hoistway shaft below the cabin apparatus;

wherein, when activated, one or more lower valves close off the one or more apertures of the hoistway suspension platform, thereby preventing the airflow from entering or escaping a portion of the hoistway shaft, and thereby preventing the cabin apparatus from descending.

14. The elevator apparatus of claim 1, further comprising: one or more electromagnetic levers;

wherein, when the emergency is detected, the at least one of the at least one of the one or more valves is activated by at least one of the one or more electromagnetic levers.

15. The elevator apparatus of claim 14, wherein the one or more electromagnetic levers are powered by one or more batteries.

16. The elevator apparatus of claim 1, further comprising: one or more electromagnetic mechanisms comprising one or more electromagnetic levers;

a mechanical deployment mechanism;

wherein, when detected that the one or more electromagnetic mechanisms fail to operate, the at least one of the one or more valves are activated by the mechanical deployment mechanism.

17. A method for vertical movement of a cabin apparatus through a hoistway shaft of a hoistway apparatus, the method comprising:

forcing airflow in and out the hoistway shaft, thereby maintaining a difference in air pressure between overhead air pressure above the cabin apparatus and underneath air pressure below the cabin apparatus;

wherein the maintaining the difference in air pressure between the overhead air pressure and the underneath air pressure causes the cabin apparatus to move;

wherein, when the difference in air pressure between the overhead air pressure and the underneath air pressure meets ascending criteria, the cabin apparatus ascends through the hoistway shaft, and, when the difference in air pressure between the overhead air pressure and the underneath air pressure fails to meet the ascending criteria, the cabin apparatus descends through the hoistway shaft;

detecting an emergency;

based on the detecting the emergency, activating at least one of one or more valves controlling the airflow in and out the hoistway shaft, thereby preventing, at least in part, the airflow from entering or escaping the hoistway shaft, and thereby decelerating movement of the cabin apparatus through the hoistway shaft.

18. The method of claim 17, wherein the ascending criteria are based at least in part on a vacuum pressure threshold, which is an equilibrium air pressure, which is caused by the difference in air pressure between the overhead air pressure and the underneath air pressure and, when exerted on the cabin apparatus in an upward direction, causes a force that is opposite but equal to a gravitational force of the cabin apparatus.

19. The method of claim 18, further comprising:

generating the difference in air pressure between the overhead air pressure and the underneath air pressure such that the underneath air pressure is greater than the overhead air pressure by more than the vacuum pressure threshold thereby:

making the difference in air pressure between the overhead air pressure and the underneath air pressure to meet the ascending criteria, and causing the cabin apparatus to ascend through the hoistway apparatus.

20. The method of claim 17, wherein the hoistway apparatus has one or more apertures for air to flow in and out from at least a portion of the hoistway shaft, the method further comprising:

closing off the one or more apertures of the hoistway apparatus by the one or more valves thereby:

preventing the airflow from entering or escaping the at least portion of the hoistway shaft, and preventing the cabin apparatus from descending.

* * * * *